(12) United States Patent
Tunkelang et al.

(10) Patent No.: US 8,832,140 B2
(45) Date of Patent: *Sep. 9, 2014

(54) SYSTEM AND METHOD FOR MEASURING THE QUALITY OF DOCUMENT SETS

(75) Inventors: Daniel Tunkelang, Brooklyn, NY (US); Joyce Jeanpin Wang, Watertown, MA (US); Vladimir Zelevinsky, Brookline, MA (US); Herng Albert Sheu, Palo Alto, CA (US)

(73) Assignee: Oracle OTC Subsidiary LLC, Redwood Shores, CA (US)

( * ) Notice: Subject to any disclaimer, the term of this patent is extended or adjusted under 35 U.S.C. 154(b) by 1096 days.

This patent is subject to a terminal disclaimer.

(21) Appl. No.: 12/146,280

(22) Filed: Jun. 25, 2008

(65) Prior Publication Data

US 2009/0006387 A1 Jan. 1, 2009

Related U.S. Application Data

(60) Provisional application No. 60/946,310, filed on Jun. 26, 2007.

(51) Int. Cl.
*G06F 17/30* (2006.01)
(52) U.S. Cl.
CPC .... *G06F 17/30657* (2013.01); *G06F 17/30424* (2013.01)
USPC .......................................................... 707/769
(58) Field of Classification Search
CPC ................................................ G06F 17/30424
USPC ........................ 707/722, 737, 723, 736, 748
See application file for complete search history.

(56) References Cited

U.S. PATENT DOCUMENTS

| | | | |
|---|---|---|---|
| 6,122,628 A | 9/2000 | Castelli et al. |
| 6,128,613 A | 10/2000 | Wong et al. |
| 6,233,575 B1 | 5/2001 | Agrawal |
| 6,282,532 B1 | 8/2001 | Sandell |
| 6,507,840 B1 | 1/2003 | Ioanndis et al. |
| 6,567,936 B1 | 5/2003 | Yang et al. |
| 6,642,940 B1 | 11/2003 | Dakss et al. |

(Continued)

FOREIGN PATENT DOCUMENTS

| | | |
|---|---|---|
| WO | 00/42533 | 7/2000 |
| WO | 03098477 A1 | 11/2003 |
| WO | 2004029826 A1 | 4/2004 |
| WO | 2006036127 A1 | 4/2006 |

OTHER PUBLICATIONS

Office Action dated Nov. 12, 2010, issued in U.S. Appl. No. 12/146,185.

(Continued)

*Primary Examiner* — Hosain Alam
*Assistant Examiner* — Johnese Johnson
(74) *Attorney, Agent, or Firm* — Miles & Stockbridge P.C.

(57) ABSTRACT

Systems and methods are described that calculate the interestingness of a set of one or more records in a database, either absolutely (i.e., compared to an overall collection of records) or relative to some other set of records. In one embodiment, the measure is a relative entropy value that has been normalized. Various applications of the measure are described in the context of an information retrieval system. These applications include, for example, guiding query interpretation, guiding view selection and summarization, intelligent ranges, event detection, concept triggers and interpreting user actions, hierarchy discovery, and adaptive data mining.

51 Claims, 32 Drawing Sheets

(56) References Cited

U.S. PATENT DOCUMENTS

| | | | |
|---|---|---|---|
| 6,651,057 | B1 | 11/2003 | Jin |
| 6,704,725 | B1 | 3/2004 | Lee |
| 6,862,559 | B1 | 3/2005 | Hogg |
| 6,910,037 | B2 | 6/2005 | Gutta et al. |
| 7,269,545 | B2 | 9/2007 | Agichtein et al. |
| 7,392,250 | B1 | 6/2008 | Dash et al. |
| 7,752,184 | B2 | 7/2010 | Kagawa |
| 8,051,073 | B2 | 11/2011 | Tunkelang et al. |
| 8,051,084 | B2 | 11/2011 | Tunkelang et al. |
| 2002/0091671 | A1 | 7/2002 | Prokoph |
| 2002/0169595 | A1 | 11/2002 | Agichtein et al. |
| 2003/0068097 | A1 | 4/2003 | Wilson |
| 2003/0078686 | A1 | 4/2003 | Ma et al. |
| 2003/0093411 | A1 | 5/2003 | Minor |
| 2003/0149727 | A1 | 8/2003 | Jaschek et al. |
| 2004/0006736 | A1 | 1/2004 | Kawatani |
| 2004/0059736 | A1 | 3/2004 | Willse et al. |
| 2004/0220907 | A1 | 11/2004 | Camarillo |
| 2005/0022106 | A1* | 1/2005 | Kawai et al. .............. 715/500 |
| 2005/0044487 | A1 | 2/2005 | Bellegarda et al. |
| 2005/0055341 | A1* | 3/2005 | Haahr et al. .............. 707/3 |
| 2005/0086252 | A1* | 4/2005 | Jones et al. .............. 707/102 |
| 2005/0124010 | A1 | 6/2005 | Short |
| 2005/0209987 | A1 | 9/2005 | Beres et al. |
| 2005/0246328 | A1 | 11/2005 | Zhang et al. |
| 2006/0020594 | A1 | 1/2006 | Garg et al. |
| 2006/0026152 | A1* | 2/2006 | Zeng et al. .............. 707/5 |
| 2006/0059138 | A1 | 3/2006 | Milic-Frayling et al. |
| 2006/0080314 | A1* | 4/2006 | Hubert et al. .............. 707/5 |
| 2006/0085399 | A1 | 4/2006 | Carmel et al. |
| 2006/0200461 | A1 | 9/2006 | Lucas et al. |
| 2006/0230035 | A1 | 10/2006 | Bailey et al. |
| 2006/0242139 | A1 | 10/2006 | Butterfield et al. |
| 2006/0248073 | A1 | 11/2006 | Jones et al. |
| 2006/0248074 | A1 | 11/2006 | Carmel et al. |
| 2006/0259163 | A1 | 11/2006 | Hsiung |
| 2006/0259481 | A1 | 11/2006 | Handley |
| 2007/0016574 | A1 | 1/2007 | Carmel et al. |
| 2007/0053513 | A1 | 3/2007 | Hoffberg |
| 2007/0106658 | A1 | 5/2007 | Ferrari |
| 2007/0208730 | A1 | 9/2007 | Agichtein et al. |
| 2007/0214131 | A1 | 9/2007 | Cucerzan |
| 2007/0294225 | A1 | 12/2007 | Radlinski |
| 2008/0133479 | A1 | 6/2008 | Zelevinsky |
| 2008/0154878 | A1 | 6/2008 | Rose |
| 2009/0006384 | A1 | 1/2009 | Tunkelang et al. |

OTHER PUBLICATIONS

Office Action dated Oct. 15, 2010, issued in U.S. Appl. No. 12/146,223.

Office Action dated Dec. 10, 2010, issued in U.S. Appl. No. 12/146,225.

Notice of Allowance dated Dec. 15, 2010, issued in U.S. Appl. No. 12/146,161.

Kumaran, Giridhar and Allan, James, "A Case for Shorter Queries, and Helping Users Create Them," Center for Intelligent Information Retrieval, Department of Computer Science, University of Massachusetts Amherst, Amherst, MA, 2006.

Croft, W., Cronen-Townsend, S., and Lavrenko, V., "Relevance Feedback and Personalization: A Language Modeling Perspective," 2001, Computer Science Department, University of Massachusetts, Amherst, MA.

Cronen-Townsend, S. and Croft, W., "Quantifying Query Ambiguity," Center for Intelligent Information Retrieval, Department of Computer Science, University of Massachusetts, Amherst, MA, HLT '02, 2002.

Turpin, A. and Hersh, W., "Do Clarity Scores for Queries Correlate with User Performance?," Australian Computer Society, Inc., Fifteenth Australasian Database Conference, Dunedin, New Zealand, vol. 27, 2004.

Radhakrishan, R. Xiong, Z., Divakaran, A., Ishikawa, Y, "Generation of Sports Highlights Using a Combination of Supervised & Unsupervised Learning in Audio Domain," Mitsubishi Electric Research Labs, Cambridge, MA, 2003, p. 1-5.

Yom-Tov, E., Fine, S., Carmel, D., Darlow, A., Amitay, E., "Juru at TREC 2004: Experiments with Predication of Query Difficulty," IBM Rafia Research Labs, University Campus, Haifa Israel.

Cronen-Townsend, S., Zhou, Y., and Croft, W., "A Language Modeling Framework for Selective Query Expansion," Center for Intelligent Information Retrieval, Department of Computer Science, University of Massachusetts, Amherst, MA, 2004.

Yom-Tov, E., Fine, S., Carmel, D., Darlow, A., "Learning to Estimate Query Difficulty," IBM Haifa Research Labs, Haifa, Israel, SIGIR '05, Aug. 15-19, 2005, pp. 512-519.

Vinay, V., Cox, I., Milic-Frayling, N., Wood, K., "On Ranking the Effectiveness of Searches," SIGIR '06, Aug. 6-11, 2006, Seattle, Washington.

Nottelmann, H. and Fuhr, N., "Evaluating Different Methods of Estimating Retrieval Quality for Resource Selection," Insititute of Informatics and Interactive Systems, University of Duisburg-Essen, Germany, SIGIR '03, Jul. 28-Aug. 1, 2003, Toronto, Canada, pp. 290-297.

Cronen-Townsend, S., Zhou, Y., and Croft, W., "Predicting Query Performance," Center for Intelligent Information Retrieval, Department of Computer Science, University of Massachusetts, Amherst, MA, SIGIR '02, Aug. 11-15, 2002, Tampere, Finland, pp. 299-306.

Gabrilovich, E., Dumais, S., Horvitz, E., "Newsjunkie: Providing Personalized Newsfeeds Via Analysis of Information Novelty," Microsoft Research, WWW2004, May 17-22, 2004, New York, New York, pp. 482-490.

He, B. and Ounis, I., "A Query-Based Pre-Retrieval Model Selection Approach to Information Retrieval," Department of Computing Science, 2004, University of Glasgow, Glasgow G12 8QQ, United Kingdom.

Cronen-Townsend, S., Zhou, Y., Croft., W., "Precision Prediction Based on Ranked List Coherence," University of Massachusetts, Amherst, MA, Jul. 5, 2005, pp. 1-41.

MacDonald, C., He, B., Ounis, I., "Predicting Query Performance in Intranet Search," University of Glasgow, Galsgow, G12 8QQ, U.K., ACM SIGIR '05 Query Prediction Workshop, Aug. 19, 2005, Salvador, Brazil.

Amati, G., Carpineto, C., and Romano, G., "Query Difficulty, Robustness and Selective Application of Query Expansion," Fondazione Ugo Bordoni, Rome Italy. 2004.

He, B., and Ounis, I., "Query Performance Prediction," Department of Computing Science, University of Glasgow, Glasgow G12 8QQ, United Kingdom, May 30, 2005.

Zhou, Y., and Croft, W., "Ranking Robustness: A Novel Framework to Predict Query Performance," Department of Computer Science, University of Massachusetts, Amherst, CIKM '06, Nov. 5-11, 2006, Arlington, Virginia.

Belkin, N., Cole, M., Gwizdka, J., Li, Y., Liu, J., Muresan, G., Roussinov, D., Smith, C., Taylor, A., Yuan, X., "Rutgers Information Interaction Lab at TREC 2005: Trying HARD," The State University of New Jersey Rutgers.

Harman, D., and Buckley, C., "The NRRC Reliable Information Access (RIA) Workshop," SIGIR '04, Jul. 25-29, 2004, Sheffield, South Yorkshire UK, pp. 528-529.

Allan, J., and Raghavan, H., "Using Part-of-Speech Patterns to Reduce Query Ambiguity," Center for Intelligent Information Retrieval, Department of Computer Science, University of Massachusetts, Amherst, MA, SIGIR '02, Aug. 11-15, 2002, Tampere, Finland.

Diaz, F., and Jones, R., "Using Temporal Profiles of Queries for Precision Predication," SIGIR '04, Jul. 25-29, 2004, Sheffield, South Yorkshire, UK.

Carmel, D., Yom-Tov, E., Darlow, A., and Pelleg, D., "What Makes a Query Difficult?" IBM Haifa Research Labs, University Campus, Haifa 31905 Israel, SIGIR '06, Aug. 6-11, 2006, Seattle, Washington, pp. 390-397.

Agichtein, E., and Cucerzan, S., "Predicting Accuracy of Extracting Information From Unstructured Text Collections," Microsoft Research, Text mining Search and Navigation Group, 2005.

Agichtein, E., and Cucerzan, S., "Predicting Extraction Performance Using Context Language Models," Microsoft Research, Redmon,

(56) References Cited

OTHER PUBLICATIONS

WA, SIGIR '05, Workshop on Methodologies and Evaluation of Lexical Cohersion Techniques in Real-World Applications: Beyond Bag of Words (ELECTRA), Aug. 19, 2005, Salvador, Brazil.

Agichtein, E., and Cucerzan, S., "Predicting Accuracy of Extracting Information From Unstructured Text Collections," Microsoft Research, One Microsoft Way, Redmond, WA, CIKM '05, Oct. 31-Nov. 5, 2005, Bremen, Germany, pp. 413-420.

Robertson, S., and Walker, S., "On Relevance Weights with Little Relevance Information," SIGIR '97: Proceedings of the 20$^{th}$ Annual International ACM SIGIR Conference on Research and Development in Information Retrieval, Jul. 27-31, 1997, Philadelphia, PA, http://dblp.uni-trier.de.

He, J., Larson, M., and De Rijke, M., "Using Coherence-Based Measures to Predict Query Difficulty," ISLA, University of Amsterdam, 2008.

Forsyth, Deriving Document Descriptors from Data, 1997, p. 1-28.

Genua, A Cache Primer, Oct. 2004, pp. 1-16.

Office Action dated Mar. 22, 2011, issued in U.S. Appl. No. 12/146,263.

Office Action dated Jun. 11, 2010, issued in U.S. Appl. No. 12/146,161.

Office Action dated May 12, 2011, issued in U.S. Appl. No. 12/146,267.

Office Action dated Apr. 1, 2011, issued in U.S. Appl. No. 12/146,223.

\* cited by examiner

FIG. 18A

Search: *iraq*

| History | | Political Science | | Ancient History | | International Security |
| --- | --- | --- | --- | --- | --- | --- |
| | | | | Culture | Military History | |
| | | | | Middle East | International Relations | |

Search: *iraq*

1990 1991 2002 2003 2004 Administration

Armament, Defense and Military Forces

Atlanta, Ga Atomic Weapons Biological and Chemical Warfare Bush, George W Crime and Criminals Economics Editorial Desk Elections Finances Foreign Desk Hussein, Saddam Industry Profiles International International Relations Iraq Kuwait MIDDLE EAST National Desk officials Presidential Elections (US)

Summary Terrorism The New York Times UNION OF SOVIET SOCIALIST REPUBLICS United Nations

United States Armament and Defense war weapons

*FIG. 18B*

Your search: *storage*

Possible high-salience refinements:

Toys: chests & storage    salience score: 7.186

Category: computers    salience score: 23.141
   salience score: 18.836

FIG. 19

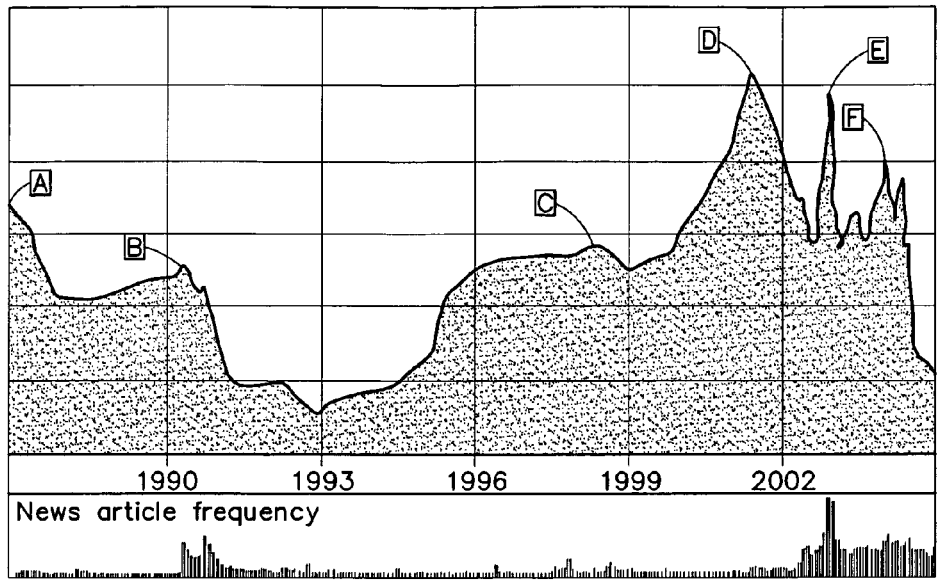

Ⓐ May 9, 1987
Soviet Ship Attacked by Iran in Gulf
Persian Gulf; Iran; tanker ship Ⓑ August 26, 1990
Iraq and Kuwait
Irag; Saudi Arabia; Kuwait; Gulf; oil Ⓒ November 16, 1998
Clinton Accepts Iraq's Promise to Allow Weapons Inspections
Inspectors; Clinton, Bill; Inspections; Biological and Chemical Warfare; United Nations; Iraq Ⓓ October 7, 2001
Military Analysis: Al Qaida in Iraq
attack; Pentagon Building; Afghanistan; World Trade Center; Hijacking; terrorist Ⓔ April 2, 2003
Prisoners of War
soldiers; troops; Biological and Chemical Warfare; Iraq; Atomic weapons Ⓕ May 14, 2004
The Struggle for Iraq: The Whistle-blower
prisoners; soldiers; Abu Ghraib; Prisoners of War; War Crimes; Genocide and Crimes Against Humanity; Iraq Salience curve, frequency histogram, and events for search *IRAQ*

Concept triggers: rule for "winter clothes" is triggered by "parka" search; rule for "shirt" is not

US 8,832,140 B2

SYSTEM AND METHOD FOR MEASURING THE QUALITY OF DOCUMENT SETS

RELATED APPLICATIONS

This application claims priority under 35 U.S.C. §119(e) to U.S. Provisional Application Ser. No. 60/946,310, entitled "System and Method for Measuring the Quality of Document Sets," filed on Jun. 26, 2007, which is herein incorporated by reference in its entirety.

FIELD OF THE INVENTION

This application relates generally to information retrieval systems and, more particularly, to a system and method for processing queries against such systems and systems and methods for communicating the results of queries.

BACKGROUND

Information retrieval systems are known in the art. Such systems generally offer users a variety of means of expressing user intentions through queries. These include text search, parametric search, structured queries, selection from alternatives (i.e., browsing or navigation), and range specification. In general, the systems offer users a means of expressing queries using either a structured language (e.g., a language like SQL) or an informal input mechanism (e.g., an English keyword search). When the input mechanism is informal, the problems of ambiguity may arise from the language itself. But, even when the input mechanism is formal, the user may not always succeed in expressing his or her intention in the formal query language.

Information retrieval systems may use a variety of techniques to determine what information seems most relevant to a user's query. For some queries, the choice of technique is not particularly important: for example, if the user enters a query that is the exact title of a document, most techniques will retrieve that document as the most relevant result. For other queries, the choice of technique can be very significant, as different techniques may differ considerably in the results they return. Unfortunately, it is not always clear how to select the best technique for a particular query.

Given the challenges that information retrieval systems encounter in handling ambiguous queries, a variety of techniques have been proposed for estimating or measuring query ambiguity—that is, the likelihood that a particular query formulation or interpretation will provide meaningful results. Recognizing and measuring query ambiguity is a first step to mitigating these problems. The known techniques for estimating or measuring query ambiguity fall primarily into two general categories: query analysis and results analysis. Generally speaking, query analysis techniques focus on the query itself, and consider factors like query length, query term informativeness, and the tightness of relationships among query terms, while results analysis techniques focus on the results for the query, and consider factors like the distinctiveness or coherence of the results, and the robustness of the results in the face of perturbation of the retrieval model. One such technique is the "query clarity" approach of Cronen-Townsend and Croft, which aims to predict query performance by computing the relative entropy between a query language model and the corresponding collection language model.

SUMMARY

The following describes a technique to calculate the interestingness of a set of records as a salience measure, either absolutely (i.e., compared to the overall collection of records) or relative to some other set of records, and to use the salience measure, among other ways, to guide an information retrieval system user to interesting result sets, as well as interesting result views.

In one embodiment, a method of improving the effectiveness of an information retrieval (IR) system begins by receiving as input a subset of the documents that are stored or indexed by the information retrieval system. The documents are received as input, for example, in one or several ways, e.g.: by matching a search query specified by text, as a result of a structured query specified by an expression, as a result of a similarity search against a specified document or set of documents, or the like. According to the method, a quality of the set of documents is then measured based on their distinctiveness relative to one or more sets of documents from the same information retrieval system; we refer to these the one ore more sets as "baseline". In some embodiments, the baseline set(s) and the set of documents share similar characteristics (e.g., size, concentration of relevance, topicality, or the like). The quality of the set of documents can be measured in one or more ways, although a preferred technique is based on a relative entropy measure. Other approaches to measuring quality may include, for example, normalizing the quality measure in terms of mean and standard deviations, normalizing the quality measure in terms of percentile, adjustment of the sizes of the sets being compared, combinations of one or more such approaches, or other methods. Then, according to a further aspect of the method, a default output of the information retrieval system is then modified based on this quality measure. The modification of the default output also may occur in one of several ways, e.g., reporting the quality measure, suggesting alternative queries that lead to a set of documents with higher quality measure, replacing the default output with an alternative set that has a higher quality measure, or the like. In a representative embodiment, the information retrieval system uses a Boolean retrieval model where, in response to a query, each document in the collection is determined to match or not match. This is not a limitation of the invention, however, as the technique also may be implemented in the context of an information retrieval system in which a ranked retrieval model is used.

The salience measure can be used in an information retrieval system for many purposes, e.g., to guide query interpretation, to guide view selection, to summarize results (e.g., by selection of dimension values that emphasize diversity), to generalize results, to trigger specific rules-based actions (e.g., based on a low or high salience measure), or the like. Additional applications can be based on analyzing changes of the salience measure across a dimension, e.g., clustering of results into groups with similar characteristics, determination of "intelligent range" buckets (based on changes in relative salience), determination of significant events or causative factors (based on changes in salience over time, or on changes in salience over another dimension), or the like. These applications are merely representative.

According to one aspect of the present invention, a method for measuring the distinctiveness of a set is provided. The method comprises acts of analyzing the set to obtain a statistical distribution of at least one identifying characteristic within the set, generating a measurement of distinctiveness for the set based on the statistical distribution of the at least one identifying characteristic, and normalizing the measurement of the distinctiveness of the set. According to one embodiment of the present invention, the set comprises at least one document, wherein the at least one document further comprises a unit of storage of digital data. According to another embodiment of the invention, the at least one document further includes at least one of a data record within a database, textual information, non-textual information, audio files, video files, streaming data, a defined entity, and metadata. According to another embodiment of the invention, the act of normalizing further comprises an act of calculating a mean for an expected statistical distribution of the at least one identifying characteristic. According to another embodiment of the invention, the act of normalizing further comprises an act of calculating a standard deviation for an expected statistical distribution of the at least one identifying characteristic. According to another embodiment of the invention, the method further comprises the acts of determining an expected statistical distribution of the at least one identifying characteristic, generating at least one comparison set, and determining a statistical distribution of at least one identifying characteristic for the comparison set.

According to one embodiment of the present invention, the act of generating at least one comparison set includes an act of generating a randomly selected set from a larger group of set members. Some embodiments of the invention may reduce the size of the measured set using random selection of set members. According to another embodiment of the invention, the size of the at least one comparison set is approximately the same as the size of the measured set. According to another embodiment of the invention, the act of generating at least one comparison set includes an act of generating a subset from the set. According to another embodiment of the invention, the act of generating a subset from the set includes random selection from the set. According to another embodiment of the invention, the method further comprises an act of calculating a percentile ranking, wherein the acts of normalization occurs using the percentile ranking. According to another embodiment of the invention, the act of normalization generates an absolute measure of distinctiveness. According to another embodiment of the invention, the at least one identifying characteristic comprises at least one of at least a portion of: textual information within a document; metadata associated with a document; contextual information associated with a document; non-textual information associated with a document; record information with a database; information associated with a composite entity; and information derivable from a document.

According to one embodiment of the present invention, the at least one identifying characteristic comprises a plurality of identifying characteristics. According to another embodiment of the invention, the method further comprises an act of calculating a statistical distribution for each one of at least one of the identifying characteristic. According to another embodiment of the invention, generating a measurement of distinctiveness for the statistical distribution of the at least one identifying characteristic is calculated independently for each of the plurality of identifying characteristics. According to another embodiment of the invention, the statistical distribution is determined for multiple dimensions. According to another embodiment of the invention, the statistical distribution is determined for a plurality of identifying characteristics. According to another embodiment of the invention, the method further comprises an act of determining at least one value associated with at least one set member. According to another embodiment of the invention, the statistical distribution of at least one identifying characteristic is based on a plurality of the at least one values associated with at least one set member, and wherein the plurality of the at least one values comprise a relation. According to another embodiment of the invention, the statistical distribution of at least one identifying characteristic is based on a pair of values, wherein the pair of values represent a value associated with the presence of the at least one identifying characteristic and a value associated with the absence of the at least one identifying characteristic.

According to one embodiment of the present invention, a presence of the at least one value indicates the presence of the another value. According to another embodiment of the invention, the at least one identifying characteristic comprises at least one facet in a faceted information space. According to another embodiment of the invention, the faceted information space describes document properties. According to another embodiment of the invention, such document properties may belong to a taxonomy or a hierarchy.

According to another embodiment of the invention, the method further comprises an act of generating a representation of the set, wherein the representation of the set is adapted to statistical manipulation. According to another embodiment of the invention, the act of analyzing the set to obtain a statistical distribution further comprises an act of approximating the distribution. According to another embodiment of the invention, the act of approximating the distribution includes an act of employing sampling to calculate the statistical distribution for a set of documents. According to another embodiment of the invention, the act of approximating the distribution includes at least one of the acts of permitting modification of the set without recalculating the distribution, examining similar sets for similar distributions, and using previously analyzed sets to generate a statistical distribution, determining a maximal resolution, and determining a minimum threshold about zero. According to another embodiment of the invention, the act of approximating the distribution includes the act of permitting modification of the set without recalculating the distribution, wherein modification of the set includes at least one of addition of documents, deletion of documents, and modification of existing documents. According to another embodiment of the invention, the method further comprises an act of assigning a weight value associated with at least one set member.

According to one embodiment of the present invention, the act of generating a measurement of the distinctiveness for the set includes an act of accounting for the weight value associated with at least one set member. According to another embodiment of the invention, the method further comprises an act of generating a concentration of relevance for a set. According to another embodiment of the invention, the weight value comprises a relevance score and the method further comprises an act of determining if the relevance score exceeds a threshold. According to another embodiment of the invention, the weight value comprises a relevance score and the method further comprises acts of modeling a distribution of relevance scores for relevant documents and a distribution of scores for less relevant documents, and computing a separation between the modeled distributions. According to another embodiment of the invention, the method further comprises an act of smoothing the statistical distribution of the at least one identifying characteristic within the set. According to another embodiment of the invention, the act of smoothing further comprises an act of perturbing the statistical distribution by at least one value. According to another embodiment of the invention, the at least one value is randomly generated. According to another embodiment of the invention, the act of smoothing further comprises an act of replacing at least one singularity within the statistical distribution with a representative value. According to another embodiment of the invention, the method further comprises an act of truncating the statistical distribution.

According to one embodiment of the present invention, the method further comprises an act of calculating the measurement of distinctiveness with a relative entropy function. According to another embodiment of the invention, the method further comprises an act of calculating the measurement of distinctiveness with at least one function of Kullback-Leibler divergence, Euclidean distance, Manhattan distance, Hellinger distance, diversity difference, cosine difference, Jaccard distance, Jenson-Shannon divergence, and skew divergence. According to another embodiment of the invention, the act of generating the measurement of distinctiveness further comprising acts of determining a similarity measure, and inverting the sense of the similarity measure. According to another embodiment of the invention, the similarity measure is calculated using at least one of Pearson correlation coefficient, Dice coefficient, overlap coefficient, and Lin similarity. According to another embodiment of the invention, the method further comprises an act of displaying the measurement of distinctiveness. According to another embodiment, the method further comprises an act of storing the measurement of distinctiveness.

According to one aspect of the present invention, a computer-readable medium having computer-readable instructions stored thereon that define instructions that, as a result of being executed by a computer, instruct the computer to perform a method for measuring the distinctiveness of a set is provided. The method comprises the acts of analyzing the set to obtain a statistical distribution of at least one identifying characteristic within the set, generating a measurement of distinctiveness for the set based on the statistical distribution of the at least one identifying characteristic, and normalizing the measurement of the distinctiveness of the set. According to one embodiment of the present invention, the set comprises at least one document, wherein the at least one document further comprises a unit of storage of digital data. According to another embodiment of the invention, the at least one document further includes at least one of a data record within a database, textual information, non-textual information, audio files, video files, streaming data, a defined entity, and metadata. According to another embodiment of the invention, the act of normalizing further comprises an act of calculating a mean for an expected statistical distribution of the at least one identifying characteristic. According to another embodiment of the invention, the act of normalizing further comprises an act of calculating a standard deviation of an expected statistical distribution of the at least one identifying characteristic. According to another embodiment of the invention, the method further comprises acts of determining an expected statistical distribution of the at least one identifying characteristic, generating at least one comparison set, and determining a statistical distribution of at least one identifying characteristic for the comparison set.

According to one embodiment of the present invention, the act of generating at least one comparison set includes an act of generating a randomly selected set from a larger group of set members. According to another embodiment of the invention, the size of the at least one comparison set is approximately the same as the size of the measured set. According to another embodiment of the invention, the act of generating at least one comparison set includes an act of generating a subset from the set. According to another embodiment of the invention, the act of generating a subset from the set includes random selection from the set. According to another embodiment of the invention, the method further comprises an act of calculating a percentile ranking, wherein the acts of normalization occurs using the percentile ranking. According to another embodiment of the invention, the act of normalization generates an absolute measure of distinctiveness. According to another embodiment of the invention, the at least one identifying characteristic comprises at least one of at least a portion of: textual information within a document; metadata associated with a document; contextual information associated with a document; non-textual information associated with a document; record information with a database; information associated with a composite entity; and information derivable from a document.

According to one embodiment of the present invention, the at least one identifying characteristic comprises a plurality of identifying characteristics. According to another embodiment of the invention, the computer-readable medium further comprises an act of calculating a statistical distribution for each one of at least one of the identifying characteristics. According to another embodiment of the invention, generating a measurement of distinctiveness for the statistical distribution of the at least one identifying characteristic is calculated independently for each of the plurality of identifying characteristics. According to another embodiment of the invention, the statistical distribution is determined for multiple dimensions. According to another embodiment of the invention, the statistical distribution is determined for a plurality of identifying characteristics. According to another embodiment of the invention, the method further comprises an act of determining at least one value associated with at least one set member. According to another embodiment of the invention, the statistical distribution of at least one identifying characteristic is based on a plurality of the at least one values associated with at least one set member, and wherein the plurality of the at least one values comprise a relation. According to another embodiment of the invention, the statistical distribution of at least one identifying characteristic is based on a pair of values, wherein the pair of values represent a value associated with the presence of the at least one identifying characteristic and a value associated with the absence of the at least one identifying characteristic.

According to one embodiment of the present invention, a presence of the at least one value indicates the presence of the another value. According to another embodiment of the invention, the at least one identifying characteristic comprises at least one facet in a faceted information space. According to another embodiment of the invention, the method further comprises an act of generating a representation of the set, wherein the representation of the set is adapted to statistical manipulation. According to another embodiment of the invention, the act of analyzing the set to obtain a statistical distribution further comprises an act of approximating the distribution. According to another embodiment of the invention, the act of approximating the distribution includes an act of employing sampling to calculate the statistical distribution for a set of documents. According to another embodiment of the invention, the act of approximating the distribution includes at least one of the acts of permitting modification of the set without recalculating the distribution, examining similar sets for similar distributions, and using previously analyzed sets to generate a statistical distribution, determining a maximal resolution, and determining a minimum threshold about zero. According to another embodiment of the invention, the act of approximating the distribution includes the act of permitting modification of the set without recalculating the distribution, wherein modification of the set includes at least one of addition of documents, deletion of documents, and modification of existing documents.

According to one embodiment of the present invention, the method further comprises an act of assigning a weight value associated with at least one set member. According to another embodiment of the invention, the act of generating a measurement of the distinctiveness for the set includes an act of accounting for the weight value associated with at least one set member. According to another embodiment of the invention, the method further comprises an act of generating a concentration of relevance for a set. According to another embodiment of the invention, the weight value comprises a relevance score and the method further comprises an act of determining if the relevance score exceeds a threshold. According to another embodiment of the invention, the weight value comprises a relevance score and the method further comprises acts of modeling a distribution of relevance scores for relevant documents and a distribution of scores for less relevant documents, and computing a separation between the modeled distributions. According to another embodiment of the invention, the method further comprises an act of smoothing the statistical distribution of the at least one identifying characteristic within the set. According to another embodiment of the invention, the act of smoothing further comprises an act of perturbing the statistical distribution by a small random value. According to another embodiment of the invention, the act of smoothing further comprises an act of replacing at least one singularity within the statistical distribution with a representative value.

According to one embodiment of the present invention, the method further comprises an act of truncating the statistical distribution. According to another embodiment of the invention, the method further comprises an act of calculating the measurement of distinctiveness with a relative entropy function. According to another embodiment of the invention, the method further comprises an act of calculating the measurement of distinctiveness with at least one function of Kullback-Leibler divergence, Euclidean distance, Manhattan distance, Hellinger distance, diversity difference, cosine difference, Jaccard distance, Jenson-Shannon divergence, and skew divergence. According to another embodiment of the invention, the act of generating the measurement of distinctiveness further comprising acts of determining a similarity measure, and inverting the sense of the similarity measure. According to another embodiment of the invention, the similarity measure is calculated using at least one of Pearson correlation coefficient, Dice coefficient, overlap coefficient, and Lin similarity.

According to one aspect of the present invention, a system for measuring the distinctiveness of a set is provided. The system comprises an analysis component adapted to obtain a statistical distribution of at least one identifying characteristic within a set, a measurement component adapted to generate a measurement of distinctiveness for the set based on the statistical distribution of the at least one identifying characteristic, and a normalization component adapted to normalize the statistical distribution of the at least one identifying characteristic of the measured set. According to one embodiment of the present invention, the set comprises at least one document, wherein the at least one document further comprises a unit of storage of digital data. According to another embodiment of the invention, the at least one document further includes at least one of a data record within a database, textual information, non-textual information, audio files, video files, streaming data, a defined entity, and metadata. According to another embodiment of the invention, the normalization component is further adapted to calculate a mean for an expected statistical distribution of the at least one identifying characteristic. According to another embodiment of the invention, the normalization component is further adapted to calculate a standard deviation for an expected statistical distribution of the at least one identifying characteristic. According to another embodiment of the invention, the analysis component is further adapted to determine an expected statistical distribution of the at least one identifying characteristic for the set. According to another embodiment of the invention, the system further comprises a generation component adapted to generate at least one comparison set; and wherein the analysis component is further adapted to determine a statistical distribution of at least one identifying characteristic for the comparison set. According to another embodiment of the invention, the measurement component is further adapted to generate a measure of distinctiveness for the at least one comparison set.

According to one embodiment of the present invention, the generation component is further adapted to generate a randomly selected set. According to another embodiment of the invention, the size of the at least one comparison set is approximately the same as the size of the measured set. According to another embodiment of the invention, the generation component is further adapted to generate a subset from the set. According to another embodiment of the invention, generation component is further adapted to randomly select members from the set. According to another embodiment of the invention, the measurement component is further adapted to calculate a percentile ranking. According to another embodiment of the invention, the measurement component is further adapted to generate an absolute measure of distinctiveness. According to another embodiment of the invention, the at least one identifying characteristic comprises at least one of at least a portion of: textual information within a document; metadata associated with a document; contextual information associated with a document; non-textual information associated with a document; record information with a database; information associated with a composite entity; and information derivable from a document. According to another embodiment of the invention, the at least one identifying characteristic comprises a plurality of identifying characteristics. According to another embodiment of the invention, the analysis component is further adapted to calculate a statistical distribution for each one of at least one of the identifying characteristics. According to another embodiment of the invention, the measurement component is further adapted to generate a measure of distinctiveness independently for each of the plurality of identifying characteristics. According to another embodiment of the invention, the statistical distribution is determined for multiple dimensions. According to another embodiment of the invention, the statistical distribution is determined for a plurality of identifying characteristics.

According to one embodiment of the present invention, the system further comprises a correlation component adapted to generate at least one value associated with at least one set member. According to another embodiment of the invention, the statistical distribution of at least one identifying characteristic is further based on a plurality of the at least one value, and wherein the plurality of the at least one values comprises a relation. According to another embodiment of the invention, the statistical distribution of at least one identifying characteristic is based on a pair of values, wherein the pair of values represent a value associated with the presence of the at least one identifying characteristic and a value associated with the absence of the at least one identifying characteristic. According to another embodiment of the invention, a presence of the at least one value indicates the presence of the another value. According to another embodiment of the invention, the at least one identifying characteristic comprises at least one facet in a faceted information space. According to another embodiment of the invention, the system further comprises an approximation component adapted to generate a representation of the set, wherein the representation of the set is adapted to statistical manipulation. According to another embodiment of the invention, the analysis component is further adapted to approximate the distribution. According to another embodiment of the invention, the analysis component is further adapted to sample the set to calculate the statistical distribution for a set of documents.

According to one embodiment of the present invention, the analysis component is further adapted to permit modification of the set without recalculating the distribution, examination of similar sets for similar distributions, use of previously analyzed sets to generate a statistical distribution, determination of a maximal resolution, and determination of a minimum threshold about zero. According to another embodiment of the invention, the analysis component is further adapted to permit modification of the set without recalculating the distribution, wherein modification of the set includes at least one of addition of documents, deletion of documents, and modification of existing documents. According to another embodiment of the invention, the system further comprises a weighting component adapted to assign a weight value associated with at least one set member. According to another embodiment of the invention, the measurement component is further adapted to account for the weight value associated with at least one set member in the measurement of distinctiveness. According to another embodiment of the invention, the weighting component is further adapted to generate a concentration of relevance for a set. According to another embodiment of the invention, the weight value comprises a relevance score, and the weighting component is further adapted to determine if the relevance score exceeds a threshold. According to another embodiment of the invention, the weight value comprises a relevance score and the weighting component is further adapted to generate a model distribution of relevance scores for relevant documents and a distribution of relevance scores for less relevant documents, and to compute a separation between the modeled distributions.

According to one embodiment of the present invention, the system further comprises a smoothing component adapted to smoothing the statistical distribution of the at least one identifying characteristic within the set. According to another embodiment of the invention, the smoothing component is further adapted to perturb the statistical distribution by a small random value. According to another embodiment of the invention, the smoothing component is further adapted to replace at least one singularity within the statistical distribution with a representative value. According to another embodiment of the invention, the smoothing component is further adapted to truncate the statistical distribution. According to another embodiment of the invention, the measurement component is further adapted to calculate the measurement of distinctiveness with a relative entropy function. According to another embodiment of the invention, the measurement component is further adapted to calculate the measurement of distinctiveness with at least one function of Kullback-Leibler divergence, Euclidean distance, Manhattan distance, Hellinger distance, diversity difference, cosine difference, Jaccard distance, Jenson-Shannon divergence, and skew divergence. According to another embodiment of the invention, the measurement component is further adapted to determine a similarity measure, and invert a sense of the similarity measure. According to another embodiment of the invention, the measurement component is further adapted to calculate the similarity measure using at least one of Pearson correlation coefficient, Dice coefficient, overlap coefficient, and Lin similarity.

According to one aspect of the present invention, a method for comparing the distinctiveness of a plurality of sets within a collection of information is provided. The method comprises the acts of sampling, randomly, at least one set, determining a statistical distribution of at least one identifying characteristic associated with elements of the at least one set, generating a relative measurement of distinctiveness based on the statistical distributions of the at least one identifying characteristic associated with the elements of the at least one set and another set. According to one embodiment of the present invention, the act of sampling occurs against a result returned from the collection of information. According to another embodiment of the invention, the act of sampling, randomly, the at least one set further comprises an act of generating a sampled set of substantially same size as the another set. According to another embodiment of the invention, the at least one sampled set is the same size as the another set. According to another embodiment of the invention, the act of generating the at least one sampled set of substantially the same size includes reducing the size of the at least one set. According to another embodiment of the invention, the act of generating the at least one sampled set includes increasing the size of at least one sampled set. According to another embodiment of the invention, the at least one sampled set is derived from the whole of the set. According to another embodiment of the invention, the at least one set comprises at least one document, wherein the at least one document further comprises a unit of storage of digital data. According to another embodiment of the invention, the at least one document further includes at least one of a data record within a database, textual information, non-textual information, audio files, video files, streaming data, a defined entity, and metadata. According to another embodiment of the invention, the at least one identifying characteristic comprises at least one of at least a portion of: textual information within a document; metadata associated with a document; contextual information associated with a document; non-textual information associated with a document; record information with a database; information associated with a composite entity; and information derivable from a document.

According to one embodiment of the present invention, the at least one identifying characteristic comprises a plurality of identifying characteristics. According to another embodiment of the invention, the method further comprises an act of calculating a statistical distribution for each one of at least one of the identifying characteristic. According to another embodiment of the invention, generating a measurement of distinctiveness for the statistical distribution of the at least one identifying characteristic is calculated independently for each of the plurality of identifying characteristics. According to another embodiment of the invention, the statistical distribution is determined against multiple dimensions. According to another embodiment of the invention, the method further comprises an act of determining at least one value associated with at least one set member. According to another embodiment of the invention, the statistical distribution of at least one identifying characteristic is based on a plurality of the at least one values associated with at least one set member, and wherein the plurality of the at least one values comprise a relation. According to another embodiment of the invention, the statistical distribution of at least one identifying characteristic is based on a pair of values, wherein the pair of values represent a value associated with the presence of the at least one identifying characteristic and a value associated with the absence of the at least one identifying characteristic. According to another embodiment of the invention, the at least one value associated with at least one set member, is associated with another value associated with at least one set member.

According to one embodiment of the present invention, a presence of the at least one value indicates the presence of the another value. According to another embodiment of the invention, the at least one identifying characteristic comprises at least one facet associated with a document. According to another embodiment of the invention, the method further comprises an act of generating a representation of the sampled set, wherein the representation of the sampled set is adapted to statistical manipulation. According to another embodiment of the invention, the method further comprises an act of assigning a weight value associated with at least one set member. According to another embodiment of the invention, the act of assigning the weight value associated with at least one set member includes an act of maintaining the associated weight value for corresponding elements of the at least one set. According to another embodiment of the invention, the measurement of distinctiveness is determined from relative entropy of the at least one identifying characteristic. According to another embodiment of the invention, the measurement of distinctiveness is determined from at least one function of: Kullback-Leibler divergence, Euclidean distance, Manhattan distance, Hellinger distance, diversity difference, cosine difference, Jaccard distance, Jenson-Shannon divergence, and skew divergence. According to another embodiment of the invention, the act of generating the measurement of distinctiveness further comprises acts of determining a similarity measure, and inverting the sense of the similarity measure. According to another embodiment of the invention, the similarity measure is calculated using at least one of Pearson correlation coefficient, Dice coefficient, overlap coefficient, and Lin similarity. According to another embodiment of the invention, the method further comprises an act of displaying the measurement of distinctiveness. According to another embodiment, the method further comprises an act of storing the measurement of distinctiveness.

According to one aspect of the present invention, a computer-readable medium having computer-readable instructions stored thereon that define instructions that, as a result of being executed by a computer, instruct the computer to perform a method for comparing the distinctiveness of a plurality of sets generated through interaction with a collection of information is provided. The method comprises the acts of sampling, randomly, at least one set, determining a statistical distribution of at least one identifying characteristic associated with elements of the at least one set, generating a relative measurement of distinctiveness based on the statistical distributions of the at least one identifying characteristic associated with the elements of the at least one set and another set. According to one embodiment of the present invention, the act of sampling occurs against a result returned from the collection of information. According to another embodiment of the invention, the act of sampling, randomly, the at least one set further comprises an act of generating a sampled set of substantially same size as the another set. According to another embodiment of the invention, the at least one sampled set is the same size as the another set. According to another embodiment of the invention, the act of generating the at least one sampled set of substantially the same size includes reducing the size of the at least one set. According to another embodiment of the invention, the act of generating the at least one sampled set includes increasing the size of at least one sampled set. According to another embodiment of the invention, the at least one sampled set is derived from the whole of the set. According to another embodiment of the invention, the at least one set comprises at least one document, wherein the at least one document further comprises a unit of storage of digital data.

According to one embodiment of the present invention, the at least one document further includes at least one of a data record within a database, textual information, non-textual information, audio files, video files, streaming data, a defined entity, and metadata. According to another embodiment of the invention, the at least one identifying characteristic comprises at least one of at least a portion of: textual information within a document; metadata associated with a document; contextual information associated with a document; non-textual information associated with a document; record information with a database; information associated with a composite entity; and information derivable from a document. According to another embodiment of the invention, the at least one identifying characteristic comprises a plurality of identifying characteristics. According to another embodiment of the invention, the method further comprises an act of calculating a statistical distribution for each one of at least one of the identifying characteristics. According to another embodiment of the invention, generating a measurement of distinctiveness for the statistical distribution of the at least one identifying characteristic is calculated independently for each of the plurality of identifying characteristics. According to another embodiment of the invention, the statistical distribution is determined against multiple dimensions. According to another embodiment of the invention, the method further comprises an act of determining at least one value associated with at least one set member.

According to one embodiment of the present invention, the statistical distribution of at least one identifying characteristic is based on a plurality of the at least one values associated with at least one set member, and wherein the plurality of the at least one values comprise a relation. According to another embodiment of the invention, the statistical distribution of at least one identifying characteristic is based on a pair of values, wherein the pair of values represent a value associated with the presence of the at least one identifying characteristic and a value associated with the absence of the at least one identifying characteristic. According to another embodiment of the invention, the at least one value associated with at least one set member is associated with another value associated with at least one set member. According to another embodiment of the invention, a presence of the at least one value indicates the presence of the another value. According to another embodiment of the invention, the at least one identifying characteristic comprises at least one facet associated with a document. According to another embodiment of the invention, the method further comprises an act of generating a representation of the sampled set, wherein the representation of the sampled set is adapted to statistical manipulation. According to another embodiment of the invention, the method further comprises an act of assigning a weight value associated with at least one set member. According to another embodiment of the invention, the act of assigning the weight value associated with at least one set member includes an act of maintaining the associated weight value for corresponding elements of the at least one set.

According to one embodiment of the present invention, the measurement of distinctiveness is determined from relative entropy of the at least one identifying characteristic. According to another embodiment of the invention, the measurement of distinctiveness is determined from at least one function of: Kullback-Leibler divergence, Euclidean distance, Manhattan distance, Hellinger distance, diversity difference, cosine difference, Jaccard distance, Jenson-Shannon divergence, and skew divergence. According to another embodiment of the invention, the method further comprises acts of determining a similarity measure, and inverting the sense of the similarity measure. According to another embodiment of the invention, the similarity measure is calculated using at least one of Pearson correlation coefficient, Dice coefficient, overlap coefficient, and Lin similarity.

According to one aspect of the present invention, a system for comparing the distinctiveness of a plurality of sets generated through interaction with a collection of information is provided. The system comprises a sampling component adapted to randomly sample at least one set, an analysis component adapted to determine a statistical distribution of at least one identifying characteristic associated with elements of the at least one set, a measurement component adapted to determine a relative measurement of distinctiveness based on the statistical distributions of the at least one identifying characteristic associated with the elements of the at least one set and another set. According to one embodiment of the present invention, the sampling component samples against a result returned from the collection of information. According to another embodiment of the invention, the sampling component is further adapted to generate a sampled set of substantially same size as the another set. According to another embodiment of the invention, the sampling component is further adapted to generate a sampled set of the same size as the another set. According to another embodiment of the invention, the sampling component is further adapted to reduce the size of the at least one set. According to another embodiment of the invention, the sampling component is further adapted to increase the size of at least one sampled set. According to another embodiment of the invention, the sampling component is further adapted to derive the sampled set from the whole of the collection of information. According to another embodiment of the invention, the at least one set comprises at least one document, wherein the at least one document further comprises a unit of storage of digital data. According to another embodiment of the invention, the at least one document further includes at least one of a data record within a database, textual information, non-textual information, audio files, video files, streaming data, a defined entity, and metadata.

According to one embodiment of the present invention, the at least one identifying characteristic comprises at least one of at least a portion of: textual information within a document; metadata associated with a document; contextual information associated with a document; non-textual information associated with a document; record information with a database; information associated with a composite entity; and information derivable from a document. According to another embodiment of the invention, the at least one identifying characteristic comprises a plurality of identifying characteristics. According to another embodiment of the invention, the system further comprises an act of calculating a statistical distribution for each one of at least one of the identifying characteristic. According to another embodiment of the invention, the measurement component is further adapted to calculate a measurement of distinctiveness independently for each of the at least one identifying characteristic. According to another embodiment of the invention, the analysis component is further adapted to determine the statistical distribution against a plurality of identifying characteristics. According to another embodiment of the invention, the system further comprises a relation component adapted to determine at least one value associated with at least one set member.

According to one embodiment of the present invention, analysis component is further adapted to determine the statistical distribution of at least one identifying characteristic including a plurality of the at least one values, and wherein the plurality of the at least one values comprise a relation. According to another embodiment of the invention, the analysis component is further adapted to determine the statistical distribution the statistical distribution including a pair of values, wherein the pair of values represent a value associated with the presence of the at least one identifying characteristic and a value associated with the absence of the at least one identifying characteristic. According to another embodiment of the invention, the relation component is further adapted to identify the at least one value associated with at least one set member as associated with another value associated with at least one set member. According to another embodiment of the invention, the relation component is further adapted to identify a presence of the at least one value as indicating the presence of the another value. According to another embodiment of the invention, the at least one identifying characteristic comprises at least one facet associated with a document. According to another embodiment of the invention, the system further comprises a representation component adapted to generate a representation of the sampled set adapted to statistical manipulation. According to another embodiment of the invention, the system further comprises a weighting component adapted to assign a weight value to at least one set member. According to another embodiment of the invention, the weighting component is further adapted to maintain the associated weight value.

According to one embodiment of the present invention, the measurement component is further adapted to determine the measurement of distinctiveness from relative entropy of the at least one identifying characteristic. According to another embodiment of the invention, the measurement component is further adapted to determine the measurement of distinctiveness from at least one function of: Kullback-Leibler divergence, Euclidean distance, Manhattan distance, Hellinger distance, diversity difference, cosine difference, Jaccard distance, Jenson-Shannon divergence, and skew divergence. According to another embodiment of the invention, the measurement component is further adapted to determine a similarity measure, and invert the sense of the similarity measure. According to another embodiment of the invention, the similarity measure is calculated using at least one of Pearson correlation coefficient, Dice coefficient, overlap coefficient, and Lin similarity.

According to one aspect of the present invention, a method for measuring the distinctiveness of a result generated from a collection of information, wherein the result is comprised of elements associated with the collection of information is provided. The method comprises analyzing the result to obtain a statistical distribution of at least one identifying characteristic within the result, generating a measurement of distinctiveness for the result based on the statistical distribution of the at least one identifying characteristic, and comparing the measured statistical distribution against a baseline statistical distribution. According to one embodiment of the present invention, the method further comprises an act of generating an absolute measure of distinctiveness, wherein the act of generating includes a comparison of the statistical distribution of the at least one identifying characteristic against a statistical distribution of the at least one identifying characteristic in the collection of information. According to another embodiment of the invention, the method further comprises an act of determining a baseline statistical distribution for the collection of information for at least one identifying characteristic within the collection of information.

According to one embodiment of the present invention, the method further comprises an act of predetermining the baseline statistical distribution. According to another embodiment of the invention, the baseline statistical distribution further comprises a measurement of distinctiveness for the collection of information based on at least one identifying characteristic. According to another embodiment of the invention, the act of predetermining the baseline statistical distribution includes generating at least one random result within the collection of information. According to another embodiment of the invention, the method further comprises an act of measuring the distinctiveness of the at least one random result to determine the baseline distribution. According to another embodiment of the invention, the method further comprises an act of generating a plurality of random results covering a variety of result set sizes. According to another embodiment of the invention, the predetermined baseline distribution is stored from previous execution of the act of analyzing the result to obtain a statistical distribution of at least one identifying characteristic within the result. According to another embodiment of the invention, the method further comprises the acts of storing the baseline statistical distribution, and retrieving the baseline statistical distribution for comparison. According to another embodiment of the invention, the method further comprises an act of dynamically generating the baseline statistical distribution.

According to one embodiment of the present invention, the baseline statistical distribution further comprises a measurement of distinctiveness for the collection of information based on at least one identifying characteristic. According to another embodiment of the invention, the act of dynamically generating the baseline statistical distribution includes generating at least one random result within the collection of information. According to another embodiment of the invention, the method further comprises an act of measuring the distinctiveness of the at least one random result to determine the baseline distribution. According to another embodiment of the invention, the method further comprises an act of generating the at least one random result based on the size of the result. According to another embodiment of the invention, the method further comprises an act of generating the at least one random result based on the result. According to another embodiment of the invention, the act of generating the at least one random result is based on at least one of a size of the result set, a concentration of relevance of the result set, and a topicality of the result set. According to another embodiment of the invention, the dynamically generated baseline distribution is adapted from previous execution of the act of analyzing the result to obtain a statistical distribution of at least one identifying characteristic within the result. According to another embodiment of the invention, the collection of information comprises a collection of at least one document. According to another embodiment of the invention, the at least one document further comprises a unit of storage of digital data. According to another embodiment of the invention, the at least one document further comprises at least one of a data record, within a database, textual information, non-textual information, audio, video, streaming data, a defined entity, a programmatically defined entity, metadata, and information derived from a document. According to another embodiment of the invention, the result is generated from at least one of a query run against the collection of information, navigation within the collection of information, a search performed on the collection of information, a filter against the collection of information, and data mining operation performed on the collection of information.

According to one embodiment of the present invention, the method further comprises an act of generating a representation of the collection of information, wherein the representation of the collection of information is adapted to statistical manipulation. According to another embodiment of the invention, the representation of the collection of information is used to determine the baseline statistical distribution. According to another embodiment of the invention, the baseline distribution is determined by approximating a statistical distribution for at least one identifying characteristic within the collection of information. According to another embodiment of the invention, the act of approximating the statistical distribution includes an act of employing sampling to calculate the statistical distribution. According to another embodiment of the invention, the act of sampling can be applied to either or both of the baseline set and the set that represents the result.

According to another embodiment of the invention, the act of approximating the statistical distribution includes at least one of the acts of permitting modification of the collection of information without recalculating the distribution, examining similar collections of information for similar distributions, and using previously analysis of the collection of information to generate the baseline statistical distribution. According to another embodiment of the invention, the method further comprises an act of generating a representation of the result, wherein the representation of the result is adapted to statistical manipulation. According to another embodiment of the invention, the representation of the result is used to determine the statistical distribution. According to another embodiment of the invention, the statistical distribution is determined by approximating a statistical distribution for at least one identifying characteristic within the result.

According to another embodiment of the invention, the act of approximating the statistical distribution includes an act of employing sampling to calculate the statistical distribution. According to another embodiment of the invention, the act of approximating the statistical distribution includes at least one of the acts of permitting modification of the result without recalculating the distribution, examining similar results, collections of information for similar distributions, and using previous analysis of at least one result to generate the statistical distribution.

According to one embodiment of the present invention, the act of generating the measurement of distinctiveness further comprises an act of assigning a weight value to at least one member of the collection of information. According to another embodiment of the invention, the method further comprises an act of incorporating a weight value associated with at least member of the collection of information into the act of determining the baseline statistical distribution. According to another embodiment of the invention, the method further comprises an act of incorporating a weight value into the measurement of distinctiveness. According to another embodiment of the invention, the method further comprises an act of incorporating a weight value associated with the at least one identifying characteristic.

According to another embodiment of the invention, the method further comprises an act of smoothing the statistical distribution of the at least one identifying characteristic. According to another embodiment of the invention, the act of smoothing further comprises an act of perturbing the statistical distribution by a random value. According to another embodiment of the invention, the act of smoothing further comprises an act of replacing at least one singularity within the statistical distribution with a representative value. According to another embodiment of the invention, the method further comprises an act of truncating the statistical distribution. According to another embodiment of the invention, the method further comprises an act of calculating the measurement of distinctiveness with a relative entropy function. According to another embodiment of the invention, a measurement of distinctiveness is determined from at least one function of: Kullback-Leibler divergence, Euclidean distance, Manhattan distance, Hellinger distance, diversity difference, cosine difference, Jaccard distance, Jenson-Shannon divergence, and skew divergence. According to another embodiment of the invention, the act of generating a measurement of distinctiveness further comprises acts of determining a similarity measure, and inverting the sense of the similarity measure. According to another embodiment of the invention, the similarity measure is calculated using at least one of Pearson correlation coefficient, Dice coefficient, overlap coefficient, and Lin similarity. According to another embodiment of the invention, the method further comprises an act of displaying the measurement of distinctiveness. According to another embodiment, the method further comprises an act of storing the measurement of distinctiveness.

According to one aspect of the present invention, a computer-readable medium having computer-readable instructions stored thereon that define instructions that, as a result of being executed by a computer, instruct the computer to perform a method measuring the distinctiveness of a result generated from a collection of information, wherein the result is comprised of elements associated with the collection of information is provided. The method comprises the acts of analyzing the result to obtain a statistical distribution of at least one identifying characteristic within the result, generating a measurement of distinctiveness for the result based on the statistical distribution of the at least one identifying characteristic, and comparing the measured statistical distribution against a baseline statistical distribution. According to one embodiment of the present invention, the method further comprises an act of generating an absolute measure of distinctiveness, wherein the act of generating includes a comparison of the statistical distribution of the at least one identifying characteristic against a statistical distribution of the at least one identifying characteristic in the collection of information. According to another embodiment of the invention, the method further comprises an act of determining a baseline statistical distribution for the collection of information for at least one identifying characteristic within the collection of information. According to another embodiment of the invention, the method further comprises an act of predetermining the baseline statistical distribution. According to another embodiment of the invention, the baseline statistical distribution further comprises a measurement of distinctiveness for the collection of information based on at least one identifying characteristic. According to another embodiment of the invention, the act of predetermining the baseline statistical distribution includes generating at least one random result within the collection of information.

According to one embodiment of the present invention, the method further comprises an act of measuring the distinctiveness of the at least one random result to determine the baseline distribution. According to another embodiment of the invention, the method further comprises an act of generating a plurality of random results covering a variety of result set sizes. According to another embodiment of the invention, the predetermined baseline distribution is stored from previous execution of the act of analyzing the result to obtain a statistical distribution of at least one identifying characteristic within the result. According to another embodiment of the invention, the method further comprises the acts of storing the baseline statistical distribution, and retrieving the baseline statistical distribution for comparison. According to another embodiment of the invention, the method further comprises an act of dynamically generating the baseline statistical distribution. According to another embodiment of the invention, the baseline statistical distribution further comprises a measurement of distinctiveness for the collection of information based on at least one identifying characteristic. According to another embodiment of the invention, the act of dynamically generating the baseline statistical distribution includes generating at least one random result within the collection of information. According to another embodiment of the invention, the method further comprises an act of measuring the distinctiveness of the at least one random result to determine the baseline distribution. According to another embodiment of the invention, the method further comprises an act of generating the at least one random result based on the size of the result. According to another embodiment of the invention, the method further comprises an act of generating the at least one random result based on the result. According to another embodiment of the invention, the act of generating the at least one random result is based on at least one of a size of the result set, a concentration of relevance of the result set, and a topicality of the result set.

According to one embodiment of the present invention, the dynamically generated baseline distribution is adapted from previous execution of the act of analyzing the result to obtain a statistical distribution of at least one identifying characteristic within the result. According to another embodiment of the invention, the collection of information comprises a collection of at least one document. According to another embodiment of the invention, the at least one document further comprises a unit of storage of digital data. According to another embodiment of the invention, the at least one document further comprises at least one of a data record, within a database, textual information, non-textual information, audio, video, streaming data, a defined entity, a programmatically defined entity, metadata, and information derived from a document. According to another embodiment of the invention, the result is generated from at least one of a query run against the collection of information, navigation within the collection of information, a search performed on the collection of information, a filter against the collection of information, and data mining operation performed on the collection of information. According to another embodiment of the invention, the method further comprises an act of generating a representation of the collection of information, wherein the representation of the collection of information is adapted to statistical manipulation. According to another embodiment of the invention, the representation of the collection of information is used to determine the baseline statistical distribution. According to another embodiment of the invention, the baseline distribution is determined by approximating a statistical distribution for at least one identifying characteristic within the collection of information.

According to one embodiment of the present invention, the act of approximating the statistical distribution includes an act of employing sampling to calculate the statistical distribution. According to another embodiment of the invention, the act of approximating the statistical distribution includes at least one of the acts of permitting modification of the collection of information without recalculating the distribution, examining similar collections of information for similar distributions, and using previously analysis of the collection of information to generate the baseline statistical distribution. According to another embodiment of the invention, the method further comprises an act of generating a representation of the result, wherein the representation of the result is adapted to statistical manipulation. According to another embodiment of the invention, the representation of the result is used to determine the statistical distribution. According to another embodiment of the invention, the statistical distribution is determined by approximating a statistical distribution for at least one identifying characteristic within the result. According to another embodiment of the invention, the act of approximating the statistical distribution includes an act of employing sampling to calculate the statistical distribution. According to another embodiment of the invention, the act of approximating the statistical distribution includes at least one of the acts of permitting modification of the result without recalculating the distribution, examining similar results, collections of information for similar distributions, and using previous analysis of at least one result to generate the statistical distribution. According to another embodiment of the invention, the act of generating the measurement of distinctiveness further comprises an act of assigning a weight value to at least one member of the collection of information. According to another embodiment of the invention, the method further comprises an act of incorporating a weight value associated with at least member of the collection of information into the act of determining the baseline statistical distribution.

According to one embodiment of the present invention, the method further comprises an act of incorporating a weight value into the measurement of distinctiveness. According to another embodiment of the invention, the method further comprises an act of incorporating a weight value associated with the at least one identifying characteristic. According to another embodiment of the invention, the method further comprises an act of smoothing the statistical distribution of the at least one identifying characteristic. According to another embodiment of the invention, the act of smoothing further comprises an act of perturbing the statistical distribution by a random value. According to another embodiment of the invention, the act of smoothing further comprises an act of replacing at least one singularity within the statistical distribution with a representative value. According to another embodiment of the invention, the method further comprises an act of truncating the statistical distribution. According to another embodiment of the invention, the method further comprises an act of calculating the measurement of distinctiveness with a relative entropy function. According to another embodiment of the invention, a measurement of distinctiveness is determined from at least one function of: Kullback-Leibler divergence, Euclidean distance, Manhattan distance, Hellinger distance, diversity difference, cosine difference, Jaccard distance, Jenson-Shannon divergence, and skew divergence. According to another embodiment of the invention, the act of generating a measurement of distinctiveness further comprises acts of determining a similarity measure, and inverting the sense of the similarity measure. According to another embodiment of the invention, the similarity measure is calculated using at least one of Pearson correlation coefficient, Dice coefficient, overlap coefficient, and Lin similarity.

According to one aspect of the present invention, a system for measuring the distinctiveness of a result generated from a collection of information, wherein the result is comprised of elements associated with the collection of information is provided. The system comprises an analysis component adapted to obtain a statistical distribution of at least one identifying characteristic, a measurement component adapted to generate a measurement of distinctiveness for the result based on the statistical distribution of the at least one identifying characteristic, and a comparison component adapted to compare the measured statistical distribution against a baseline statistical distribution. According to one embodiment of the present invention, the measurement component is further adapted to generating an absolute measure of distinctiveness, and wherein the comparison component is further adapted to compare the statistical distribution of the at least one identifying characteristic against a statistical distribution of the at least one identifying characteristic in the collection of information. According to another embodiment of the invention, the measurement component is further adapted to determine a baseline statistical distribution for the collection of information for at least one identifying characteristic within the collection of information. According to another embodiment of the invention, the system further comprises a storage component adapted to store the baseline statistical distribution. According to another embodiment of the invention, the baseline statistical distribution further comprises a measurement of distinctiveness for the collection of information based on at least one identifying characteristic. According to another embodiment of the invention, the system further comprises a generation component adapted to generate a random result from the collection of information, and wherein the measurement component is further adapted to generate a baseline measurement from the at least one random result. According to another embodiment of the invention, the generation component is further adapted to generate a plurality of random results of a variety of result set sizes.

According to one embodiment of the present invention, the storage component is further adapted to store the measurement of distinctiveness of a result as the baseline distribution. According to another embodiment of the invention, the comparison component is further adapted to retrieve the baseline statistical distribution for comparison. According to another embodiment of the invention, the system further comprises an act of dynamically generating the baseline statistical distribution. According to another embodiment of the invention, the baseline statistical distribution further comprises a measurement of distinctiveness for the collection of information based on at least one identifying characteristic. According to another embodiment of the invention, the act of dynamically generating the baseline statistical distribution includes generating at least one random result within the collection of information. According to another embodiment of the invention, the system further comprises an act of measuring the distinctiveness of the at least one random result to determine the baseline distribution. According to another embodiment of the invention, the system further comprises an act of generating the at least one random result based on the size of the result. According to another embodiment of the invention, the system further comprises an act of generating the at least one random result based on the result. According to another embodiment of the invention, the act of generating the at least one random result is based on at least one of a size of the result set, a concentration of relevance of the result set, and a topicality of the result set. According to another embodiment of the invention, the dynamically generated baseline distribution is adapted from previous execution of the act of analyzing the result to obtain a statistical distribution of at least one identifying characteristic within the result. According to another embodiment of the invention, the collection of information comprises a collection of at least one document. According to another embodiment of the invention, the at least one document further comprises a unit of storage of digital data.

According to one embodiment of the present invention, the at least one document further comprises at least one of a data record, within a database, textual information, non-textual information, audio, video, streaming data, a defined entity, a programmatically defined entity, metadata, and information derived from a document. According to another embodiment of the invention, the result is generated from at least one of a query run against the collection of information, navigation within the collection of information, a search performed on the collection of information, a filter on elements of the collection of information, a ranking of elements of the collection of information, and data mining operation performed on the collection of information. According to another embodiment of the invention, the system further comprises an act of generating a representation of the collection of information, wherein the representation of the collection of information is adapted to statistical manipulation. According to another embodiment of the invention, the representation of the collection of information is used to determine the baseline statistical distribution. According to another embodiment of the invention, the baseline distribution is determined by approximating a statistical distribution for at least one identifying characteristic within the collection of information. According to another embodiment of the invention, the act of approximating the statistical distribution includes an act of employing sampling to calculate the statistical distribution. According to another embodiment of the invention, the act of approximating the statistical distribution includes at least one of the acts of permitting modification of the collection of information without recalculating the distribution, examining similar collections of information for similar distributions, and using previously analysis of the collection of information to generate the baseline statistical distribution.

According to one embodiment of the present invention, the system further comprises an act of generating a representation of the result, wherein the representation of the result is adapted to statistical manipulation. According to another embodiment of the invention, the representation of the result is used to determine the statistical distribution. According to another embodiment of the invention, the statistical distribution is determined by approximating a statistical distribution for at least one identifying characteristic within the result. According to another embodiment of the invention, the act of approximating the statistical distribution includes an act of employing sampling to calculate the statistical distribution. According to another embodiment of the invention, the act of approximating the statistical distribution includes at least one of the acts of permitting modification of the result without recalculating the distribution, examining similar results, collections of information for similar distributions, and using previous analysis of at least one result to generate the statistical distribution. According to another embodiment of the invention, the act of generating the measurement of distinctiveness further comprises an act of assigning a weight value to at least one member of the collection of information. According to another embodiment of the invention, the system further comprises an act of incorporating a weight value associated with at least member of the collection of information into the act of determining the baseline statistical distribution. According to another embodiment of the invention, the system further comprises an act of incorporating a weight value into the measurement of distinctiveness. According to another embodiment of the invention, the system further comprises an act of incorporating a weight value associated with the at least one identifying characteristic.

According to one embodiment of the present invention, the system further comprises an act of smoothing the statistical distribution of the at least one identifying characteristic. According to another embodiment of the invention, the act of smoothing further comprises an act of perturbing the statistical distribution by a random value. According to another embodiment of the invention, the act of smoothing further comprises an act of replacing at least one singularity within the statistical distribution with a representative value. According to another embodiment of the invention, the system further comprises an act of truncating the statistical distribution. According to another embodiment of the invention, the system further comprises an act of calculating the measurement of distinctiveness with a relative entropy function. According to another embodiment of the invention, a measurement of distinctiveness is determined from at least one function of: Kullback-Leibler divergence, Euclidean distance, Manhattan distance, Hellinger distance, diversity difference, cosine difference, Jaccard distance, Jenson-Shannon divergence, and skew divergence. According to another embodiment of the invention, the act of generating a measurement of distinctiveness further comprises acts of determining a similarity measure, and inverting the sense of the similarity measure. According to another embodiment of the invention, the similarity measure is calculated using at least one of Pearson correlation coefficient, Dice coefficient, overlap coefficient, and Lin similarity.

According to one aspect of the present invention, a method for organizing a database is provided. The method comprises analyzing the database for a statistical distribution of at least one identifying characteristic, generating a measurement of distinctiveness based on the statistical distribution of the at least one identifying characteristic, identifying at least one similar group of elements within the database based on the measurement of distinctiveness, generating a descriptor associated with the identified at least one similar group of elements, and organizing the database based on the descriptor. According to one embodiment of the present invention, the method further comprises an act of normalizing the measurement of distinctiveness. According to another embodiment of the invention, the act of analyzing the database further comprises an act of generating at least one subset from the database. According to another embodiment of the invention, the method further comprises an act of manipulating a size of the generated subset within the database. According to another embodiment of the invention, the method further comprises an act of manipulating the size of the analyzed set to correspond to the size of another set. According to another embodiment of the invention, the act of manipulating the size of the analyzed set accounts for noise generated by set size in the measurement of distinctiveness. According to another embodiment of the invention, the method further comprises an act of comparing the statistical distribution of the at least one identifying characteristic against a baseline statistical distribution. According to another embodiment of the invention, the baseline statistical distribution is determined against an incidence of the at least one identifying characteristic within the entire database.

According to one embodiment of the present invention, the baseline statistical distribution is determined against a subset of the database. According to another embodiment of the invention, the method further comprises an act of generating a hierarchy of organization based on the measurement of distinctiveness. According to another embodiment of the invention, the method further comprises an act of identifying a relationship between elements of the database based, at least in part, on the statistical distribution of at least one identifying characteristic. According to another embodiment of the invention, the method further comprises an act of determining a relationship based on at least one identifying characteristic in common, and a measurement of distinctiveness. According to another embodiment of the invention, the relationship identifies at least one of a parent, child, and sibling element within the database. According to another embodiment of the invention, the act of grouping further comprises an act of creating a hierarchy of organization for the plurality of elements within the database based, at least in part, the statistical distribution of the at least one identifying characteristic. According to another embodiment of the invention, the method further comprises an act of updating the hierarchy of organization based on review of the database. According to another embodiment of the invention, review of the database comprises at least one of access to the database, navigation of the database, at least one query run against the database, at least one search in the database, a filtering operation on the database, a ranking operation on the database, and a data mining operation on the database. According to another embodiment of the invention, the method further comprises an act of caching information associated with the measurement of distinctiveness.

According to one embodiment of the present invention, the caching information comprises at least one of age of the measurement of distinctiveness, age of any of the underlying calculations used to generate the measurement of distinctiveness, intermediate computation values, partial computation values, computational expense associated with generation of the measurement of distinctiveness, resource usage to maintain the measurement of distinctiveness, and resource usage to maintain the group. According to another embodiment of the invention, the method further comprises an act of un-associating a group of elements within the database based on the cached information. According to another embodiment of the invention, the method further comprises an act of modifying the at least one descriptor in response to review of the database. According to another embodiment of the invention, review of the database comprises at least one of access to the database, navigation of the database, at least one query run against the database, at least one search in the database, a filtering operation on the database, a ranking operation on the database, and a data mining operation on the database. According to another embodiment of the invention, the method further comprises an act of indexing the database based, at least in part, the at least one descriptor. According to another embodiment of the invention, the at least one identifying characteristic comprises at least one element of review of the database. According to another embodiment of the invention, the acts of generating and grouping are repeated for subsequent review. According to another embodiment of the invention, the method further comprises an act of generating an additional identifying characteristic based on review of the database. According to another embodiment of the invention, the method further comprises an act of generating at least one additional descriptor in response to review of the database. According to another embodiment of the invention, the act of grouping is further based on the at least one additional descriptor. According to another embodiment of the invention, the method further comprises an act of determining the at least one identifying characteristic based on review of the database. According to another embodiment of the invention, review of the database comprises at least one of access to the database, navigation of the database, at least one query run against the database, at least one search in the database, a filtering operation on the database, a ranking operation on the database, and a data mining operation on the database. According to another embodiment of the invention, the method further comprises an act of displaying the database. According to another embodiment, the method further comprises an act of storing the database.

According to one aspect of the present invention, a computer-readable medium having computer-readable instructions stored thereon that define instructions that, as a result of being executed by a computer, instruct the computer to perform a method for organizing a database is provided. The method comprises the acts of analyzing the database for a statistical distribution of at least one identifying characteristic, generating a measurement of distinctiveness based on the statistical distribution of the at least one identifying characteristic, identifying at least one similar group of elements within the database based on the measurement of distinctiveness, generating a descriptor associated with the identified at least one similar group of elements, and organizing the database based on the descriptor. According to one embodiment of the present invention, the method further comprises an act of normalizing the measurement of distinctiveness. According to another embodiment of the invention, the act of analyzing the database further comprises an act of generating at least one subset from the database. According to another embodiment of the invention, the method further comprises an act of manipulating a size of the generated subset within the database. According to another embodiment of the invention, the method further comprises an act of manipulating the size of the analyzed set to correspond to the size of another set. According to another embodiment of the invention, the act of manipulating the size of the analyzed set accounts for noise generated by set size in the measurement of distinctiveness. According to another embodiment of the invention, the method further comprises an act of comparing the statistical distribution of the at least one identifying characteristic against a baseline statistical distribution.

According to one embodiment of the present invention, the baseline statistical distribution is determined against an incidence of the at least one identifying characteristic within the entire database. According to another embodiment of the invention, the baseline statistical distribution is determined against a subset of the database. According to another embodiment of the invention, the method further comprises an act of generating a hierarchy of organization based on the measurement of distinctiveness. According to another embodiment of the invention, the method further comprises an act of identifying a relationship between elements of the database based, at least in part, on the statistical distribution of at least one identifying characteristic. According to another embodiment of the invention, the method further comprises an act of determining a relationship based on at least one identifying characteristics in common, and a measurement of distinctiveness. According to another embodiment of the invention, the relationship identifies at least one of a parent, child, and sibling element within the database. According to another embodiment of the invention, the act of grouping further comprises an act of creating a hierarchy of organization for the plurality of elements within the database based, at least in part, the statistical distribution of the at least one identifying characteristic. According to another embodiment of the invention, the method further comprises an act of updating the hierarchy of organization based on review of the database. According to another embodiment of the invention, review of the database comprises at least one of access to the database, navigation of the database, at least one query run against the database, at least one search in the database, a filtering operation on the database, a ranking operation on the database, and a data mining operation on the database.

According to one embodiment of the present invention, the method further comprises an act of caching information associated with the measurement of distinctiveness. According to another embodiment of the invention, the caching information comprises at least one of age of the measurement of distinctiveness, age of any of the underlying calculations used to generate the measurement of distinctiveness, intermediate computation values, partial computation values, computational expense associated with generation of the measurement of distinctiveness, resource usage to maintain the measurement of distinctiveness, and resource usage to maintain the group. According to another embodiment of the invention, the method further comprises an act of un-associating a group of elements within the database based on the cached information. According to another embodiment of the invention, the method further comprises an act of modifying the at least one descriptor in response to review of the database. According to another embodiment of the invention, review of the database comprises at least one of access to the database, navigation of the database, at least one query run against the database, at least one search in the database, a filtering operation on the database, a ranking operation on the database, and a data mining operation on the database. According to another embodiment of the invention, the method further comprises an act of indexing the database based, at least in part, the at least one descriptor. According to another embodiment of the invention, the at least one identifying characteristic comprises at least one element of review of the database. According to another embodiment of the invention, the acts of generating and grouping are repeated for subsequent review. According to another embodiment of the invention, the method further comprises an act of generating an additional identifying characteristic based on review of the database. According to another embodiment of the invention, the method further comprises an act of generating at least one additional descriptor in response to review of the database.

According to one embodiment of the present invention, the act of grouping is further based on the at least one additional descriptor. According to another embodiment of the invention, the method further comprises an act of determining the at least one identifying characteristic based on review of the database. According to another embodiment of the invention, review of the database comprises at least one of access to the database, navigation of the database, at least one query run against the database, at least one search in the database, a filtering operation on the database, a ranking operation on the database, and a data mining operation on the database.

According to one aspect of the present invention, a system for organizing a database is provided. The system comprises an analysis component adapted to determine a measurement of distinctiveness based on a statistical distribution of at least one identifying characteristic, a generation component adapted to generate a descriptor for at least one element of the database based on the measurement of distinctiveness, and an organization component adapted to group a plurality of elements within the database based on the at least one description. According to one embodiment of the present invention, the system further comprises a normalization component adapted to normalize the measurement of distinctiveness. According to another embodiment of the invention, the analysis component is further adapted to generate at least one subset from the database. According to another embodiment of the invention, the analysis component is further adapted to manipulate a size of the generated subset. According to another embodiment of the invention, the analysis component is further adapted to manipulate the size of the analyzed set to correspond to the size of another set. According to another embodiment of the invention, the analysis component is further adapted to manipulate the size of the analyzed set to account for noise generated by set size in the measurement of distinctiveness. According to another embodiment of the invention, the analysis component is further adapted to compare the statistical distribution of the at least one identifying characteristic against a baseline statistical distribution. According to another embodiment of the invention, the analysis component is further adapted to determine the baseline statistical distribution against an incidence of the at least one identifying characteristic within the database. According to another embodiment of the invention, the analysis component is further adapted to determine the baseline statistical distribution against a subset of the database.

According to one embodiment of the present invention, the organization component is further adapted to generate a hierarchy of organization based on the measurement of distinctiveness. According to another embodiment of the invention, the organization component is further adapted to identify a relationship between elements of the database based, at least in part, on the statistical distribution of at least one identifying characteristic. According to another embodiment of the invention, the organization component is further adapted to determine a relationship based on at least one identifying characteristic in common, and a measurement of distinctiveness. According to another embodiment of the invention, the organization component is further adapted to identify at least one of a parent, child, and sibling element within the database. According to another embodiment of the invention, the organization component is further adapted to create a hierarchy of organization for the plurality of elements within the database. According to another embodiment of the invention, the organization component is further adapted to update the hierarchy of organization based on review of the database. According to another embodiment of the invention, review of the database comprises at least one of access to the database, navigation of the database, at least one query run against the database, at least one search in the database, a filtering operation on the database, a ranking operation on the database, and a data mining operation on the database. According to another embodiment of the invention, the system further comprises a storage component adapted to cache information associated with the measurement of distinctiveness. According to another embodiment of the invention, the caching information comprises at least one of age of the measurement of distinctiveness, age of any of the underlying calculations used to generate the measurement of distinctiveness, intermediate computation values, partial computation values, computational expense associated with generation of the measurement of distinctiveness, resource usage to maintain the measurement of distinctiveness, and resource usage to maintain the group.

According to one embodiment of the present invention, the organization component is further adapted to dissociate a group of elements within the database based on the cached information. According to another embodiment of the invention, the generation component is further adapted to modify the at least one descriptor in response to review of the database. According to another embodiment of the invention, review of the database comprises at least one of access to the database, navigation of the database, at least one query run against the database, at least one search in the database, a filtering operation on the database, a ranking operation on the database, and a data mining operation on the database. According to another embodiment of the invention, the organization component is further adapted to index the database based, at least in part, the at least one descriptor. According to another embodiment of the invention, the at least one identifying characteristic comprises at least one element of review of the database. According to another embodiment of the invention, the analysis component is further adapted to generate an additional identifying characteristic based on review of the database. According to another embodiment of the invention, the generation component is further adapted to generate at least one additional descriptor in response to review of the database. According to another embodiment of the invention, the organization component is further adapted to group based on the at least one additional descriptor. According to another embodiment of the invention, the analysis component is further adapted to determine the at least one identifying characteristic based on review of the database. According to another embodiment of the invention, review of the database comprises at least one of access to the database, navigation of the database, at least one query run against the database, at least one search in the database, a filtering operation on the database, a ranking operation on the database, and a data mining operation on the database.

According to one aspect of the present invention, a method for improving interaction with a collection of information is provided. The method comprises providing an interface for interacting with the collection of information, generating a set of results based, at least in part, on interaction with the collection of information, evaluating the set of results using a measure of the distinctiveness of the set of results, generating at least one candidate set based, at least in part, on the interaction with the collection of information, comparing the measure of distinctiveness of the set of results against a measure of distinctiveness of the at least one candidate set, and outputting a result in response to the act of comparing. According to one embodiment of the present invention, the act of evaluating the set of results further comprises the act of determining the measure of distinctiveness of the set of results against the collection of information as a whole. According to another embodiment of the invention, the act of evaluating the set of results further comprises using a normalized measurement of distinctiveness.

According to another embodiment of the invention, the act of evaluating the set of results further comprises the acts of generating a first sampled set from the set of results. According to another embodiment of the invention, the act of evaluating includes an act of generating a second sampled set from at least one of the collection of information and a previous set of results. According to another embodiment of the invention, the method further comprises the acts of analyzing the first sampled set to obtain a statistical distribution of at least one identifying characteristic within the sampled set, and determining the measurement of distinctiveness relative to the statistical distributions for the sampled set. According to another embodiment, the method further comprises an act of determining the measurement of distinctiveness for the set of results relative to the statistical distributions for the sampled sets. According to another embodiment of the invention, the method further comprises an act of determining the measurement of distinctiveness from a statistical distribution of at least one identifying characteristic in the set of results against a baseline statistical distribution. According to another embodiment of the invention, the baseline statistical distribution is determined against an incidence of the at least one identifying characteristic within the entire collection of information. According to another embodiment of the invention, the baseline statistical distribution is determined against a subset of the collection of information.

According to one embodiment of the present invention, the method further comprises an act of approximating a statistical distribution of at least one identifying characteristic within the set of results. According to another embodiment of the invention, the interaction comprises a query against the collection of information. According to another embodiment of the invention, the interaction comprises at least one of a query against the collection of information, navigation within the collection of information, access to the collection of information, access to the collection of information through a browser, a search, a search entered in a text box. According to another embodiment of the invention, the act of generating the at least one candidate set further comprises an act of modifying the query against the collection of information. According to another embodiment of the invention, the method further comprises an act of outputting the modified query. According to another embodiment of the invention, the method further comprises an act of outputting the set of results from the modified query. According to another embodiment of the invention, the act of evaluating the set of results comprises acts of determining at least one identifying characteristic, and determining the contribution of the at least one identifying characteristic to the measure of distinctiveness. According to another embodiment of the invention, the method further comprises an act of establishing a threshold contribution. According to another embodiment of the invention, the method further comprises an act of eliminating at least one identifying characteristic based on the contribution threshold. According to another embodiment of the invention, the act of modifying the query comprises reformulating the query based on the contribution of the at least one identifying characteristic.

According to one embodiment of the present invention, the act of evaluating further includes using a measurement of distinctiveness for the query modification. According to another embodiment of the invention, the act of reformulating the query is repeated for each identifying characteristic, and the method further comprises an act of generating a candidate set for each reformulation. According to another embodiment of the invention, the method further comprises an act of determining a measurement of distinctiveness for each candidate set. According to another embodiment of the invention, the method further comprises an act of establishing a threshold measurement of distinctiveness. According to another embodiment of the invention, the method further comprises an act of eliminating at least one candidate set based on a comparison of distinctiveness score against the threshold measurement of distinctiveness. According to another embodiment of the invention, a plurality of candidate sets are generated based on the at least one modification to the query, and wherein each candidate set is measured for distinctiveness. According to another embodiment of the invention, the method further comprises an act of comparing the measurement of distinctiveness of each candidate set with at least one other candidate set. According to another embodiment of the invention, the method further comprises an act of eliminating at least one candidate set based on the act of comparing. According to another embodiment of the invention, the act of generating at least one candidate set further comprises an act of interpreting at least one component of the interaction. According to another embodiment of the invention, the interaction comprises a query run against the collection of information.

According to one embodiment of the present invention, the act of interpreting the at least one component of the query generates at least one candidate query. According to another embodiment of the invention, the method further comprises an act of executing the at least one candidate query to produce at least one candidate set. According to another embodiment of the invention, the act of interpreting the at least one component of the query generates a plurality of candidate queries. According to another embodiment of the invention, the method further comprises an act of executing each of the candidate queries to produce at least one additional candidate set. According to another embodiment of the invention, the method further comprises an act of comparing the at least one additional candidate set against the set of results and the candidate set. According to another embodiment of the invention, the method further comprises an act of outputting the interpretations generated by the act of interpreting. According to another embodiment of the invention, the method further comprises an act of receiving a selection of the output interpretations. According to another embodiment of the invention, the act of outputting the result occurs in response to the act of receiving a selection. According to another embodiment of the invention, the method further comprises an act of identifying similar candidate sets based on the act of comparing the measure of distinctiveness. According to another embodiment of the invention, the method further comprises an act of clustering the similar candidates by a measure of distinctiveness among the similar candidates.

According to one embodiment of the present invention, the method further comprises acts of outputting at least one cluster of similar candidates, and receiving a selection of the at least one cluster. According to another embodiment of the invention, the act of outputting the result in response to the act of comparing includes outputting at least one suggestion to improve the query based on the comparison of distinctiveness score. According to another embodiment of the invention, the act of outputting includes outputting a candidate query. According to another embodiment of the invention, the act of outputting includes outputting differences between a submitted query and a candidate query. According to another embodiment of the invention, the method further comprises an act of displaying the candidate query. According to another embodiment of the invention, the act of outputting includes outputting a representation of the set of results and a representation of the at least one candidate set. According to another embodiment of the invention, the method further comprises an act of receiving a selection of one of the representation of the set of results and the representation of the at least one candidate set. According to another embodiment of the invention, the at least one candidate set is generated by an act of generating at least one superset of results as the at least one candidate set. According to another embodiment of the invention, the at least one superset comprises a broader range of elements from the collection of information. According to another embodiment of the invention, the act of comparing further comprises an act of identifying at least one interesting superset based on the distinctiveness measures. According to another embodiment of the invention, the method further comprises acts of generating a plurality of supersets, and clustering the plurality of supersets based on a distinctiveness measure. According to another embodiment of the invention, the method further comprises acts of outputting at least one cluster of the plurality of supersets, and receiving a selection of the at least one cluster. According to another embodiment of the invention, the interaction comprises navigation through the collection of information. According to another embodiment of the invention, the method further comprises an act of redirecting navigation through the collection of information to the at least one candidate set. According to another embodiment of the invention, the method further comprises an act of outputting the at least one candidate set in response to navigation of the collection of information. According to another embodiment of the invention, the method further comprises an act of identifying navigation options in response to comparing the measure of distinctiveness. According to another embodiment of the invention, the act of identifying navigation options includes providing at least one of a visual cue, textual cue, auditory cue, and display within a graphical display.

According to one aspect of the present invention, a computer-readable medium having computer-readable instructions stored thereon that define instructions that, as a result of being executed by a computer, instruct the computer to perform a method for improving interaction with a collection of information is provided. The method comprises the acts of providing an interface for interacting with the collection of information, generating a set of results based, at least in part, on interaction with the collection of information, evaluating the set of results using a measure of the distinctiveness of the set of results, generating at least one candidate set based, at least in part, on the interaction with the collection of information, comparing the measure of distinctiveness of the set of results against a measure of distinctiveness of the at least one candidate set, and outputting a result in response to the act of comparing. According to one embodiment of the present invention, the act of evaluating the set of results further comprises the act of determining the measure of distinctiveness of the set of results against the collection of information as a whole. According to another embodiment of the invention, the act of evaluating the set of results further comprises using a normalized measurement of distinctiveness. According to another embodiment of the invention, the act of evaluating the set of results further comprises the acts of generating a first sampled set from the set of results. According to another embodiment of the invention, the act of evaluating includes an act of generating a second sampled set from at least one of the collection of information and a previous set of results. According to another embodiment of the invention, the method further comprises the acts of analyzing the first sampled set to obtain a statistical distribution of at least one identifying characteristic within the sampled set, and determining the measurement of distinctiveness relative to the statistical distributions for the sampled set. According to another embodiment, the method further comprises an act of determining the measurement of distinctiveness for the set of results relative to the statistical distributions for the sampled sets. According to another embodiment of the invention, the method further comprises an act of determining the measurement of distinctiveness from a statistical distribution of at least one identifying characteristics in the set of results against a baseline statistical distribution. According to another embodiment of the invention, the baseline statistical distribution is determined against an incidence of the at least one identifying characteristic within the entire collection of information.

According to one embodiment of the present invention, the baseline statistical distribution is determined against a subset of the collection of information. According to another embodiment of the invention, the method further comprises an act of approximating a statistical distribution of at least one identifying characteristic within the set of results. According to another embodiment of the invention, the interaction comprises a query against the collection of information. According to another embodiment of the invention, the interaction comprises at least one of a query against the collection of information, navigation within the collection of information, access to the collection of information, access to the collection of information through a browser, a search, a search entered in a text box. According to another embodiment of the invention, the act of generating the at least one candidate set further comprises an act of modifying the query against the collection of information. According to another embodiment of the invention, the method further comprises an act of outputting the modified query. According to another embodiment of the invention, the method further comprises an act of outputting the set of results from the modified query. According to another embodiment of the invention, the act of evaluating the set of results comprises acts of determining at least one identifying characteristic, and determining the contribution of the at least one identifying characteristic to the measure of distinctiveness. According to another embodiment of the invention, the method further comprises an act of establishing a threshold contribution. According to another embodiment of the invention, the method further comprises an act of eliminating at least one identifying characteristic based on the contribution threshold. According to another embodiment of the invention, the act of modifying the query comprises reformulating the query based on the contribution of the at least one identifying characteristic. According to another embodiment of the invention, the act of evaluating further includes using a measurement of distinctiveness for the query modification. According to another embodiment of the invention, the act of reformulating the query is repeated for each identifying characteristic, and the method further comprises an act of generating a candidate set for each reformulation. According to another embodiment of the invention, the method further comprises an act of determining a measurement of distinctiveness for each candidate set. According to another embodiment of the invention, the method further comprises an act of establishing a threshold measurement of distinctiveness.

According to one embodiment of the present invention, the method further comprises an act of eliminating at least one candidate set based on a comparison of distinctiveness score against the threshold measurement of distinctiveness. According to another embodiment of the invention, a plurality of candidate sets are generated based on the at least one modification to the query, and wherein each candidate set is measured for distinctiveness. According to another embodiment of the invention, the method further comprises an act of comparing the measurement of distinctiveness of each candidate set with at least one other candidate set. According to another embodiment of the invention, the method further comprises an act of eliminating at least one candidate set based on the act of comparing. According to another embodiment of the invention, the act of generating at least one candidate set further comprises an act of interpreting at least one component of the interaction. According to another embodiment of the invention, the interaction comprises a query run against the collection of information. According to another embodiment of the invention, the act of interpreting the at least one component of the query generates at least one candidate query. According to another embodiment of the invention, the method further comprises an act of executing the at least one candidate query to produce at least one candidate set. According to another embodiment of the invention, the act of interpreting the at least one component of the query generates a plurality of candidate queries. According to another embodiment of the invention, the method further comprises an act of executing each of the candidate queries to produce at least one additional candidate set. According to another embodiment of the invention, the method further comprises an act of comparing the at least one additional candidate set against the set of results and the candidate set. According to another embodiment of the invention, the method further comprises an act of outputting the interpretations generated by the act of interpreting.

According to one embodiment of the present invention, the method further comprises an act of receiving a selection of the output interpretations. According to another embodiment of the invention, the act of outputting the result occurs in response to the act of receiving a selection. According to another embodiment of the invention, the method further comprises an act of identifying similar candidate sets based on the act of comparing the measure of distinctiveness. According to another embodiment of the invention, the method further comprises an act of clustering the similar candidates by a measure of distinctiveness among the similar candidates. According to another embodiment of the invention, the method further comprises acts of outputting at least one cluster of similar candidates, and receiving a selection of the at least one cluster. According to another embodiment of the invention, the act of outputting the result in response to the act of comparing includes outputting at least one suggestion to improve the query based on the comparison of distinctiveness score. According to another embodiment of the invention, the act of outputting includes outputting a candidate query. According to another embodiment of the invention, the act of outputting includes outputting differences between a submitted query and a candidate query. According to another embodiment of the invention, the method further comprises an act of displaying the candidate query. According to another embodiment of the invention, the act of outputting includes outputting a representation of the set of results and a representation of the at least one candidate set. According to another embodiment of the invention, the method further comprises an act of receiving as selection of one of the representation of the set of results and the representation of the at least one candidate set. According to another embodiment of the invention, the at least one candidate set is generated by an act of generating at least one superset of results as the at least one candidate set.

According to one embodiment of the present invention, the at least one superset comprises a broader range of elements from the collection of information. According to another embodiment of the invention, the act of comparing further comprises an act of identifying at least one interesting superset based on the distinctiveness measures. According to another embodiment of the invention, the method further comprises acts of generating a plurality of supersets, and clustering the plurality of supersets based on a distinctiveness measure. According to another embodiment of the invention, the method further comprises acts of outputting at least one cluster of the plurality of supersets, and receiving a selection of the at least one cluster. According to another embodiment of the invention, the interaction comprises navigation through the collection of information. According to another embodiment of the invention, the method further comprises an act of redirecting navigation through the collection of information to the at least one candidate set. According to another embodiment of the invention, the method further comprises an act of outputting the at least one candidate set in response to navigation of the collection of information. According to another embodiment of the invention, the method further comprises an act of identifying navigation options in response to comparing the measure of distinctiveness. According to another embodiment of the invention, the act of identifying navigation options includes providing at least one of a visual cue, textual cue, auditory cue, and display within a graphical display.

According to one aspect of the present invention, a system for improving interaction with a collection of information is provided. The system comprises an I/O engine adapted to output at least a portion of an interactive display, wherein the I/O engine is further adapted to output at least one option in response to the comparison made by an analysis engine, a data retrieval engine adapted to generate a set of results based, at least in part, on interaction with the collection of information, an analysis engine adapted to evaluate the set of results using a measure of distinctiveness, wherein the analysis engine is further adapted to compare the measure of distinctiveness for the set of results against a measure of distinctiveness of a candidate set, and a generation engine adapted to generate at least one candidate set based, at least in part, on the interaction with the collection of information. According to another embodiment of the invention, the analysis engine is further adapted to determine the measure of distinctiveness of the set of results against the collection of information as a whole. According to another embodiment of the invention, the analysis engine is further adapted to use a normalized measurement of distinctiveness. According to another embodiment of the invention, the analysis engine is further adapted to generate a first sampled set. According to another embodiment of the invention, the analysis engine is further adapted to generate a second sampled set. According to another embodiment of the invention, the analysis engine is further adapted to generate the second sampled set from at least one of the collection of information and a previous set of results. According to another embodiment of the invention, the analysis engine is further adapted to analyze the first sampled set to obtain a statistical distribution of at least one identifying characteristic within the sampled set, and determine a measurement of distinctiveness relative to the statistical distributions for the sampled set. According to another embodiment of the invention, the analysis engine is further adapted to analyze the second sampled set to obtain a statistical distribution of at least one identifying characteristic within the sampled set, and determine a measurement of distinctiveness relative to the statistical distributions for the sampled set. According to another embodiment of the invention, the analysis engine is further adapted to determine the measurement of distinctiveness from a statistical distribution of at least one identifying characteristic in the set of results against a baseline statistical distribution.

According to one embodiment of the present invention, the analysis engine is further adapted to determine the baseline statistical distribution against an incidence of the at least one identifying characteristic within the entire collection of information. According to another embodiment of the invention, the analysis engine is further adapted to determine the baseline statistical distribution against a subset of the collection of information. According to another embodiment of the invention, the analysis engine further comprises an approximation engine adapted to approximate a statistical distribution of at least one identifying characteristic within the set of results. According to another embodiment of the invention, the I/O engine is further adapted to accept a query against the collection of information. According to another embodiment of the invention, the I/O engine is further adapted to accept at least one of a query against the collection of information, navigation within the collection of information, access to the collection of information, access to the collection of information through a browser, a search, a search entered in a text box, a filtering operation on the collection of information, a ranking operation on the collection of information, and a data mining operation. According to another embodiment of the invention, the analysis engine is further adapted to generate at least one candidate set. According to another embodiment of the invention, the analysis engine is further adapted to modify the query against the collection of information. According to another embodiment of the invention, the I/O engine is further adapted to output the modified query. According to another embodiment of the invention, the I/O engine is further adapted to output the set of results from the modified query.

According to another embodiment of the invention, analysis engine is further adapted to determine at least one identifying characteristic, and determine the contribution of the at least one identifying characteristic to the measure of distinctiveness. According to another embodiment of the invention, the system further comprises a management engine adapted to store a threshold contribution.

According to one embodiment of the present invention, the analysis engine is further adapted to eliminate at least one identifying characteristic based on the stored contribution threshold. According to another embodiment of the invention, the system further comprises a reformulation engine adapted to reformulate the query based on the contribution of the at least one identifying characteristic. According to another embodiment of the invention, the analysis engine is further adapted to evaluate a measurement of distinctiveness for a result returned from the query modification. According to another embodiment of the invention, the reformulation engine is further adapted to repeat the reformulation of the query for each identifying characteristic. According to another embodiment of the invention, the analysis engine is further adapted to generate a candidate set for each reformulation. According to another embodiment of the invention, the analysis engine is further adapted to determine a measurement of distinctiveness for each candidate set. According to another embodiment of the invention, the system further comprises a management engine adapted to store a threshold measurement of distinctiveness. According to another embodiment of the invention, the analysis engine is further adapted to eliminate at least one candidate set based on a comparison of distinctiveness score against the threshold measurement of distinctiveness. According to another embodiment of the invention, the generation engine is further adapted to generate a plurality of candidate sets based on the at least one modification to the query, and wherein the analysis engine is further adapted to evaluate each candidate set for distinctiveness. According to another embodiment of the invention, the analysis engine is further adapted to compare the measurement of distinctiveness of each candidate set with at least one other candidate set. According to another embodiment of the invention, the analysis engine is further adapted to eliminate at least one candidate set based on the act of comparing. According to another embodiment of the invention, the generation engine is further adapted to interpret at least one component of the interaction. According to another embodiment of the invention, generation engine is further adapted to generate at least one candidate query. According to another embodiment of the invention, generation engine is further adapted to execute the at least one candidate query to produce at least one candidate set.

According to one embodiment of the present invention, the generation engine is further adapted to generate a plurality of candidate queries. According to another embodiment of the invention, generation engine is further adapted to execute each of the candidate queries to produce at least one additional candidate set. According to another embodiment of the invention, the analysis engine is further adapted to compare the at least one additional candidate set against the set of results and the candidate set. According to another embodiment of the invention, the I/O engine is further adapted to output the interpretations generated by the generation engine. According to another embodiment of the invention, the I/O engine is further adapted to receiving a selection of the output interpretations. According to another embodiment of the invention, the I/O engine is adapted to output the result in response to the act of receiving a selection. According to another embodiment of the invention, the analysis engine is further adapted to identify similar candidate sets based on the act of comparing the measure of distinctiveness. According to another embodiment of the invention, the analysis engine is further adapted to cluster the similar candidates by a measure of distinctiveness among the similar candidates. According to another embodiment of the invention, the I/O engine is further adapted to output at least one cluster of similar candidates, and receive a selection of the at least one cluster. According to another embodiment of the invention, the I/O engine is further adapted to output at least one suggestion to improve the query based on the comparison of distinctiveness score. According to another embodiment of the invention, the I/O engine is further adapted to output a candidate query. According to another embodiment of the invention, the I/O engine is further adapted to output differences between a submitted query and a candidate query.

According to one embodiment of the present invention, the I/O engine is further adapted to display the candidate query. According to another embodiment of the invention, the I/O engine is further adapted to output a representation of the set of results and a representation of the at least one candidate set. According to another embodiment of the invention, the I/O engine is further adapted to receive a selection of one of the representation of the set of results and the representation of the at least one candidate set. According to another embodiment of the invention, generation engine is further adapted to generate at least one superset of results as the at least one candidate set. According to another embodiment of the invention, the at least one superset comprises a broader range of elements from the collection of information. According to another embodiment of the invention, the analysis engine is further adapted to identify at least one interesting superset based on the distinctiveness measures. According to another embodiment of the invention, the generation engine is further adapted to generate a plurality of supersets, wherein the analysis engine is further adapted to cluster the plurality of supersets based on a distinctiveness measure. According to another embodiment of the invention, the I/O engine is further adapted to output at least one cluster of the plurality of supersets and receive a selection of the at least one cluster. According to another embodiment of the invention, the I/O engine is further adapted to accept navigation through the collection of information. According to another embodiment of the invention, the I/O engine is further adapted to redirect navigation through the collection of information to the at least one candidate set. According to another embodiment of the invention, the I/O engine is further adapted to output the at least one candidate set in response to navigation of the collection of information. According to another embodiment of the invention, the I/O engine is further adapted to identify navigation options in response to comparing the measure of distinctiveness. According to another embodiment of the invention, the I/O engine is further adapted to provide at least one of a visual cue, textual cue, auditory cue, and display within a graphical display.

According to one aspect of the present invention, a computer implemented method for presenting a view of a result obtained from interaction with a collection of information is provided. The method comprises the acts of determining at least one identifying characteristic within at least one result set returned from interaction with a collection of information, determining a statistical distribution of the at least one identifying characteristic within the at least one result set, modifying the at least one result set based on the statistical distribution of the at least one identifying characteristic, and returning the modified result set. According to one embodiment of the present invention, the method further comprises an act of approximating the statistical distribution of at least one identifying characteristic within the at least one result set. According to another embodiment of the invention, the method further comprises an act of generating a measurement of distinctiveness for the at least one result set based on the statistical distribution of the at least one identifying characteristic. According to another embodiment of the invention, the act of modifying is further based on the measurement of distinctiveness. According to another embodiment of the invention, the act of generating a measurement of distinctiveness includes an act of assigning a weight value associated with at least one element of the at least one result set. According to another embodiment of the invention, the method further comprises an act of generating the measure of distinctiveness of the result set against the collection of information. According to another embodiment of the invention, the act of generating a measurement of distinctiveness for the at least one result further comprises an act of using a normalized measurement of distinctiveness. According to another embodiment of the invention, the act of generating a measurement of distinctiveness further comprises the act of generating a first sampled set from the result set.

According to one embodiment of the present invention, the method further comprises the acts of analyzing the first sampled set to obtain a statistical distribution of the at least one identifying characteristic within the first sampled set, and determining the measurement of distinctiveness for the result set relative to the statistical distributions for the first set. According to another embodiment of the invention, the act of determining further comprising an act of comparing the statistical distribution of the at least one identifying characteristic within the first sampled set against another distribution. According to another embodiment of the invention, the another distribution comprises a statistical distribution of at least one identifying characteristic within another set. According to another embodiment of the invention, the another set comprises at least one of the collection of information and a subset of the collection of information. According to another embodiment of the invention, the method further comprises acts of generating a sampled set from the another set, and determining the another distribution from the statistical distribution of the at least one identifying characteristic within the sampled set. According to another embodiment of the invention, the act of generating includes determining the measurement of distinctiveness from a statistical distribution of at least one identifying characteristic in the at least one result set against a baseline statistical distribution. According to another embodiment of the invention, the baseline statistical distribution is determined against an incidence of the at least one identifying characteristic within the entire collection of information. According to another embodiment of the invention, the baseline statistical distribution is determined against an incidence of the at least one identifying characteristic within a subset of the collection of information. According to another embodiment of the invention, the act of modifying the at least one result is further based on determining a contribution of an element of the at least one result to the measure of distinctiveness. According to another embodiment of the invention, the method further comprises an act of highlighting the element.

According to one embodiment of the present invention, the act of highlighting includes altering a visual display of the element, providing an auditory cue, increasing display size of the element, and altering at least one of font, style, and point of the element display. According to another embodiment of the invention, the act of modifying the result includes an act of reducing the volume of information presented from the at least one result. According to another embodiment of the invention, the method further comprises an act of clustering elements within the result set based on the measurement of distinctiveness. According to another embodiment of the invention, the method further comprises an act of identifying representative elements within a cluster of elements. According to another embodiment of the invention, the act of modifying the at least one result set based on the statistical distribution of the at least one identifying characteristic further comprises outputting the result set organized by at least one cluster of elements. According to another embodiment of the invention, the act of modifying the at least one result set based on the statistical distribution of the at least one identifying characteristic further comprises outputting the representative elements within the cluster of elements. According to another embodiment of the invention, the act of modifying the at least one result set based on the statistical distribution of the at least one identifying characteristic further comprises reducing the at least one result set to a set of the representative elements within the cluster of elements. According to another embodiment of the invention, the method further comprises an act of providing for a selection of at least one cluster within the modified result set. According to another embodiment of the invention, the act of modifying further comprises an act of ranking at least one element of the at least one result set. According to another embodiment of the invention, the act of modifying further comprises an act of filtering at least one element of the at least one result set. According to another embodiment of the invention, the ranking further identifies a value of the at least one element against at least one other element of the result set.

According to one embodiment of the present invention, the filtering further identifies a value of the at least one element against at least one other element of the result set. According to another embodiment of the invention, the method further comprises acts of receiving a selection associated with the modified result, and refining the modified result in response to the received selection. According to another embodiment of the invention, the act of refining includes an act of recalculating the measurement of distinctiveness based on the selection. According to another embodiment of the invention, the act of recalculating the measurement of distinctiveness includes an act of modifying a weight value associated with at least one element of the at least one result set. According to another embodiment of the invention, the act of recalculating the measurement of distinctiveness includes an act of eliminating elements from the at least one result set. According to another embodiment of the invention, the selection comprises at least one of a selection of an identifying characteristic within the modified result, selection of a cluster within the modified result, selection of a subset of the modified result, and selection of representative elements within a cluster of elements.

According to one aspect of the present invention, a computer-readable medium having computer-readable instructions stored thereon that define instructions that, as a result of being executed by a computer, instruct the computer to perform a method for presenting a view of a result is provided. The method comprises the acts of determining at least one identifying characteristic within at least one result set returned from interaction with a collection of information, determining a statistical distribution of the at least one identifying characteristic within the at least one result set, modifying the at least one result set based on the statistical distribution of the at least one identifying characteristic, and returning the modified result set.

According to one embodiment of the present invention, the method further comprises an act of approximating the statistical distribution of at least one identifying characteristic within the at least one result set. According to another embodiment of the invention, the method further comprises an act of generating a measurement of distinctiveness for the at least one result set based on the statistical distribution of the at least one identifying characteristic. According to another embodiment of the invention, the act of modifying is further based on the measurement of distinctiveness. According to another embodiment of the invention, the act of generating a measurement of distinctiveness includes an act of assigning a weight value associated with at least one element of the at least one result set. According to another embodiment of the invention, the method further comprises an act of generating the measure of distinctiveness of the result set against the collection of information. According to another embodiment of the invention, the act of generating a measurement of distinctiveness for the at least one result set further comprises using a normalized measurement of distinctiveness.

According to one embodiment of the present invention, the act of generating a measurement of distinctiveness further comprises the act of generating a first sampled set from the result set. According to another embodiment of the invention, the method further comprises the acts of analyzing the first sampled set to obtain a statistical distribution of the at least one identifying characteristic within the first sampled set, and determining the measurement of distinctiveness for the result set relative to the statistical distributions for the first set. According to another embodiment of the invention, the act of determining further comprising an act of comparing the statistical distribution of the at least one identifying characteristic within the first sampled set against another distribution. According to another embodiment of the invention, the another distribution comprises a statistical distribution of at least one identifying characteristic within another set. According to another embodiment of the invention, the another set comprises at least one of the collection of information and a subset of the collection of information. According to another embodiment of the invention, the method further comprises acts of generating a sampled set from the another set, and determining the another distribution from the statistical distribution of the at least one identifying characteristic within the sampled set. According to another embodiment of the invention, the act of generating includes determining the measurement of distinctiveness from a statistical distribution of at least one identifying characteristics in the at least one result set against a baseline statistical distribution. According to another embodiment of the invention, the baseline statistical distribution is determined against an incidence of the at least one identifying characteristic within the entire collection of information. According to another embodiment of the invention, the baseline statistical distribution is determined against an incidence of the at least one identifying characteristic within a subset of the collection of information.

According to one embodiment of the present invention, the act of modifying the at least one result is further based on determining a contribution of an element of the at least one result to the measure of distinctiveness. According to another embodiment of the invention, the method further comprises an act of highlighting the element. According to another embodiment of the invention, the act of highlighting includes altering a visual display of the element, providing an auditory cue, increasing display size of the element, and altering at least one of font, style, and point of the element display. According to another embodiment of the invention, the act of modifying the result includes an act of reducing the volume of information presented from the at least one result. According to another embodiment of the invention, the method further comprises an act of clustering elements within the result set based on the measurement of distinctiveness. According to another embodiment of the invention, the method further comprises an act of identifying representative elements within a cluster of elements. According to another embodiment of the invention, the act of modifying the at least one result set based on the statistical distribution of the at least one identifying characteristic further comprises outputting the result set organized by at least one cluster of elements. According to another embodiment of the invention, the act of modifying the at least one result set based on the statistical distribution of the at least one identifying characteristic further comprises outputting the representative elements within the cluster of elements. According to another embodiment of the invention, the act of modifying the at least one result set based on the statistical distribution of the at least one identifying characteristic further comprises reducing the at least one result set to a set of the representative elements within the cluster of elements. According to another embodiment of the invention, the method further comprises an act of providing for selection of at least one cluster within the modified result set. According to another embodiment of the invention, the act of modifying further comprises an act of ranking at least one element of the at least one result set. According to another embodiment of the invention, the act of modifying further comprises an act of filtering at least one element of the at least one result set. According to another embodiment of the invention, the ranking further identifies a value of the at least one element against at least one other element of the result set. According to another embodiment of the invention, the filtering further identifies a value of the at least one element against at least one other element of the result set.

According to one embodiment of the present invention, the method further comprises acts of receiving a selection associated with the modified result, and refining the modified result in response to the received selection. According to another embodiment of the invention, the act of refining includes an act of recalculating the measurement of distinctiveness based on the selection. According to another embodiment of the invention, the act of recalculating the measurement of distinctiveness includes an act of modifying a weight value associated with at least one element of the at least one result set. According to another embodiment of the invention, the act of recalculating the measurement of distinctiveness includes an act of eliminating elements from the at least one result set. According to another embodiment of the invention, the selection comprises at least one of a selection of an identifying characteristics within the modified result, selection of a cluster within the modified result, selection of a subset of the modified result, and selection of representative elements within a cluster of elements.

According to one aspect of the present invention, a system for presenting an improved view of a result returned from a collection of information is provided. The system comprises an analysis engine adapted to determine at least one identifying characteristic within at least one result, a distinctiveness engine adapted to determine the distinctiveness of a result based on a statistical distribution of the at least one identifying characteristic within the at least one result, and a summarization engine adapted to modify the at least one result based on the determined distinctiveness of the result. According to one embodiment of the present invention, the system further comprises an approximation engine adapted to approximate the statistical distribution of at least one identifying characteristic within the at least one result set. According to another embodiment of the invention, the system further comprises a weighting engine adapted to assign a weight value to at least one element of the at least one result set. According to another embodiment of the invention, the distinctiveness engine is further adapted to generate the measure of distinctiveness of the result set against the collection of information. According to another embodiment of the invention, the system further comprises a normalization engine adapted to normalize the distinctiveness of the result. According to another embodiment of the invention, the system further comprises a generation engine adapted to generate a first sampled set from the result set. According to another embodiment of the invention, the analysis engine is further adapted to analyze the first sampled set to obtain a statistical distribution of the at least one identifying characteristic within the first sampled set, and wherein the distinctiveness engine is further adapted to determine the measurement of distinctiveness for the result set relative to the statistical distributions for the first set. According to another embodiment of the invention, the distinctiveness engine is further adapted to compare the statistical distribution of the at least one identifying characteristic within the first sampled set against another distribution.

According to one embodiment of the present invention, the analysis engine determines the another distribution from a statistical distribution of at least one identifying characteristic within another set. According to another embodiment of the invention, the another set comprises at least one of the collection of information and a subset of the collection of information. According to another embodiment of the invention, the generation engine is further adapted to generate a sampled set from the another set, and determine the another distribution from the statistical distribution of the at least one identifying characteristic within the sampled set. According to another embodiment of the invention, the distinctiveness engine is further adapted to determine the measurement of distinctiveness from a statistical distribution of at least one identifying characteristic in the at least one result set against a baseline statistical distribution. According to another embodiment of the invention, analysis engine is further adapted to determine the baseline statistical distribution against an incidence of the at least one identifying characteristic within the entire collection of information. According to another embodiment of the invention, analysis engine is further adapted to determine the baseline statistical distribution against an incidence of the at least one identifying characteristic within a subset of the collection of information. According to another embodiment of the invention, the summarization engine is further adapted to modify the at least one result based on determining a contribution of an element of the at least one result to the measure of distinctiveness. According to another embodiment of the invention, the system further comprises a display engine adapted to highlight the element. According to another embodiment of the invention, display engine is further adapted to alter a visual display of the element, provide an auditory cue, increase display size of the element, and alter at least one of font, style, and point of the element display. According to another embodiment of the invention, the summarization engine is further adapted to reduce the volume of information presented from the at least one result.

According to one embodiment of the present invention, the summarization engine is further adapted to cluster elements within the result set based on the measurement of distinctiveness. According to another embodiment of the invention, the summarization engine is further adapted to identify representative elements within a cluster of elements. According to another embodiment of the invention, the summarization engine is further adapted to output the result set organized by at least one cluster of elements. According to another embodiment of the invention, the summarization engine is further adapted to output the representative elements within the cluster of elements. According to another embodiment of the invention, the summarization engine is further adapted to reduce the at least one result set to a set of the representative elements within the cluster of elements. According to another embodiment of the invention, the system further comprises an input engine adapted to receive a selection of at least one cluster within the modified result set. According to another embodiment of the invention, the summarization engine is further adapted to rank at least one element of the at least one result set. According to another embodiment of the invention, the summarization engine is further adapted to filter at least one element of the at least one result set According to another embodiment of the invention, the summarization engine is further adapted to identify a value of the at least one element against at least one other element of the result set. According to another embodiment of the invention, the summarization engine is further adapted to identify a value of the at least one element against at least one other element of the result set. According to another embodiment of the invention, the system further comprises an input engine adapted to receive a selection associated with the modified result, and wherein the summarization engine is further adapted to refine the modified result in response to the received selection. According to another embodiment of the invention, the distinctiveness engine is further adapted to recalculate the distinctiveness of the result based on the selection. According to another embodiment of the invention, the distinctiveness engine is further adapted to modify a weight value associated with at least one element of the at least one result set. According to another embodiment of the invention, the distinctiveness engine is further adapted to eliminate elements from the at least one result set. According to another embodiment of the invention, the selection comprises at least one of a selection of an identifying characteristics within the modified result, selection of a cluster within the modified result, selection of a subset of the modified result, and selection of representative elements within a cluster of elements.

According to one aspect of the present invention, a computer implemented method for identifying interesting characteristics within a collection of information is provided. The method comprises the acts of analyzing a collection of information for at least one identifying characteristic, measuring distinctiveness based on a statistical distribution of the at least one identifying characteristic, identifying a variation in the measurement of distinctiveness with respect to at least one additional dimension, grouping at least one element of the collection of information based on the identified variation of the measurement of distinctiveness. According to one embodiment of the present invention, the additional dimension comprises an identifying characteristic within the collection of information subject to linear representation. According to another embodiment of the invention, the method further comprises an act of selecting an identifying characteristic as the at least one additional dimension, based in part, on having a property adapted to partitioning. According to another embodiment of the invention, a value for the identifying characteristics comprises at least one of numerical, spatial, and ordinal values. According to another embodiment of the invention, the additional dimension comprises time. According to another embodiment of the invention, the at least one additional dimension comprises location. According to another embodiment of the invention, the at least one additional dimension comprises at least one of price, quantity, time, and location. According to another embodiment of the invention, the method further comprises an act of generating a partition on the collection of information based on the act of grouping.

According to one embodiment of the present invention, the act of generating the partition on the collection of information includes an act of comparing the measurement of the distinctiveness against a measurement of distinctiveness of another partition. According to another embodiment of the invention, the method further comprises the acts of generating a plurality of partitions, and maximizing the distinctiveness of the plurality of partitions relative to each other. According to another embodiment of the invention, the method further comprises an act of detecting an event based on the act of identifying. According to another embodiment of the invention, the act of detecting an event includes calculation of at least one further distinctiveness measurement. According to another embodiment of the invention, the method further comprises selection of at least one element of the collection of information to represent the detected event. According to another embodiment of the invention, the method further comprises an act of establishing at least one range for the collection of information. According to another embodiment of the invention, the method further comprises an act of refining the at least one range based on a comparison of a measurement of the distinctiveness of another range. According to another embodiment of the invention, the method further comprises an act of organizing the collection of information based on the at least one range. According to another embodiment of the invention, the method further comprises act of adding an additional element to the collection of information, and incorporating the additional element into the established ranges. According to another embodiment of the invention, the method further comprises acts of adding an additional element to the collection of information, and recalculating the established ranges. According to another embodiment of the invention, the method further comprises an act of establishing a plurality of ranges for the collection of information. According to another embodiment of the invention, the method further comprises an act of approximating the statistical distribution of at least one identifying characteristic.

According to one embodiment of the present invention, the act of measuring the distinctiveness includes an act of assigning a weight value associated with at least one identifying characteristic. According to another embodiment of the invention, the act of measuring the distinctiveness includes the measure of distinctiveness of the result set against the collection of information. According to another embodiment of the invention, the method further comprises an act of normalizing the measurement of distinctiveness. According to another embodiment of the invention, the act of measuring the distinctiveness further comprises an act of generating a first sampled set. According to another embodiment of the invention, the method further comprises the acts of analyzing the first sampled set to obtain a statistical distribution of the at least one identifying characteristic within the first sampled set, and determining the measurement of distinctiveness relative to the statistical distributions for the first set. According to another embodiment of the invention, the act of determining further comprising an act of comparing the statistical distribution of the at least one identifying characteristic within the first sampled set against another distribution. According to another embodiment of the invention, the another distribution comprises a statistical distribution of at least one identifying characteristic within another set. According to another embodiment of the invention, the another set comprises at least one of the collection of information and a subset of the collection of information. According to another embodiment of the invention, the method further comprises acts of generating a sampled set from the another set, and determining the another distribution from the statistical distribution of the at least one identifying characteristic within the sampled set. According to another embodiment of the invention, the act of measuring the distinctiveness includes an act of comparing the statistical distribution of at least one identifying characteristic against a baseline statistical distribution.

According to one embodiment of the present invention, the baseline statistical distribution is determined against an incidence of the at least one identifying characteristic within the entire collection of information. According to another embodiment of the invention, the baseline statistical distribution is determined against an incidence of the at least one identifying characteristic within a subset of the collection of information. According to another embodiment of the invention, the method further comprises an act of generating a set of results through interaction with a collection of information. According to another embodiment of the invention, the analysis of the collection of information occurs against the set of results. According to another embodiment of the invention, the act of grouping at least one element of the collection of information based on the identified variation of the measurement of distinctiveness within the set of results.

According to one aspect of the present invention, a computer-readable medium having computer-readable instructions stored thereon that define instructions that, as a result of being executed by a computer, instruct the computer to perform a method for identifying interesting characteristics within a collection of information is provided. The method comprises the acts of analyzing a collection of information for at least one identifying characteristic, measuring distinctiveness based on a statistical distribution of the at least one identifying characteristic, identifying a variation in the measurement of distinctiveness with respect to at least one additional dimension, grouping at least one element of the collection of information based on the identified variation of the measurement of distinctiveness. According to one embodiment of the present invention, the additional dimension comprises an identifying characteristic within the collection of information subject to linear representation. According to another embodiment of the invention, the method further comprises an act of selecting an identifying characteristic as the at least one additional dimension, based in part, on having a property adapted to partitioning. According to another embodiment of the invention, a value for the identifying characteristics comprises at least one of numerical, spatial, and ordinal values. According to another embodiment of the invention, the additional dimension comprises time. According to another embodiment of the invention, the at least one additional dimension comprises location. According to another embodiment of the invention, the at least one additional dimension comprises at least one of price, quantity, time, and location. According to another embodiment of the invention, the method further comprises an act of generating a partition on the collection of information based on the act of grouping. According to another embodiment of the invention, the act of generating the partition on the collection of information includes an act of comparing the measurement of the distinctiveness against a measurement of distinctiveness of another partition. According to another embodiment of the invention, the method further comprises the acts of generating a plurality of partitions, and maximizing the distinctiveness of the plurality of partitions relative to each other. According to another embodiment of the invention, the method further comprises an act of detecting an event based on the act of identifying.

According to one embodiment of the present invention, the act of detecting an event includes calculation of at least one further distinctiveness measurement. According to another embodiment of the invention, the method further comprises selection of at least one element of the collection of information to represent the detected event. According to another embodiment of the invention, the method further comprises an act of establishing at least one range for the collection of information. According to another embodiment of the invention, the method further comprises an act of refining the at least one range based on a comparison of a measurement of the distinctiveness of another range. According to another embodiment of the invention, the method further comprises an act of organizing the collection of information based on the at least one range. According to another embodiment of the invention, the method further comprises act of adding an additional element to the collection of information, and incorporating the additional element into the established ranges. According to another embodiment of the invention, the method further comprises acts of adding an additional element to the collection of information, and recalculating the established ranges. According to another embodiment of the invention, the method further comprises an act of establishing a plurality of ranges for the collection of information. According to another embodiment of the invention, the method further comprises an act of approximating the statistical distribution of at least one identifying characteristic. According to another embodiment of the invention, the act of measuring the distinctiveness includes an act of assigning a weight value associated with at least one identifying characteristic.

According to one embodiment of the present invention, the act of measuring the distinctiveness includes the measure of distinctiveness of the result set against the collection of information. According to another embodiment of the invention, the method further comprises an act of normalizing the measurement of distinctiveness. According to another embodiment of the invention, the act of measuring the distinctiveness further comprises an act of generating a first sampled set. According to another embodiment of the invention, the method further comprises the acts of analyzing the first sampled set to obtain a statistical distribution of the at least one identifying characteristic within the first sampled set, and determining the measurement of distinctiveness relative to the statistical distributions for the first set. According to another embodiment of the invention, the act of determining further comprising an act of comparing the statistical distribution of the at least one identifying characteristic within the first sampled set against another distribution. According to another embodiment of the invention, the another distribution comprises a statistical distribution of at least one identifying characteristic within another set. According to another embodiment of the invention, the another set comprises at least one of the collection of information and a subset of the collection of information. According to another embodiment of the invention, the method further comprises acts of generating a sampled set from the another set, and determining the another distribution from the statistical distribution of the at least one identifying characteristic within the sampled set. According to another embodiment of the invention, the act of measuring the distinctiveness includes an act of comparing the statistical distribution of at least one identifying characteristics against a baseline statistical distribution. According to one embodiment of the present invention, the baseline statistical distribution is determined against an incidence of the at least one identifying characteristic within the entire collection of information. According to another embodiment of the invention, the baseline statistical distribution is determined against an incidence of the at least one identifying characteristic within a subset of the collection of information. According to another embodiment of the invention, the method further comprises an act of generating a set of results through interaction with a collection of information. According to another embodiment of the invention, the analysis of the collection of information occurs against the set of results. According to another embodiment of the invention, the act of grouping the at least one element of the collection of information based on the identified variation of the at least one identifying characteristic occurs against the set of results.

According to one aspect of the present invention, a system for identifying interesting characteristics within a collection of information is provided. The system comprises an analysis engine adapted to determine at least one identifying characteristic within a collection of information, a measurement engine adapted to determine a measurement of distinctiveness based on a statistical distribution of the at least one identifying characteristic, a tracking engine adapted to evaluate the measurement of distinctiveness with respect to an additional dimension, an organization engine adapted to organize at least one element of the collection of information based on a variation of the measurement of distinctiveness over the additional dimension. According to one embodiment of the present invention, the additional dimension comprises an identifying characteristic within the collection of information subject to linear representation. According to another embodiment of the invention, the analysis engine is further adapted to select an identifying characteristic as the at least one additional dimension, based in part, on having a property adapted to partitioning. According to another embodiment of the invention, a value for the identifying characteristic comprises at least one of numerical, spatial, and ordinal values. According to another embodiment of the invention, the additional dimension comprises time. According to another embodiment of the invention, the at least one additional dimension comprises location. According to another embodiment of the invention, the at least one additional dimension comprises at least one of price, quantity, time, and location. According to another embodiment of the invention, the organization engine is further adapted to generate a partition on the collection of information. According to another embodiment of the invention, the organization engine is further adapted to compare the measurement of the distinctiveness against a measurement of distinctiveness of another partition. According to another embodiment of the invention, the organization engine is further adapted to generate a plurality of partitions, and maximize the distinctiveness of the plurality of partitions relative to each other. According to another embodiment of the invention, the system further comprises a detection engine adapted to detect an event based on the act of identifying. According to another embodiment of the invention, the measurement engine is further adapted to calculate at least one other distinctiveness measurement. According to another embodiment of the invention, the detection engine is further adapted to select at least one element of the collection of information to represent the detected event. According to another embodiment of the invention, the organization engine is further adapted to establish at least one range for the collection of information.

According to one embodiment of the present invention, the organization engine is further adapted to refine the at least one range based on a comparison of a measurement of the distinctiveness of another range. According to another embodiment of the invention, the organization engine is further adapted to organize the collection of information based on the at least one range. According to another embodiment of the invention, the system further comprises an input engine adapted to receive an additional element into the collection of information, wherein the organization engine is further adapted to incorporate the additional element into the established ranges. According to another embodiment of the invention, the system further comprises an input engine adapted to receive an additional element into the collection of information, wherein the organization engine is further adapted to recalculate the established ranges. According to another embodiment of the invention, the organization engine is further adapted to establish a plurality of ranges for the collection of information. According to another embodiment of the invention, the system further comprises an approximation engine adapted to approximate the statistical distribution of at least one identifying characteristic. According to another embodiment of the invention, the measurement engine is further adapted to assigning a weight value associated with at least one identifying characteristic. According to another embodiment of the invention, the measurement engine is further adapted to compare the measure of distinctiveness of the result set against the collection of information.

According to one embodiment of the present invention, the system further comprises a normalization engine adapted to normalizing the measurement of distinctiveness. According to another embodiment of the invention, the system further comprises a generation engine adapted to generate a first sampled set. According to another embodiment of the invention, the measurement engine is further adapted to analyze the first sampled set to obtain a statistical distribution of the at least one identifying characteristic within the first sampled set, and determine the measurement of distinctiveness relative to the statistical distributions for the first set. According to another embodiment of the invention, the measurement engine is further adapted to compare the statistical distribution of the at least one identifying characteristic within the first sampled set against another distribution. According to another embodiment of the invention, the another distribution comprises a statistical distribution of at least one identifying characteristic within another set. According to another embodiment of the invention, the another set comprises at least one of the collection of information and a subset of the collection of information. According to another embodiment of the invention, the generation engine is further adapted to generate a sampled set from the another set, and wherein the measurement engine is further adapted to determine the another distribution from the statistical distribution of the at least one identifying characteristic within the sampled set. According to another embodiment of the invention, the measurement engine is further adapted to compare the statistical distribution of at least one identifying characteristic against a baseline statistical distribution. According to another embodiment of the invention, the measurement engine is further adapted to determine the baseline statistical distribution against an incidence of the at least one identifying characteristic within the entire collection of information. According to another embodiment of the invention, the measurement engine is further adapted to determine the baseline statistical distribution against an incidence of the at least one identifying characteristic within a subset of the collection of information. According to another embodiment of the present invention, the system further comprises a results engine adapted to generate a set of results through interaction with a collection of information. According to another embodiment of the invention, the analysis engine is further adapted to analyze the collection of information against the set of results. According to another embodiment of the invention, the organization engine is further adapted to organize the at least one element of the collection of information based on the identified variation of the at least one identifying characteristic within the set of results.

According to one aspect of the present invention, a method for optimizing results returned from interaction with a collection of information is provided. The method comprises the acts of establishing criteria associated with at least one operation on a collection of information, wherein the criteria is based, at least in part, on a measurement of the distinctiveness of a set of results, determining the set of results from interaction with a collection of information, modifying the set of results according to the at least one operation in response to a determination that the set of results matches the criteria, and outputting a modified result. According to one embodiment of the present invention, the method further comprises an act of establishing a rule that comprises the criteria and the at least one operation. According to another embodiment of the invention, the method further comprises an act of establishing additional criteria. According to another embodiment of the invention, the method further comprises an act of establishing additional operations. According to another embodiment of the invention, the method further comprises an act of establishing a plurality of rules. According to another embodiment of the invention, the interaction with the collection of information comprises at least one of a query against the collection of information, a search applied to the collection of information, a search entered in a text box, a filtering operation applied to the collection of information, navigation within the collection of information, access to the collection of information, access to the collection of information through a browser, and a data mining operation. According to another embodiment of the invention, the method further comprises an act of determining a measurement of distinctiveness for the set of results based on a statistical distribution of at least one identifying characteristic within the set of results. According to another embodiment of the invention, the method further comprises an act of determining a measurement of distinctiveness based on a statistical distribution of at least one identifying characteristic within the set of results and a statistical distribution of at least one identifying characteristic within another set.

According to one embodiment of the present invention, the method further comprises an act of generating the another set from the collection of information. According to another embodiment of the invention, the act of generating comprises an act of applying a search operation to the collection of information. According to another embodiment of the invention, the act of generating comprises an act of applying a filtering operation to the collection of information. According to another embodiment of the invention, the another set is associated with the criteria. According to another embodiment of the invention, the method further comprises an act of generating a linear combination of the statistical distributions for the set of results and the another set, and wherein the measurement of distinctiveness is further based on the linear combination. According to another embodiment of the invention, the method further comprises an act of generating a plurality of candidate sets. According to another embodiment of the invention, the act of generating a plurality of candidate sets further comprises an act of varying the linear combination of the statistical distributions for the set of results and the another set. According to another embodiment of the invention, the measurement of distinctiveness is further based on a comparison of statistical distributions of at least one identifying characteristic in the plurality of candidate sets. According to another embodiment of the invention, the act of establishing criteria comprises establishing at least one of a minimum value for the measurement of distinctiveness of the set results, a maximum value for the measurement of distinctiveness, and a range of values for the measurement of distinctiveness. According to another embodiment of the invention, the at least one of the minimum value, the maximum value, and the range of values are relative to another set. According to another embodiment of the invention, the act of modifying the set of results further comprises an act of incorporating at least one additional element from the collection of information. According to another embodiment of the invention, the act of modifying the set of results further comprises an act of performing at least one additional operation. According to another embodiment of the invention, the act of modifying the set of results includes at least one of grouping content within the modified set, sorting content within the modified set, and filtering content within the modified set.

According to one embodiment of the present invention, the act of modifying the set of results includes an act of generating a suggested query. According to another embodiment of the invention, the act of outputting the modified result includes outputting the suggested query. According to another embodiment of the invention, the act of outputting the modified result further comprises an act of displaying the modified result. According to another embodiment of the invention, the method further comprises an act of defining the at least one operation to identify desired content within the collection of information. According to another embodiment of the invention, the method further comprises an act of defining the at least one operation to replace at least one element of the interaction with the collection of information with at least one predefined element. According to another embodiment of the invention, the method further comprises an act of normalizing a measurement of distinctiveness. According to another embodiment of the invention, the method further comprises the acts of modifying a size of at least one set, and determining a measurement of distinctiveness from the at least one modified set. According to another embodiment of the invention, the method further comprises an act of determining a measurement of distinctiveness for at least one set, wherein the measurement of distinctiveness is determined relative to a baseline measure. According to another embodiment of the invention, the method further comprises an act of determining a measurement of distinctiveness for at least one set, wherein the measurement of distinctiveness is determined relative to the collection of information. According to another embodiment of the invention, the method further comprises an act of tracking a state associated with the interaction with the collection of information. According to another embodiment of the invention, the modification of the set of results includes modification of the state associated with the interaction with the collection of information. According to another embodiment of the invention, the method further comprises an act of establishing criteria associated with a state associated with the interaction with the collection of information.

According to one aspect of the present invention, a computer-readable medium having computer-readable instructions stored thereon that define instructions that, as a result of being executed by a computer, instruct the computer to perform a method for optimizing results returned from interaction with a collection of information is provided. The method comprises establishing criteria associated with at least one operation on a collection of information, wherein the criteria is based, at least in part, on a measurement of the distinctiveness of a set of results, determining the set of results from interaction with a collection of information, modifying the set of results according to the at least one operation in response to a determination that the set of results matches the criteria, and outputting a modified result. According to one embodiment of the present invention, the method further comprises an act of establishing a rule that comprises the criteria and the at least one operation. According to another embodiment of the invention, the method further comprises an act of establishing additional criteria. According to another embodiment of the invention, the method further comprises an act of establishing additional operations. According to another embodiment of the invention, the method further comprises an act of establishing a plurality of rules. According to another embodiment of the invention, the interaction with the collection of information comprises at least one of a query against the collection of information, a search applied to the collection of information, a search entered in a text box, a filtering operation applied to the collection of information, navigation within the collection of information, access to the collection of information, access to the collection of information through a browser, and a data mining operation. According to another embodiment of the invention, the method further comprises an act of determining a measurement of distinctiveness for the set of results based on a statistical distribution of at least one identifying characteristic within the set of results. According to another embodiment of the invention, the method further comprises an act of determining a measurement of distinctiveness based on a statistical distribution of at least one identifying characteristic within the set of results and a statistical distribution of at least one identifying characteristic within another set.

According to one embodiment of the present invention, the method further comprises an act of generating the another set from the collection of information. According to another embodiment of the invention, the act of generating comprises an act of applying a search operation to the collection of information. According to another embodiment of the invention, the act of generating comprises an act of applying a filtering operation to the collection of information. According to another embodiment of the invention, the another set is associated with the criteria. According to another embodiment of the invention, the method further comprises an act of generating a linear combination of the statistical distributions for the set of results and the another set, and wherein the measurement of distinctiveness is further based on the linear combination. According to another embodiment of the invention, the method further comprises an act of generating a plurality of candidate sets. According to another embodiment of the invention, the act of generating a plurality of candidate sets further comprises an act of varying the linear combination of the statistical distributions for the set of results and the another set. According to another embodiment of the invention, the measurement of distinctiveness is further based on a comparison of statistical distributions of at least one identifying characteristics in the plurality of candidate sets. According to another embodiment of the invention, the act of establishing criteria comprises establishing at least one of a minimum value for the measurement of distinctiveness of the set results, a maximum value for the measurement of distinctiveness, and a range of values for the measurement of distinctiveness. According to another embodiment of the invention, the at least one of the minimum value, the maximum value, and the range of values are relative to another set.

According to one embodiment of the present invention, the act of modifying the set of results further comprises an act of incorporating at least one additional element from the collection of information. According to another embodiment of the invention, the act of modifying the set of results further comprises an act of performing at least one additional operation. According to another embodiment of the invention, the act of modifying the set of results includes at least one of grouping content within the modified set, sorting content within the modified set, and filtering content within the modified set. According to another embodiment of the invention, the act of modifying the set of results includes an act of generating a suggested query. According to another embodiment of the invention, the act of outputting the modified result includes outputting the suggested query. According to another embodiment of the invention, the act of outputting the modified result further comprises an act of displaying the modified result. According to another embodiment of the invention, the method further comprises an act of defining the at least one operation to identify desired content within the collection of information. According to another embodiment of the invention, the method further comprises an act of defining the at least one operation to replace at least one element of the interaction with the collection of information with at least one predefined element. According to another embodiment of the invention, the method further comprises an act of normalizing a measurement of distinctiveness. According to another embodiment of the invention, the method further comprises the acts of modifying a size of at least one set, and determining a measurement of distinctiveness from the at least one modified set.

According to one embodiment of the present invention, the method further comprises an act of determining a measurement of distinctiveness for at least one set, wherein the measurement of distinctiveness is determined relative to a baseline measure. According to another embodiment of the invention, the method further comprises an act of determining a measurement of distinctiveness for at least one set, wherein the measurement of distinctiveness is determined relative to the collection of information. According to another embodiment of the invention, the method further comprises an act of tracking a state associated with the interaction with the collection of information. According to another embodiment of the invention, the modification of the set of results includes modification of the state associated with the interaction with the collection of information, wherein the modification of the set of results includes modification of a state variable. According to another embodiment of the invention, the method further comprises an act of establishing criteria associated with a state associated with the interaction with the collection of information. According to another embodiment of the invention, the criteria for the trigger are based on a state variable.

According to one aspect of the present invention, a system for optimizing results returned from interaction with a collection of information is provided. The system comprises a rules engine adapted to establish criteria associated with at least one operation on a collection of information, wherein execution of the operation is based on a measurement of the distinctiveness of the set of results, a measurement engine adapted to measure the distinctiveness of a set of results, a retrieval engine adapted to return a set of results from a collection of information in response to interaction with the collection of information, a modification engine adapted to modify the set of results according to the at least one operation in response to a determination that the set of results matches the established criteria, and a output engine adapted to output the modified result. According to one embodiment of the present invention, the rules engine is further adapted to establish a rule that comprises the criteria and the at least one operation. According to another embodiment of the invention, the rules engine is further adapted to establish additional criteria. According to another embodiment of the invention, the rules engine is further adapted to establish additional operations. According to another embodiment of the invention, the rules engine is further adapted to establish a plurality of rules. According to another embodiment of the invention, the system further comprises an input engine adapted to manage interaction with the collection of information, wherein interaction comprises at least one of a query against the collection of information, a search applied to the collection of information, a search entered in a text box, a filtering operation applied to the collection of information, navigation within the collection of information, access to the collection of information, access to the collection of information through a browser, and a data mining operation. According to another embodiment of the invention, the system further comprises an act of determining a measurement of distinctiveness for the set of results based on a statistical distribution of at least one identifying characteristic within the set of results. According to another embodiment of the invention, the measurement engine is further adapted to determine a measurement of distinctiveness based on a statistical distribution of at least one identifying characteristic within the set of results and a statistical distribution of at least one identifying characteristic within another set. According to another embodiment of the invention, the system further comprises a generation engine adapted to generate the another set from the collection of information.

According to one embodiment of the present invention, the generation engine is further adapted to apply a search operation to the collection of information. According to another embodiment of the invention, the generation engine is further adapted to apply a filtering operation to the collection of information. According to another embodiment of the invention, the generation engine is further adapted to generate the another set based on the criteria. According to another embodiment of the invention, the measurement engine is further adapted to generate a linear combination of the statistical distributions for the set of results and the another set, and wherein the measurement of distinctiveness is further based on the linear combination. According to another embodiment of the invention, the system further comprises a candidate generation engine adapted to generate a plurality of candidate sets. According to another embodiment of the invention, the candidate generation engine is further adapted to vary a linear combination of the statistical distributions for the set of results and the another set. According to another embodiment of the invention, the measurement engine is further adapted to compare statistical distributions of at least one identifying characteristic in the plurality of candidate sets. According to another embodiment of the invention, the rules engine is further adapted to establish at least one of a minimum value for the measurement of distinctiveness of the set results, a maximum value for the measurement of distinctiveness, and a range of values for the measurement of distinctiveness. According to another embodiment of the invention, the rules engine is further adapted to establish the at least one of the minimum value, the maximum value, and the range of values relative to another set. According to another embodiment of the invention, the modification engine is further adapted to incorporate at least one additional element from the collection of information. According to another embodiment of the invention, the modification engine is further adapted to perform at least one additional operation.

According to one embodiment of the present invention, the modification engine is further adapted to include at least one of grouping content within the modified set, sorting content within the modified set, and filtering content within the modified set. According to another embodiment of the invention, the modification engine is further adapted to generate a suggested query. According to another embodiment of the invention, the output engine is further adapted to output the suggested query. According to another embodiment of the invention, the output engine is further adapted to display the modified result. According to another embodiment of the invention, the rules engine is further adapted to define the at least one operation to identify desired content within the collection of information. According to another embodiment of the invention, the rules engine is further adapted to define the at least one operation to replace at least one element of the interaction with the collection of information with at least one predefined element. According to another embodiment of the invention, the system further comprises a normalization engine adapted to normalize a measurement of distinctiveness. According to another embodiment of the invention, the system further comprises a sizing engine adapted to modifying a size of at least one set, and wherein the measurement engine is further adapted to determine a measurement of distinctiveness from the at least one modified set. According to another embodiment of the invention, the measurement engine is further adapted to determine a measurement of distinctiveness for at least one set relative to a baseline measure. According to another embodiment of the invention, the measurement engine is further adapted to determine the measurement of distinctiveness relative to the collection of information. According to another embodiment of the invention, the system further comprises a tracking engine adapted to track a state associated with the interaction with the collection of information. According to another embodiment of the invention, the modification engine is further adapted to modify the state associated with the interaction with the collection of information. According to another embodiment of the invention, the rules engine is further adapted to establish criteria associated with a state associated with the interaction with the collection of information.

BRIEF DESCRIPTION OF THE DRAWINGS

The accompanying drawings are not intended to be drawn to scale. In the drawings, each identical or nearly identical component that is shown in various figures is represented by a like numeral. For the purpose of clarity, not every component may be labeled in every drawing. In the drawings:

FIG. 18A illustrates a user interface presenting a summarized view to a user according to one embodiment of the present invention;

FIG. 18B illustrates a user interface presenting a summarized view to a user according to one embodiment of the present invention;

FIG. 19 illustrates a user interface for displaying options regarding query interpretation and guiding according to one embodiment of the present invention;

FIG. 21 illustrates a user display for rendering events detected within a collection of information according to one embodiment of the present invention;

FIG. 22 illustrates a user display for displaying rules and associated triggers according to one embodiment of the present invention;

DETAILED DESCRIPTION

Figure 23:
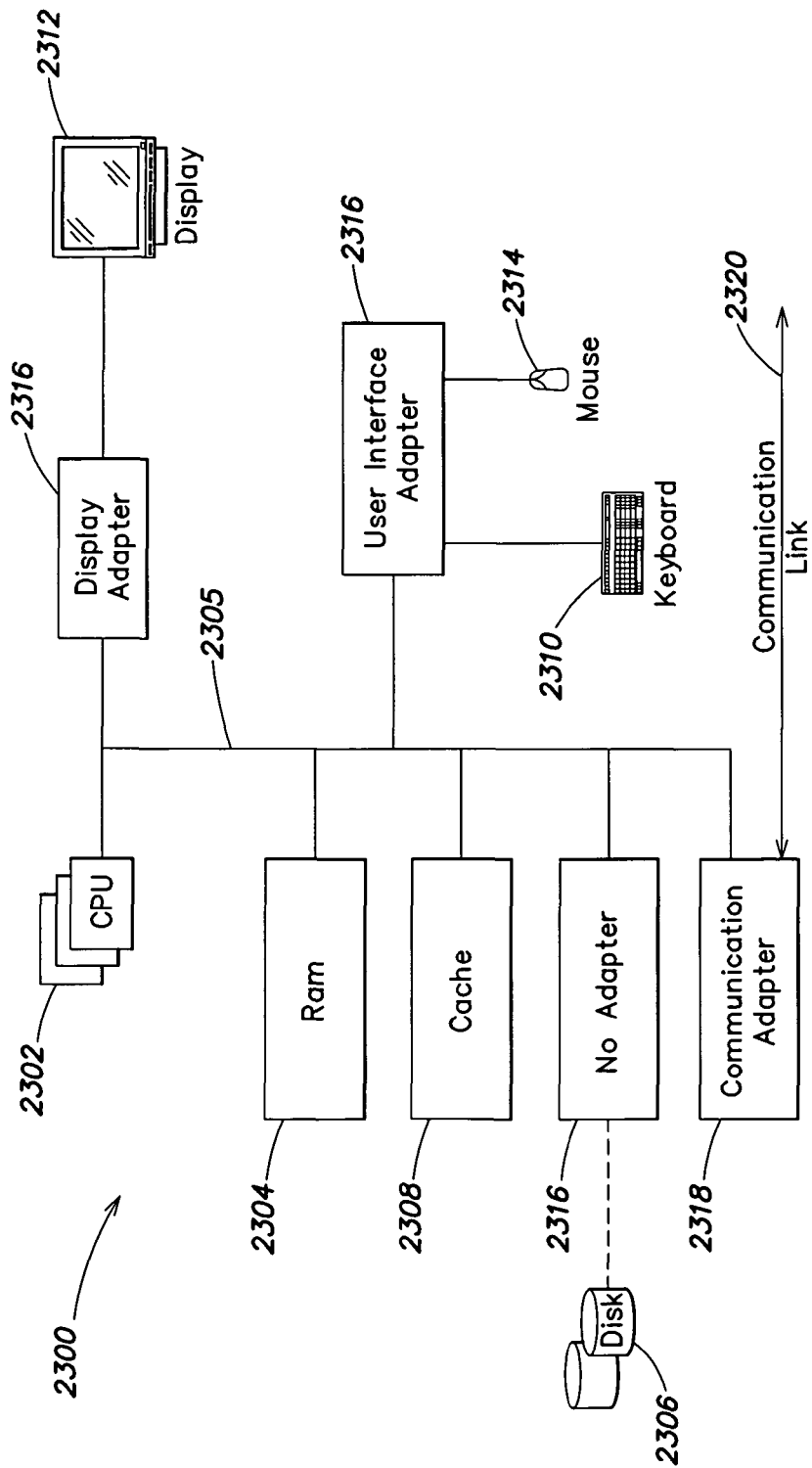
FIG. 23 is a block diagram of a representative information retrieval system in which the subject matter herein may be implemented, comprising a data processing system.

FIG. 23 is a simplified block diagram of a representative information retrieval system on which various aspects of the invention may be implemented. As seen in FIG. 23, a data processing system 2300 suitable for storing and/or executing program code will include at least one processor 2302 coupled directly or indirectly to memory elements through a system bus 2305. The memory elements can include local memory 2304 employed during actual execution of the program code, bulk storage 2306, and cache memories 2308 that provide temporary storage of at least some program code to reduce the number of times code must be retrieved from bulk storage during execution. Input/output or I/O devices (including but not limited to keyboards 2310, displays 2312, pointing devices 2314, etc.) can be coupled to the system either directly or through intervening I/O controllers 2316. Network adapters 2318 may also be coupled to the system to enable the data processing system to become coupled to other data processing systems or devices through intervening private or public networks 2320.

Figure 24:
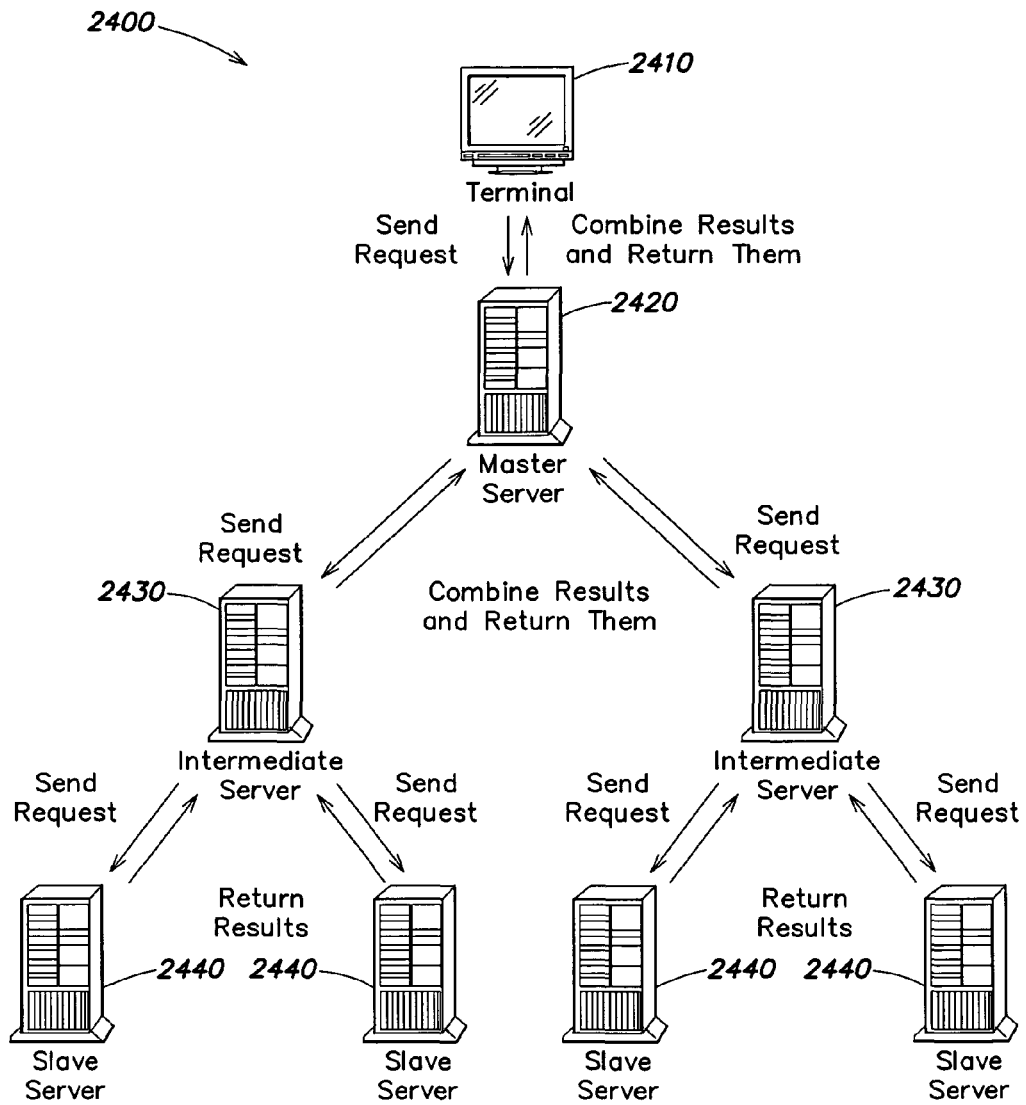
FIG. 24 is a graphical representation of a multi-computer distributed information retrieval system, in which other embodiments of the subject matter herein may be implemented.

In some embodiments, the techniques described herein may task the limitations of a single computational server's resources, and thus it is contemplated that one or more process steps or functions may be distributed onto a set or hierarchy of multiple computational servers. Of course, any other hardware, software, systems, devices and the like may be used. More generally, the subject matter described herein may be implemented with any collection of one or more autonomous computers (together with their associated software, systems, protocols and techniques) linked by a network or networks. A representative implementation may be of the form described in commonly-owned U.S. Publication No. 2002-0051020 and illustrated in FIG. 24. Referring to FIG. 24, system 2400 contains a terminal 2410, that may be used to send a request to a master server 2420, which in turn may send a request to intermediate servers 2430, which are operatively connected to slave servers 2440, for sending requests. The slave servers 2440 return results to the intermediate servers 2430 which return results to the master server 2420. FIG. 24 illustrates one example architecture, one should appreciate that additional layers and/or servers may be employed for distributing workload, computational effort, and storage.

In one particular embodiment, the various aspects of the invention are implemented in a computer-aided search system used for interactive document retrieval and/or summarization.

As is well-known, information retrieval (IR) systems aim to solve the problems associated with searching for information in a collection of documents. Generally, they comprise technologies for searching for documents, as well as searching for metadata that describes documents. It is convenient to think of these documents in the usual sense, i.e., as discrete text files that may also be associated with metadata, such as a name, author, and date of creation. However, documents may also represent other addressable and selectable media, including without loss of generality non-textual data, such as sound and visual recordings, database records, and composite entities such as might be described using HTML and XML encoding. Similarly, although the term "document set" may describe the entire collection of documents available to the information retrieval system, it may be applied equally well to a subset of the whole; for example, all documents permitted to be accessed within a currently active security, privacy or confidentiality regime, or a collection of documents previously selected by the user to be manipulated by the information retrieval system. Thus, both individual documents and collections of documents may take many forms, including file systems, relational databases, hypertext collections (such as the World Wide Web), or the like.

A goal of IR systems is to reduce information overload. IR systems generally serve as an interface between human end users and automatically indexed collections, although it is equally valid to consider such IR systems being controlled by an automated process performing a sequence of actions. Thus, a query may represent a user's interaction with the IR system, or an equivalent operation as performed by an automated process in a so-called "offline" or non-user-interactive mode. The primary effectiveness measure of an IR system is the extent to which it enables users to find relevant or useful information in the collection it has indexed. Many information retrieval (IR) researchers have observed that IR systems perform better on some queries than others. In particular, IR systems struggle with ambiguous queries, because retrieval models generally cannot simultaneously optimize for two or more query interpretations. By identifying and measuring the degree of query ambiguity, a system can inform the overall approach to query processing, thus delivering a more effective user experience.

In one aspect, as described herein the distinctiveness of a set of documents that match a query (i.e., the query results) is used as a measure of query ambiguity. The distinctiveness can be relative to the overall document collection or some other baseline, such as the results of previous query in a context of iterative query reformulation. Compared to measuring ambiguity based on analysis of the query, the techniques described herein have an advantage of being able to leverage unanticipated relationships that are latently expressed by the results of the query. This aspect of the described subject matter is also highly flexible, allowing for distinctiveness to be measured relative to any baseline set of documents.

In another aspect, as described herein similar distinctiveness measures may be applied to document sets drawn from the overall collection by means other than interactive user queries, for example, as part of an offline data mining operation driven by a script.

In one illustrative embodiment, an information entropy measurement is used to determine the quality of an information retrieval system query.

Obtaining a Statistical Distribution from a Set of Documents

To measure the distinctiveness of a set of documents, an embodiment may use a representation of the document set that is amenable to statistical manipulation. In one aspect, a set of documents is analyzed to obtain statistical distributions that can be compared to each other to ascertain the distinctiveness of a set of documents with respect to a baseline distribution. The distribution can be based on document text, metadata (e.g., categories assigned to the document), or any other information derived from the documents. The distribution can be approximate, as long as it is representative of the set of documents. For example, the set of documents can be examined for term or phrase frequency, and that frequency can be used as the statistical distribution model of identifying characteristics for the document set. Term or phrase frequency is one example of an identifying characteristic associated with a set of documents.

While using approximation introduces the risk of approximation error, the efficiency benefits may compensate for that risk by avoiding comprehensive analysis of the document set. Examples of approximate distribution calculation include:
  using sampling to compute the statistical distribution for a set of documents,
  adding a limited number of documents to the initial document set without recomputing the distribution,
  examining similar document sets to provide an expected distribution, in order to bypass analysis of the primary document set.

In one embodiment, the statistical distribution may be univariate; in this case, each document of a set of documents is assigned a value from a set of possible values for that distribution, as well as an associated weight. Specifically, the distribution can be constrained to be a probability distribution by requiring that the sum of weights for the set of documents is equal to 1. For example, in a unigram language model, the values in the distribution are words, and their weights reflect their frequency in the set of documents, as a fraction of the total number of words in the set of documents. In this embodiment, the statistical distribution may be based on correlated values associated with the document.

In another embodiment, the statistical distribution may be multivariate. In this embodiment, the statistical distribution may be based on correlated values associated with the document. Representations of such a distribution may be based on:
  Values represented as n-tuples, or a set of related values. Instead of a single set of values, there may be multiple sets of values. For example, each document may have a subject, a document type, and an author. In that case, there may be a set of values for subjects, a set of values for document types, and a set of values for authors.
  Values represented by both the presence and absence of the value. For example, if a value occurs on 80% of the documents in a set, then the set could have a weight of 0.8 for the presence of the value and a weight of 0.2 for the absence of the value.
  Correlated values. For example, the presence of a specific value might be indicative of the presence or absence of another value.

In yet another embodiment, each document in a set may be associated with a score or weight. For example, in a ranked retrieval model, each of the results for a query may each be associated with a score reflecting that document's estimated relevance to the query. These weights may be incorporated into the procedure for obtaining a distribution for the set of documents, e.g., as coefficients in a weighted sum.

In some embodiments, the choice of a distinctiveness measure, i.e. salience measure, may require or benefit from smoothing of the statistical distribution. For example, salience measures may have singularities for value associated with a weight of zero; this is because such measures often employ mathematical operations such as logarithms and division, and the $\log(x)$ and $1/x$ functions have singularities when $x=0$. To avoid such singularities, and, more generally, to correct salience measures that are poorly behaved in particular regions of the distribution space, weights in the distribution may be smoothed. For example, a weight of 0 may be replaced by a low, but non-zero weight, e.g., typically a weight that is smaller than some or perhaps all of other positive weights occurring in the unsmoothed distribution. Another technique to avoid singularities is to apply a small random perturbation to the distribution. Other smoothing techniques that are known in the art may be used to improve the suitability of statistical distribution as inputs to the salience measure.

Figure 11:
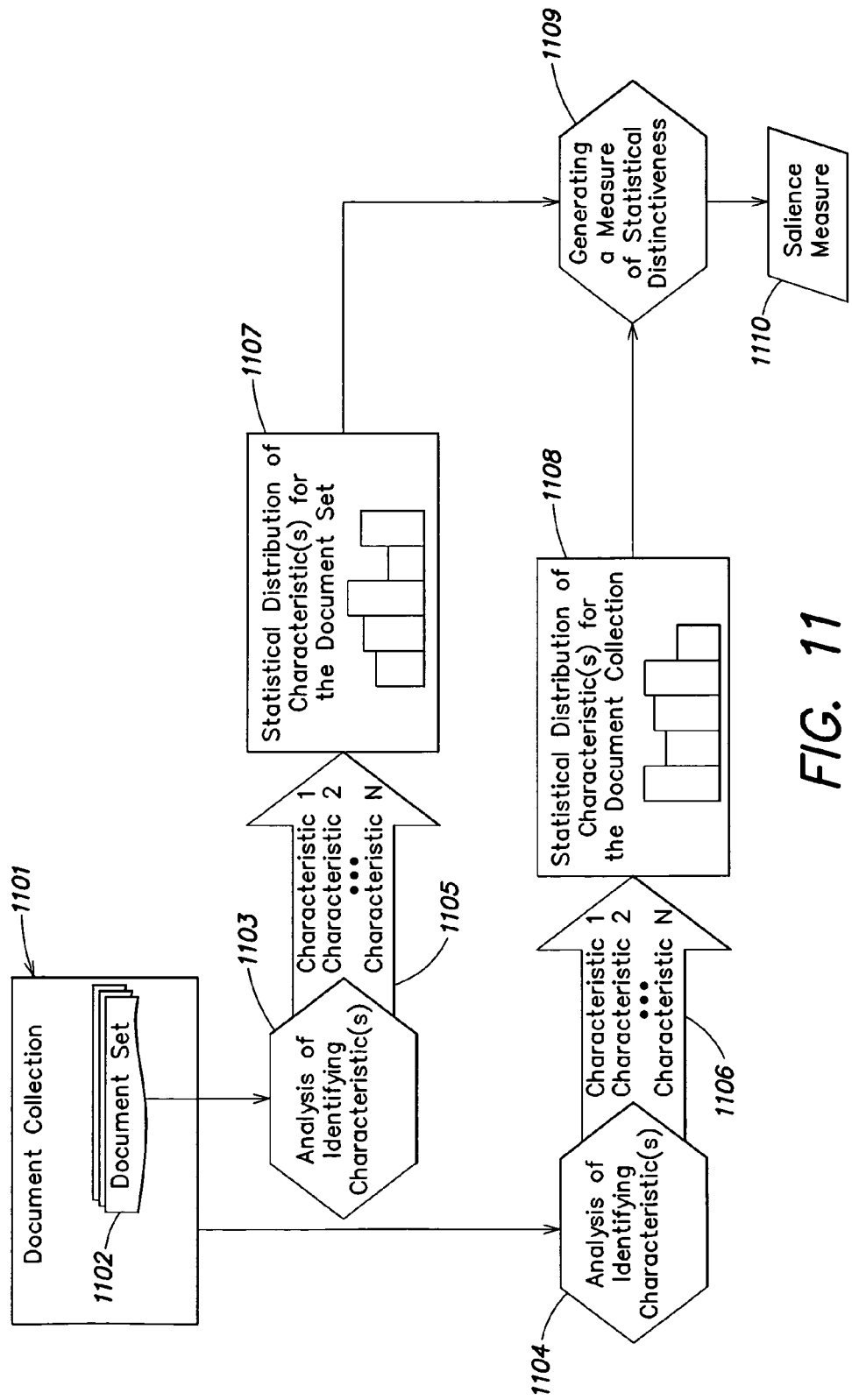
FIG. 11 shows a logical diagram for determining a salience measure according to another embodiment of the present invention.

FIG. 11 illustrates a logical flow for determining a salience measure. A document collection 1101 is analyzed 1104 to determine identifying characteristics, 1106. The identifying characteristic determined depends at least in part on the make up of the set being analyzed. For example, "traditional" documents (with text, author(s), and a subject) have identifying characteristics that may be determined based on the text, the author(s), and the subject of the documents. As another example, identifying characteristics may correspond to keywords in the text of a document, author(s) of documents, the subject of the document, and as a further example an identifying characteristic correspond to any combination thereof.

A document set 1102 from within the document collection is analyzed 1103 to determine its identifying characteristics 1105. A statistical distribution for the identifying characteristics are determined at 1108 for the document collection, and at 1107 for the document subset, to generate a measure of distinctiveness at 1109, i.e. a salience measure 1110.

As shown in FIG. 11, a salience measure may be determined between one set of materials and the collection of materials as a whole. In one embodiment, one document set 1102 is analyzed for identifying characteristics 1103. The document collection 1101 is also analyzed for identifying characteristics 1104. Statistical distributions 1107 and 1108 are made of identifying characteristics 1105 and 1106, and the distributions are then used to generate a measure of statistical distinctiveness 1109, i.e. a salience measure 1110 of distinctiveness between set 1102 and the document collection as a whole 1101. As such a measure is relative to a consistent or unchanging reference, it is often referred to as an "absolute" salience measure. In one example, absolute salience can be thought of as salience of set X relative to the complete collection of documents, or, for simplicity's sake, S(X). The use of absolute measures of distinctiveness is discussed in greater detail below.

Relative Entropy

As noted above, according to one aspect an information entropy measurement is used to determine the quality of an information retrieval system query. Preferably, relative entropy is used as a measure of the distinctiveness of a set of documents relative to a baseline distribution. Relative entropy is also known as information gain, or Kullback-Leibler divergence ($D_{KL}$). Relative entropy is an asymmetric statistical measure that can be applied to any two probability distributions to determine how distinct the first is from the second. Relative entropy may also be turned into a symmetric measure, e.g., by summing or averaging the relative entropies of the two distributions with respect to one another.

For probability distributions P and Q of a discrete random variable the relative entropy of P relative to Q is defined to be:

$$D_{KL}(P\|Q) = \sum_i P(i)\log\frac{P(i)}{Q(i)}$$

In the above, the summation is over all the values i that can be assumed by probability distributions P and Q. When probability distributions P and Q are identical, the relative entropy of P relative to Q is zero. One of ordinary skill will appreciate that the greater the divergence between the distributions, the higher the relative entropy. The logarithm can use any base: decimal, natural, etc. In the examples below, we will use base 2. The log base used is merely exemplary and should not be taken to limit the disclosed subject matter.

Relative entropy is best understood through a concrete example. Consider a population that is 60% male and 40% female. Now, consider a subset of that population that is 80% male and 20% female. The "relative entropy" between the subset distribution and the overall population distribution can then be computed as follows. As noted above, the relative entropy between probability distributions P and Q is defined as:

$$\sum_i P(i)\log\frac{P(i)}{Q(i)}$$

Note that this distribution is not symmetric: the relative entropy between P and Q is not the same as the relative entropy between Q and P. In the example above, the relative entropy is:

$0.8*\log_2(0.8/0.6)+0.2*\log_2(0.2/0.4)=0.132.$

Consider, for contrast, a subset of the population that is 10% male and 90% female. Now, the relative entropy is:

$0.1*\log_2(0.1/0.6)+0.9*\log_2(0.9/0.4)=0.794.$

This calculation indicates that the second population is more distinct, and further that this is the case because the female population is significantly different from the world set.

In the context of the subject matter described herein, relative entropy expresses how different a probability distribution associated with the query result set is different from the corresponding probability distribution associated with the baseline set. In some embodiments the baseline set could be either the overall collection or the result set for a different query. Stated another way, relative entropy is a basis for a measure of distinctiveness/salience; that is, of how interesting, or distinctive, that result set is, compared to other sets.

In some embodiments, the salience of a set X relative to a set Y is the relative entropy of set X given set Y, and denoted as:

Salience(X|Y)=S(X|Y).

Absolute salience can be thought of as salience of set X relative to the complete collection of documents, or, for simplicity's sake, S(X). In some embodiments, each dimension value may contribute two terms to the sum, one for the presence of the dimension value, and one for its absence. This embodiment treats each dimension value as a binary-valued distribution.

For example, consider a collection of books for which Subject is a dimension with values Art, Math, and Science. In the overall collection, 20% of the records are associated with Art, 50% with Math, and 50% with Science. Now, consider a result set for which 60% of the records are associated with Art, 25% with Math, and 30% with Science. The salience score is:

$0.6*\log_2(0.6/0.2)+0.4*\log_2(0.4/0.8)+0.25*\log_2(0.25/0.5)+0.75*\log_2(0.75/0.5)+0.3*\log_2(0.3/0.5)+0.7*\log_2(0.7/0.5)=0.858$ In contrast, the relative salience for a result set for which 90% of the records are associated with Art, 10% with Math, and 10% with Science is:

$$0.9*\log_2(0.9/0.2)+0.1*\log_2(0.1/0.8)+0.1*\log_2(0.1/0.5)+0.9*\log_2(0.9/0.5)+0.1*\log_2(0.1/0.5)+0.9*\log_2(0.9/0.5)=2.715$$

As can be seen from these examples, the more distinctive the distribution from that of the overall collection, the higher the salience score. The salience score is additive; each dimension value makes its own contribution, and this enables a determination of what in particular makes this set distinctive. Some embodiments may sum the contributions of all dimension values that belong to the same dimension to determine the overall contribution of that dimension to the salience score.

Result Set Size

A consequence of using relative entropy to calculate salience is that small sets of records tend to have higher salience. The reason is that a smaller set of records tends to be more distinctive than a larger one. In particular, a set comprised of a single record will have extremely high salience. This consequence is undesirable. Rather, as described below, it is preferable in some embodiments, to be able to measure the salience of the given set relative to other sets, irrespective of the sizes of the given set and the other sets. Thus, according to one aspect, it is desired to normalize the salience relative to the number of records in the set being measured and the number of records in the other sets.

According to some aspects, it is desirable that the salience of a random subset of X should be the same or substantially the same as the salience of X. In other words, when the set is made smaller without adding any extra information to it, preferably there should be no observed change in salience. There is, however, an increase in relative entropy due to the noise introduced by only looking at a random subset. To quantify this noise factor, one can take random subsets of varying sizes from a data set and observe the behavior of salience scores. Thus, for example, the average salience of a subset X' of x records selected randomly from X could be fitted to the following parameterized function (as just one example):

$$S(X')=S(X)+ax^b$$

where the two parameters a and b may be obtained through a regression or fitting procedure, conducted offline or at query time.

As noted above, salience is correlated inversely to the size of the set being measured. All else equal, smaller result sets will tend to have higher salience than larger ones. In the example above, this will translate into the negative value of b.

Consider a Boolean retrieval model for a query that returns a result set R. Now, consider second Boolean retrieval model that returns a random subset R' of R, for example, half the documents in R, selected at random. Intuitively, it can be seen that the first retrieval model is superior to the second. The two retrieval models offer the same expected precision, but the second model will only offer half of the recall of the first. In a Boolean retrieval model, there is no reason to sacrifice recall if it does not improve precision. However, salience will not favor R over R', at least in the expected case. In fact, R' will generally have higher salience than R because the random selection will introduce spurious information into the language model.

To ensure that R' is not favored over R, there is a need to modify the salience measure so that, given a choice two differently sized sets of equal salience as candidate responses to a query, the larger set is favored.

Figure 13:
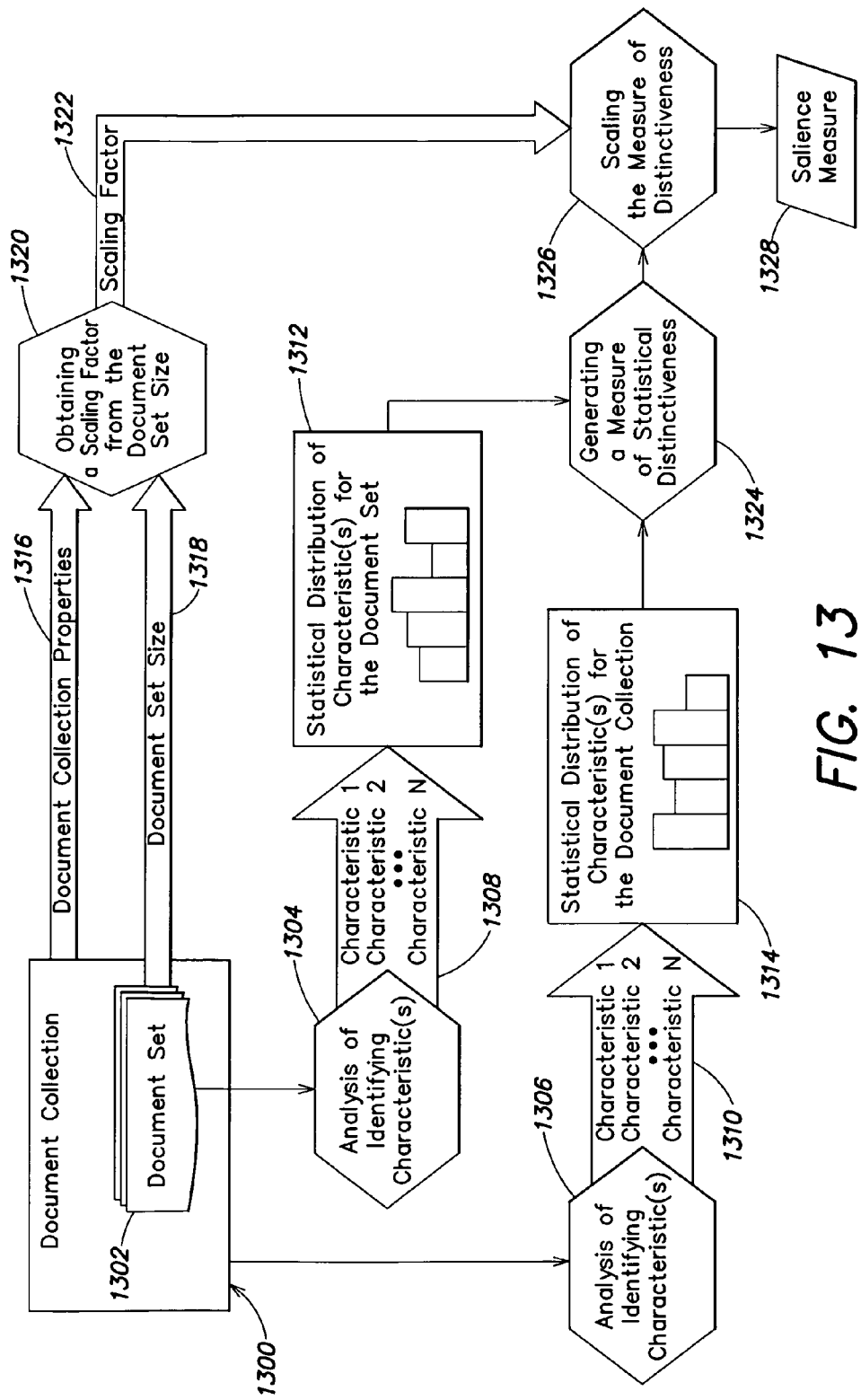
FIG. 13 shows a logical diagram for determining a salience measure according to another embodiment of the present invention.

FIG. 13 illustrates a logical diagram of a system and method for determining a salience measure according to some aspects of the present invention. Shown is a document collection 1300 from which document collection properties 1316 are extracted to obtain a scaling factor 1322 to account for document set size 1318. According to one embodiment, obtaining a scaling factor may include analysis of sampled subsets 1302 within the document collection for properties associated with, for example, set size. Identifying characteristics are analyzed 1306 and determined with respect to the entire collection at 1310 and with respect to documents sets within the document collection at 1304 and 1308. One or more characteristics may be identified for both the document collection and each document set analyzed. A statistical distribution of the identifying characteristics is determined 1312 for the characteristic(s) of the document set 1302 and at 1314 for the document collection 1300 to generate a measure of statistical distinctiveness 1324. Using the scaling factor determined from the properties of the document collection and document set sizes at 1322, the measure of statistical distinctiveness is scaled 1326 and a normalized salience measure 1328 is obtained.

According to one embodiment of the present invention, the salience measures of two or more sets are compared to one another without necessarily computing the normalized salience measures of the sets. In such an embodiment, one or more of the sets are reduced in size using random selection of set members, so that the sets being compared are of the same or approximately the same size. Once the sets to be compared have been thus reduced in size, the measurement of salience of those reduced sets does not require any adjustment for differences in set size. Because the random selection process introduces non-determinism into the measurement process, according to one embodiment, the process may be repeated, in another the random selection may be repeated, and values averaged to reduce the effects of said non-determinism. In another embodiment, one or more of the sets are increased in size (supersizing) using sampling. Such sampling may proceed by sampling from the collection.

Figure 14:
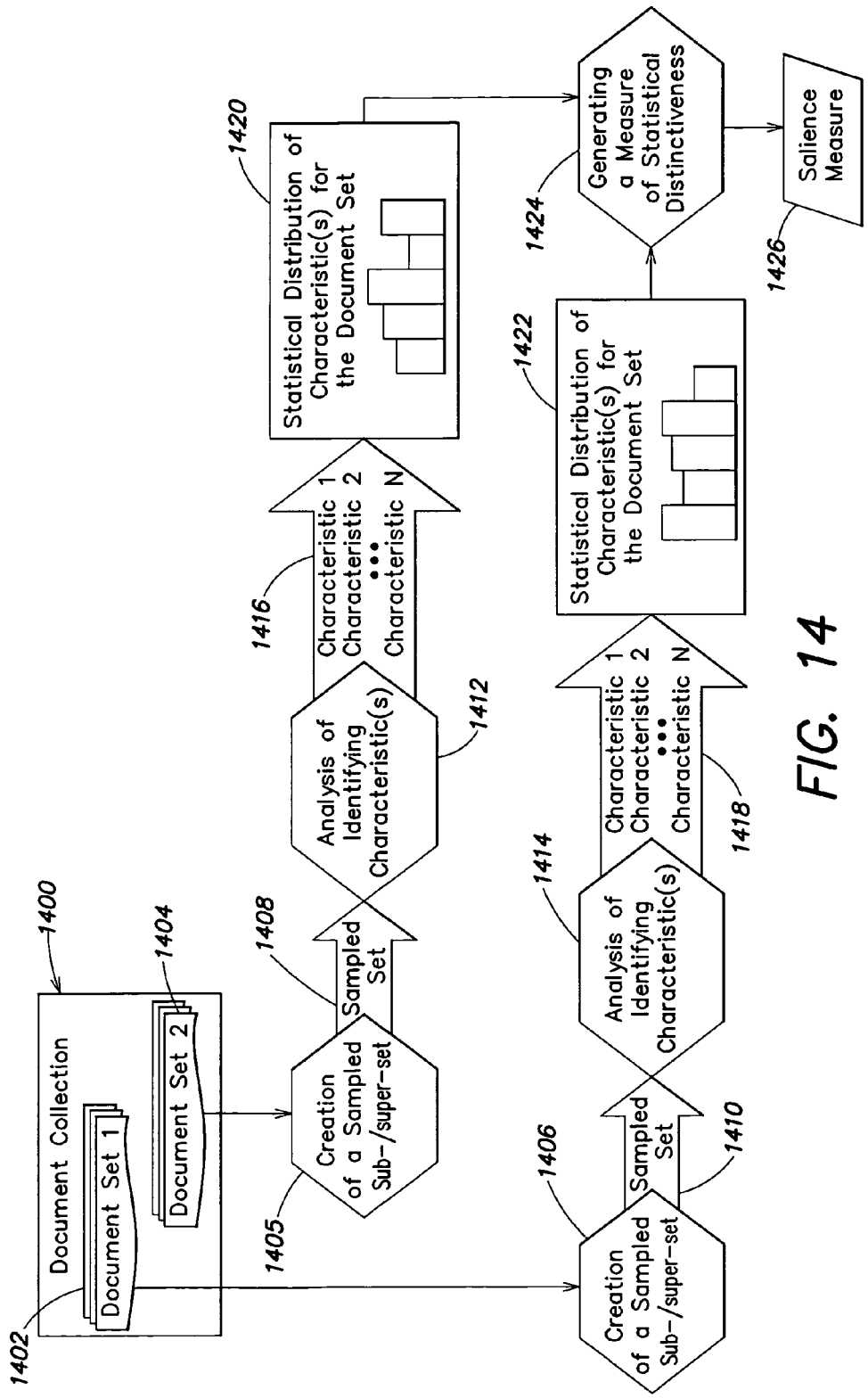
FIG. 14 shows a logical diagram for determining a salience measure according to another embodiment of the present invention.

FIG. 14 shows a logical diagram for determining a relative salience measure between two document sets according to some aspects of the present invention. Document collection 1400 contains two document sets 1404 and 1402, which are acted upon by sampling processes 1405 and 1406, which in various embodiments may sub-set, super-set, or take in the whole one or both of the document sets, producing two sampled sets 1408 and 1410 of substantially equivalent size. As an example, one embodiment utilizes random statistical sampling upon both document sets 1404 and 1402, to create smaller equal-sized sampled sets 1408 and 1410, respectively. In another embodiment one of the sampled sets is increased in size using sampling to generate equal-sized sets.

These sampled sets are analyzed 1412, 1414 to determine their identifying characteristic(s) at 1416 and 1418, respectively. Statistical distributions of the identifying characteristic(s) are obtained at 1420 and 1422, which are then used to generate a measure of statistical distinctiveness 1424. The resulting salience measure 1426 does not require any normalization adjustment for differences in set size.

Figure 15:
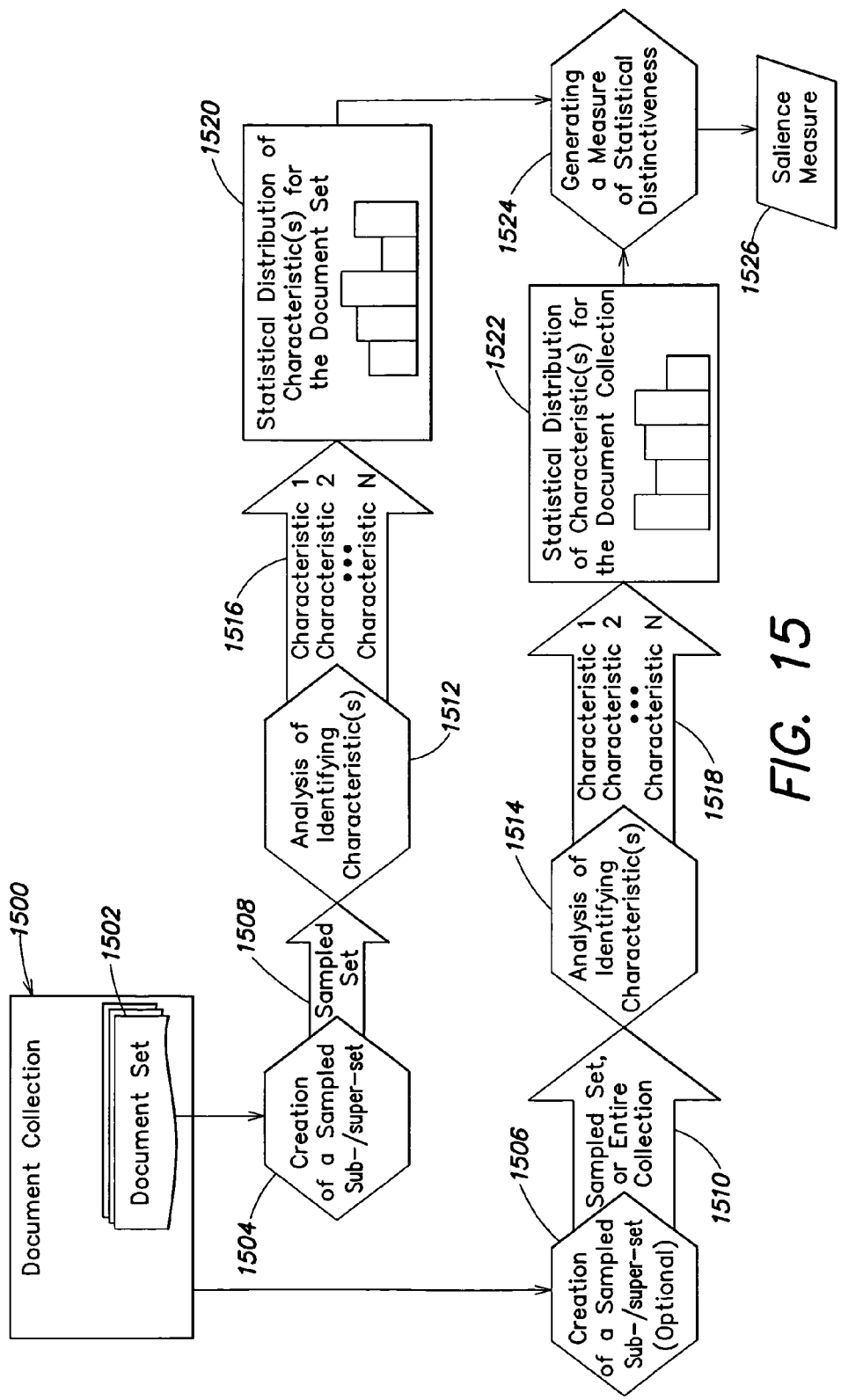
FIG. 15 shows a logical diagram for determining a salience measure according to another embodiment of the present invention.

Another embodiment is show in FIG. 15, with one document set 1502 drawn from document collection 1500. Sampling operations 1504 and (optionally) 1506 create sampled sub-/super-sets of substantially similar size 1508 and 1510 from document set 1502 and the document collection 1500 respectively. According to one embodiment, sampling 1506 of the document collection is optional. The sampled sets are analyzed to determine identifying characteristic(s) 1512 and

1514, and statistical distributions of the characteristics produced 1520 and 1522, which are subsequently used to generate a measure of statistical distinctiveness 1524 producing an absolute salience measure 1526, i.e. of set 1502 relative to the document collection 1500 as a whole. In one embodiment As sampled sub-/super-sets of substantially similar size were created prior to calculation of the salience measure, and the resulting absolute salience measure is independent of the size of the original document set 1502 and document collection 1500.

Salience as a Random Variable

The above discussion illustrates that the size of a result set is important. To combine this concept with salience, we define the variable $S_x$ to be the salience of a set of x records selected randomly from the entire corpus of n records. Some embodiments may sample with or without replacement. The expected value of the random variable $S_x$ as a function of x has some notable properties. On one hand, when x is small, one can expect $S_x$ to be quite large. In particular, any terms that are sparse in the corpus but dense in the selected record set will make significant contributions to salience. For example, if $P(w|Q)=c_1$ and $P(w)=c_2/n$, then $$P(w|Q)\log_2 \frac{P(w|Q)}{P(w)} \text{ is } \Theta(\log_2 n).$$

On the other hand, when x is large, one can expect $S_x$ to converge to zero, because $P(w|Q)$ approaches $P(w)$. The following sections describe other properties of $S_x$.

Normalized Salience

As observed, the expected value of $S_x$ is greater than zero for finite values of x. In other words, a set of records selected randomly from the corpus generally yields non-zero salience. However, a retrieval model that returns a random subset of the corpus is worse than a retrieval model than returns the whole corpus. Thus, according to the subject matter described herein, it is desirable to modify the salience measure to at least ensure that the system does not favor a random subset of the corpus over the whole corpus and, by extension, that for any set R the system does not favor a random subset of R over R.

Embodiments of Normalized Salience

In one example, a desirable approach is to normalize salience by modifying the salience scores of R based on its size. One way to accomplish this goal is to define the normalized salience of R as the number of standard deviations by which the salience score for R exceeds the mean salience score for sets of the same size (or concentration of relevance) as R:

$$S_{normalized}(R)=(S(R)-E(S_{|R|}))/\text{stddev}(S_{|R|})$$

This normalized measure has some very useful properties:

If R is a set of records selected randomly from the entire corpus, then $S_{normalized}(R)=0$, regardless of the size of R. More generally, if R' is a set of records selected randomly from R, then $S_{normalized}(R')=S_{normalized}(R)$, regardless of the cardinalities of R and R'.

Normalized salience (i.e. normalized distinctiveness) compensates for the noise associated with small result sets by subtracting the expected salience of a randomly selected set of the same size. Dividing by the standard deviation is not strictly necessary, but it provides the benefit of making the measure have a dimensionality that is independent of the size of the corpus. Indeed, in other embodiments of the subject matter described herein, one can normalize salience by simply subtracting the mean salience score for sets of the same size, without dividing by the standard deviation.

There are other ways to accomplish normalization. For example, rather than expressing salience scores in terms of the number of standard deviations from their mean, it is possible to use the percentile rank within the distribution. For example, if the salience score for R exceeds the salience scores of 90% of sets of the same size (or concentration of relevance, as described below) as R, then the normalized salience score would be 90. There are numerous variations on this theme of leveraging the distribution of salience scores to properly factor in the size of concentration of relevance of R. These variations should be considered within the scope of the subject matter herein.

Modeling the Distribution

To implement a normalized salience measure, some embodiments compute the expected value of $S_x$ as a function of x. Other embodiments may also utilize standard deviation of $S_x$ as a function of x. Typically, these functions are not available in closed form because they depend on the statistical distribution of data in the corpus. One can empirically observe values of $S_x$, however, and fit them to a parameterized family of functions. These values converge to zero as x increases, but they can be quite high for low values of x. After considering various functional forms that may be used as approximations to the measured results for the expected value and standard deviation of $S_x$, functions in the form of $ax^b$, where b<0, were found to be both convenient to calculate and to provide an acceptably good fit to the measured data. Other embodiments may use different approximating functions, including explicitly measured, statistically derived, or theoretically derived from the prior knowledge of statistical distributions associated with the documents in the corpus.

In summary, according to this aspect of the described subject matter, the size of a set of documents is used as a factor in measuring the distinctiveness of a set of documents relative to a baseline distribution. In particular, the distinctiveness of smaller sets is discounted or normalized to reflect the expected lack of representativeness of small subsets of a collection.

In some embodiments, the distribution of a distinctiveness measure, such as relative entropy, may be known or modeled for document sets of a given size, i.e., for a given set size, there may be a known or modeled probability distribution of the distinctiveness measure over all sets of that size. In such embodiments, the distinctiveness of a set can be discounted or normalized by comparing it to the distribution of the distinctiveness measure for sets of the same size.

In other embodiments, the normalization procedure described above may replace the distinctiveness measure of a document set with the number of standard deviations by which the set's measure differs from the mean distinctiveness measure for document sets of its size. In still other embodiments, the normalization procedure may replace the distinctiveness measure of a document set with the percentile rank of the set's distinctiveness measure relative to document sets of its size.

While one preferred embodiment uses normalized relative entropy as its salience measure, other embodiments could employ other functions to measure the differences between distributions. Examples of other salience functions include, but are not limited to: Euclidean (L2) distance, Manhattan (L1) distance, Hellinger distance, diversity difference, cosine difference, Jaccard distance, and Jenson-Shannon divergence, and skew divergence. Also, similarity functions and correlation measures, such as the Pearson correlation coefficient, Dice coefficient, overlap coefficient, and Lin similarity, can be converted into difference functions by inverting their sense (i.e., a higher similarity score implies a smaller difference between the distributions). Other functions familiar to those skilled in the art of statistical methods can be incorporated into the disclosed methods.

Figure 1A:
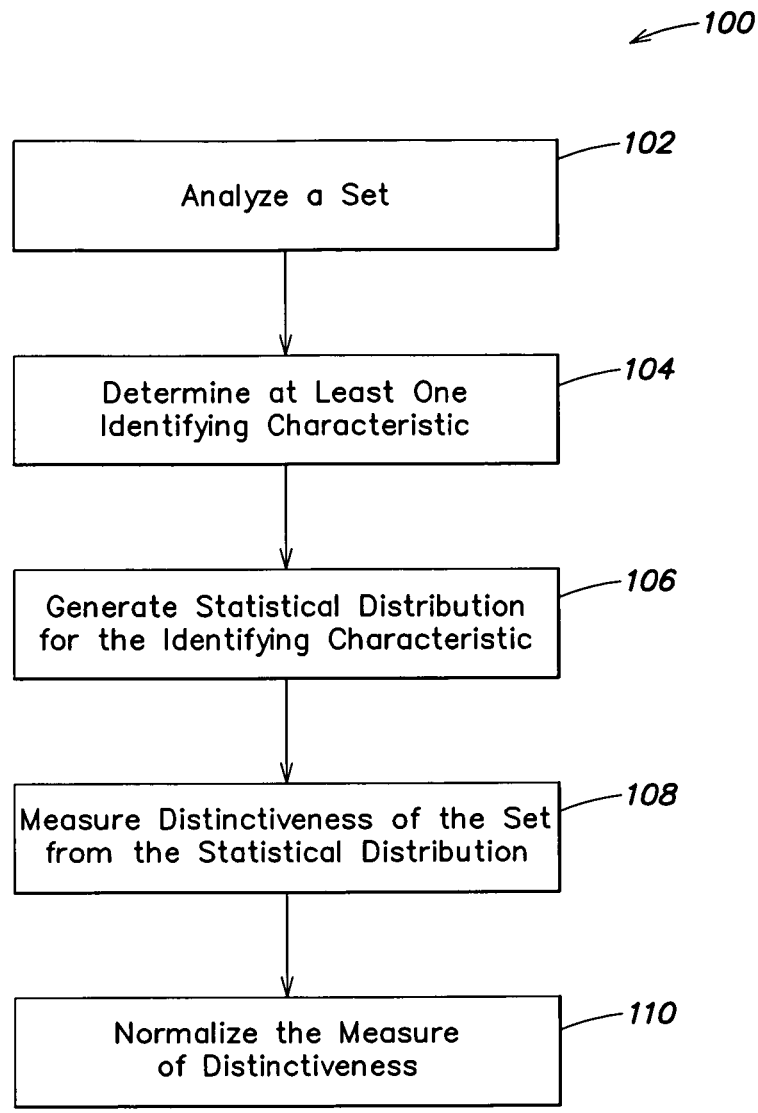
FIG. 1A shows a process for generating a normalized measurement of the distinctiveness of a set according to one embodiment of the present invention.

Referring to FIG. 1A shown is an example of a process, 100, for generating a normalized measurement of the distinctiveness of a set. At step 102, a set is analyzed to determine at least one identifying characteristic within the set, at 104. One should appreciate that a set can be virtually any collection of electronic information. Typically, a collection of information comprises information stored for later use/access, i.e. not a transient collection of information. However, transient data may also be analyzed as discussed in greater detail below.

In one example, the set being analyzed is made up of documents. Documents can be thought of in traditional sense as discrete text files that may also be associated with metadata, such as an author, date of creation, a subject, and date of modification as examples; however, a set of documents and a document itself is intended to be more comprehensive, and should be understood to include other addressable and selectable media, including for example non-textual data, such as sound and visual recordings, database records, and composite entities such as might be described using HTML and XML encoding. Individual documents and collections of documents may take many forms, including file systems, relational databases, hypertext collections (such as the World Wide Web), or the like.

The at least one identifying characteristic determined at step 104 depends at least in part on the make up of the set being analyzed at 102. In one example, the set is made of "traditional" documents, with text, author(s), and a subject. There, at least one identifying characteristic may be determined based on the text, the author(s), and the subject of the documents. As another example, identifying characteristics may correspond to keywords in the text of a document, author(s) of documents, the subject of the document, and as a further example the identifying characteristic corresponds to any combination thereof. In one embodiment, each of the preceding identifying characteristics may be treated in more detail, for example, the presence of multiple authors may be used as an identifying characteristic, as may the presence of multiple topics, or the presence of certain key words and/or groups of words or phrases. One should appreciate that the absence of certain characteristics in elements of the set may also be used in determining the at least one identifying characteristic at step 104. The determination of the at least one identifying characteristic may include analysis of any identifying information regarding the elements of the analyzed set. In one example, the metadata associated with the elements of a set are analyzed. In one embodiment, the analysis of identifying information includes consideration of date of creation, date of modification, date of last access, title, file extension, file type, file size, file composition, author(s), editor(s), keyword, containing specific information, containing a specific element, subject(s), summary information, derivable information, all or part of the file name, a word or a phrase within a file, location on storage media, physical location, relational information, non-textual data, as some examples. One should appreciate that information associated with and/or derivable from electronically stored information can include any information that may be stored and associated with a collection of information, including information stored by operating systems and information typically considered "metadata" and may also include other system information regarding more fundamental operations/information on electronically stored information, for example memory location, operating system access information, associated driver and device information, as some examples.

Figure 1B:
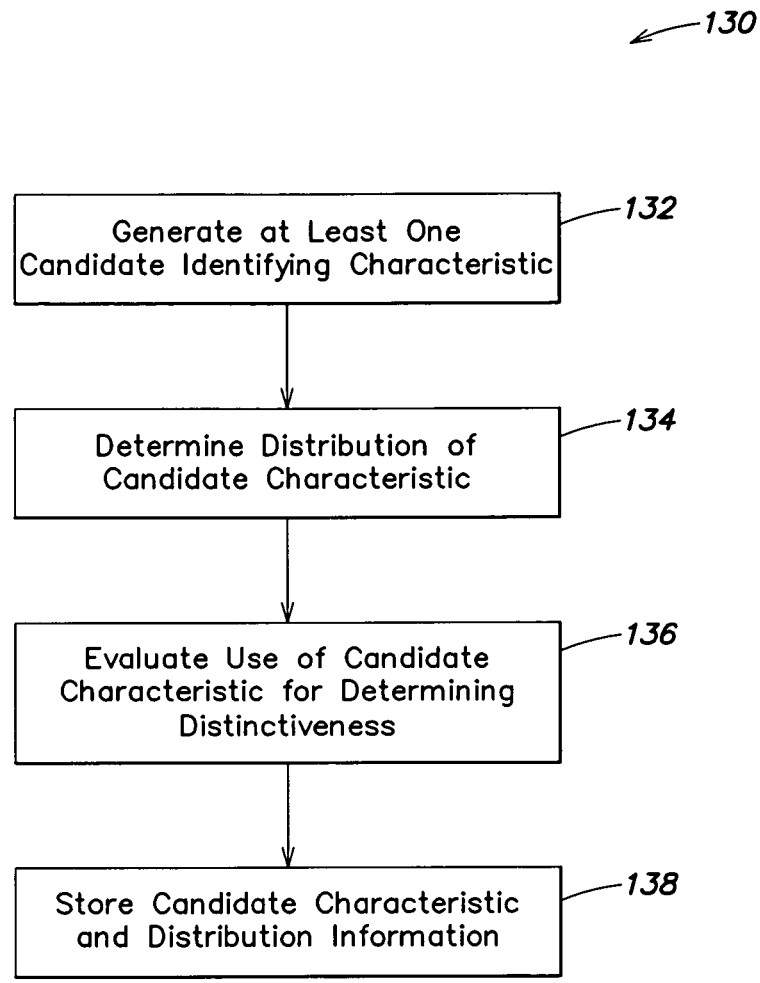
FIG. 1B shows a process for determining at least one identifying characteristic according to one embodiment of the present invention.
Figure 1C:
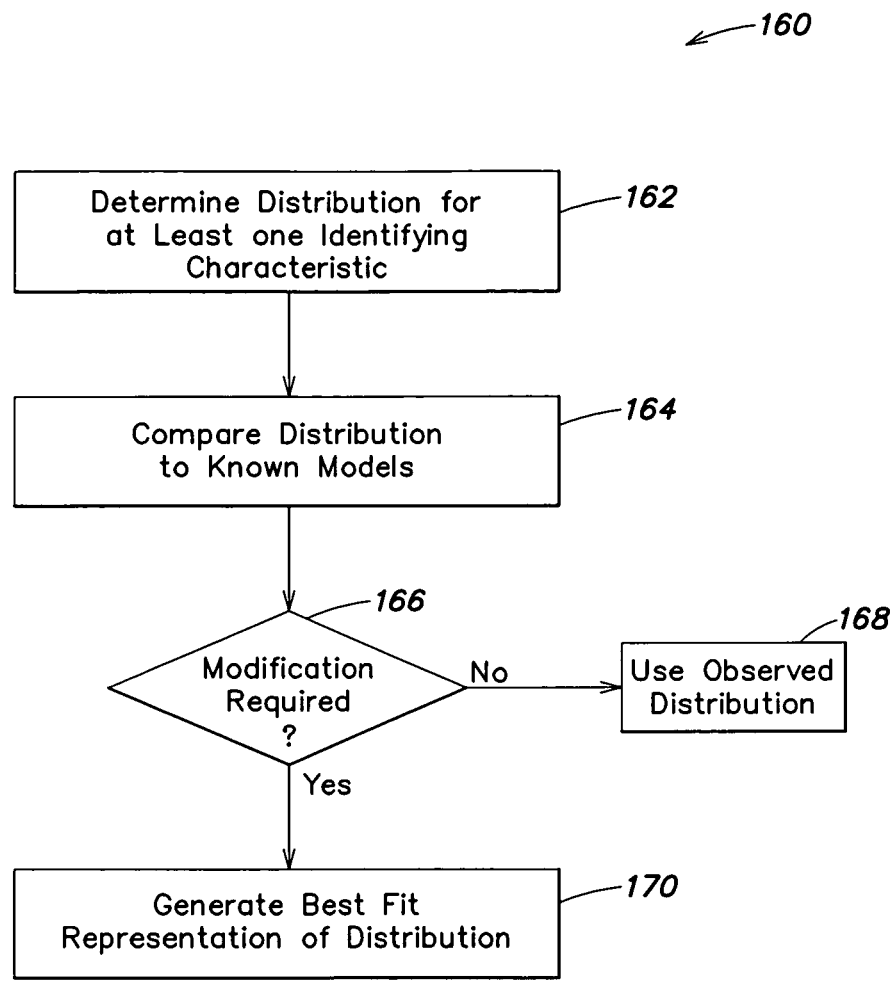
FIG. 1C shows a process for modeling the statistical distribution of an identifying characteristic according to one embodiment of the present invention.

The determination of at least one identifying characteristic and any associated analysis may occur as part of another process, for example, process 130 FIG. 1B, wherein a candidate identifying characteristic is determined for elements of a set, at 132. The determination of a candidate identifying characteristic may be based on review of all possible information associated with the elements of the set, for example the metadata for the elements of the set, or may be based on a subset of all the possible information associated with the elements of the set. In one example, certain characteristics are expected to be found in a set, and those characteristics are used in the analysis to determine identifying characteristics. In another example of a particular embodiment, the set is a collection of information pertaining to a winery, and the expected characteristics on which information is stored and/or associated may include the type of wine, a year of bottling, the year the grapes were grown used to make the wine, weather patterns for the growing season, information on soil (nutrient content, etc.) in which the grapes were grown, location, among a number of other characteristics. In another embodiment, various subsets of the preceding expected characteristics may also be used. One should appreciate that "expected" characteristics need not be used, and the analysis of the set and its contents may exclusively determine the identifying characteristics that are used or may contribute to the determination of the identifying characteristics that are used.

At step 134, the statistical distribution for a candidate identifying characteristic is determined. The determination of the statistical distribution for a candidate identifying characteristic may involve manipulation of the set that is analyzed. In one example, a representation of the set is used that is adapted to statistical manipulation. Using the representation of the set, a statistical distribution is determined. In one example, the statistical distribution is obtained based, at least in part, on text, metadata (e.g. categories assigned to the document), or other information derived from the elements of the set. In another example, the statistical distribution is an approximation of the incidents of the identifying characteristic. In one example, the statistical distribution is determined using sampling on the set; in another example, modification of the set is permitted without need for recalculation of the statistical distribution. In some embodiments, a threshold is established for determining when recalculation of a modified set is required. The threshold may be based on a specific number of changes made to the set, and/or a percentage of change with respect to the set (for example percent change in size).

Other approximation techniques include examining a similar set(s) and the statistical distribution(s) obtained on the similar set(s) to provide an expected distribution for the set being analyzed. In one example, the statistical distribution is univariate, that is, based on one variable. In one embodiment, the univariate distribution is assigned a weight value. In another embodiment, the weight value constrains the distribution to reflect a probability distribution, in other words, the sum of the weights for the set is equal to 1. In an embodiment where the set comprises textual information, the identifying characteristics are words within the text, and the weights associated with them reflect the frequency of the words in the set as a fraction of the total number of words in the set. Candidate identifying characteristics may be analyzed to determine correlated values within a particular set; for example, this may occur at step 136. Correlated values represent a distinct challenge in determining identifying characteristics. In one example, certain identifying characteristics have too many dependencies to appropriately model the statistical distribution. In another example, the number of dependencies makes the calculation and/or approximation of the statistical distribution intractable. According to one embodiment, a determination is made that a candidate is not worth the computation cost associated with generating the statistical distribution. The determination may distinguish between candidates that are computationally intractable and candidates that are too computationally expensive. In one embodiment, the candidates that are determined to be too expensive and/or intractable are stored, so that those candidates may be excluded before additional analysis is performed. Additional analysis may include subsequent determinations of identifying characteristics; in one example it includes repetition of process 130; in another example, information stored may be used in other processes, for example, process 100, FIG. 1A.

Referring again to FIG. 1B, in another embodiment, the candidates that are simply too expensive, rather than intractable, may be associated with a trigger that causes and/or permits re-evaluation of the candidate in response to changes to the set. Changes may include, for example, the addition of elements to the set, deletion of elements, modification of elements of the set, among others. Using the statistical distribution, obtained at step 134, candidate identifying characteristic can be evaluated by modeling and/or evaluating the set using the candidate identifying characteristic, at 136. In one example, thresholds are established to determine if an identifying characteristic is worth the computational effort needed to derive the characteristic. Some potential identifying characteristics may be excluded in advance, as, for example, the word "the" in a document may be particularly unsuited to identifying distinctiveness. In another example, analysis determines that a set is made up of documents of identical file type; in such an example file type yields little or no information on distinctiveness of sets.

One should appreciate that exclusion rules may be generated as part of the analysis of identifying characteristics, and such exclusion rules may be used as a default, or may have criteria associated with them to provide for execution. According to one embodiment, exclusion rules are themselves excluded for particular analysis.

In one example, a candidate identifying characteristic may be deemed unsuitable, where it is determined this candidate identifying characteristic has too many dependencies to be computationally tractable. According to one embodiment, unsuitable candidate identifying characteristics are excluded from further consideration. In another embodiment, unsuitable candidate characteristics are stored for use with exclusion rules.

According to one aspect, it is realized that reducing the computational complexity and overhead associated with determining identifying characteristics and statistical distributions is beneficial in many embodiments. In particular, utilization of approximation rather than direct measurement (in one example, employing processes of curve fitting to the determination of statistical distribution), while introducing possible approximation error, yields benefits for some embodiments. A balancing may occur between reducing computational effort and achieving a higher level of precision.

According to another aspect, such balancing is affected by the characteristics of the set being analyzed and the activity that is being performed. In one example, determination of candidate identifying characteristics may tolerate a greater degree of possible approximation error, where the evaluation of the set based on those characteristics occurs with a greater degree of precision. In another example, correlated values for identifying characteristics are identified, and only one of the correlated values for identifying characteristics is used for later analysis. In one example, where correlated values are determined, only one member of the correlated values is used for determining statistical distributions for the correlated values. In another example, only one distribution for the correlated values is stored.

Information on the statistical distribution of candidate identifying characteristics is stored at step 138. In one embodiment the stored information is used as part of a process for measuring the distinctiveness of a set. In one example, the stored information may be accessed as part of process 100, shown in FIG. 1A, for example, during steps 102-106. In some embodiments, only portions of the distribution information related to candidate identifying characteristics are stored. The storing of distribution information may involve a determination regarding the value of the statistical information. In one example, a determination is made based, at least in part, on the computational effort involved in generating the statistical information. In another embodiment, the value of the statistical information is compared for a plurality of candidate identifying characteristics, and the statistical information is stored based on the comparison. Typically, information requiring greater computation effort is treated preferentially over information of less computational effort; however, other factors may be used in the determination. In one embodiment, factors include, for example, computational effort, age of the information, resource usage, or a combination thereof.

Referring again to FIG. 1A, process 100 continues at step 106, where a statistical distribution for the at least one identifying characteristic is generated. As discussed above, the at least identifying characteristic may be determined through a sub process, for example, process 130, and in conjunction with the sub-process a statistical distribution may be calculated and stored for the at least one identifying characteristic. In one embodiment, generation of the statistical distribution for the at least one identifying characteristic involves retrieval of a stored statistical distribution. Optionally, (not shown) when the statistical distribution is retrieved from storage, a check against age may be made to determine if the statistical distribution should be generated independently from any stored information. Additionally, a check may be performed to determine if any changes have occurred with respect to the analyzed set that warrant (re)generation of the statistical distribution rather than retrieval from storage. In one example, a limited number of documents may be added to a set without requiring recomputation of the statistical distribution. One should appreciate that, although process 100 is shown as singular process, repetitive invocation is contemplated and even in some embodiments expected. Further, the individual steps that make up process 100 may be invoked in a different order or be combined into a fewer number of steps.

In one example, it is determined that the number of changes to the underlying set exceeds tolerance for changes, and the statistical distribution for the at least one identified characteristic is generated at step 106. In another example, no data exists on the at least one identifying characteristic and the statistical distribution is generated at step 106. The determination of the statistical distribution for the at least one identifying characteristic may involve manipulation of the set that is analyzed. In one example, a representation of the set is used that is adapted to statistical manipulation. Using the representation of the set, a statistical distribution is determined at 106. In another example, the statistical distribution is obtained based, at least in part, on text, metadata (e.g. categories assigned to the document), or other information derived from the elements of the set. In another example, the statistical distribution is an approximation of the incidents of the at least one identifying characteristic. The statistical distribution may be determined using sampling on the set; in another example, a best fit approach is used to model the distribution according to a known distribution curve. In yet another example, regressions are performed to determine the best model for the statistical distribution.

In one embodiment, modification of the set is permitted without need for recalculation of the statistical distribution. It is realized that permitting some variation in the analyzed set without undergoing expensive computation may improve some implementations, and, in particular, reduce computational burden and expense. In some embodiments, a threshold is established for determining when recalculation of a modified set is required. The threshold may be based on a specific number of changes made to the set, and/or a percentage of change with respect to the set (for example, percent change in size).

Other approximation techniques include examining a similar set(s) and the statistical distribution(s) obtained on the similar set to provide an expected distribution for the at least one identifying characteristic being analyzed.

Step 106 may include another process for obtaining a model of the distribution adapted to statistical manipulation. In one example, process 160 is called to model the statistical distribution of the at least one identifying characteristic. At step 162, a statistical distribution is obtained for the at least one identifying characteristic. At step 164, the measured distribution is compared to a known distribution curve and/or model. Known distributions may be in the form of parameterized functions $ax^b$, as one example. Such known distributions may be calculated in advance, calculated offline, obtained through regression analysis, calculated from a fitting procedure, and may be determined on demand. At step 166, it is determined if modification to the measured statistical distribution is required. At step 166(NO), it is determined that the measure distribution correlates sufficiently to a smooth distribution curve so that modification is unnecessary, and the measured distribution is stored at 168 for later use.

At step 166(YES), it is determined that modification should be performed on the measured distribution. Modification of the measured distribution may take many forms. In one example, modification of the measured statistical distribution takes the form of "smoothing" of the distribution to eliminate singularities. Singularities may result from operations that employ logarithms and division, since such functions may result in values of infinity for a particular portion of a distribution, precluding numeric computation of the statistical distribution through the region including the singularity. In one example, singularities are eliminated by replacing the values with approximate values. In another example, a zero weight is replaced by a small but non-zero weight. In another example, the value may be replaced by a value characteristic of the distribution surrounding the singularity. Modification of the distribution may take the form of a fitting process, where the observed/measured distribution is fit to a known model of a statistical distribution. Modification of the statistical distribution may also involve approximation of the distribution, for example, by examining similar sets of elements to provide expected distributions in order to bypass analysis of the primary set (not shown). At step 170, a best fit representation of the distribution is obtained and may be used for further analysis of distinctiveness. In one example, the best fit representation is used as part of a larger process for calculation of a distinctiveness measure for a set.

Using the statistical distribution for the at least one identifying characteristic, a measure of distinctiveness is determined at step 108. The measure of distinctiveness may be determined from a univariate distribution, that is, based on one value (i.e. one identifying characteristic). In one embodiment, the univariate distribution is assigned a weight value to generate the measure of distinctiveness. In another embodiment, the weight value constrains the distribution to reflect a probability distribution; in other words, the sum of the weights for the set is equal to 1. In an embodiment where the set comprises textual information and the at least one identifying characteristic is generated from words within the text, the weights associated with the at least one identifying characteristic may reflect the frequency of the words in the set as a fraction of the total number of words in the set.

In another embodiment, the measure of distinctiveness may be determined from a multivariate distribution; that is, based on a set of values (i.e. identifying characteristics). In one example, values are represented by n-tuples, relations based on a group of values. The multivariate distribution may also be based on multiple sets of values. In one example, the set is made up of documents comprising subject, type, and an author, thus, a set values corresponds to each subject, type, and author. In one implementation, values are represented by both the presence and absence of the value. For example, if a value is present in 60% of the elements of the analyzed set, the absence of that value occurs in 40% of the elements of that set.

As discussed above, correlated values represent distinct challenges in determining identifying characteristics and the resulting measure of distinctiveness. In one example, certain identifying characteristics have too many dependencies to appropriately model the statistical distribution. In one example, the number of dependencies makes the calculation and/or approximation of the statistical distribution intractable. One should appreciate that steps 106 and 108 may take place simultaneously and, in one example, occur as one step, rather than as discrete steps.

Process 100 continues at step 110, and the measure of distinctiveness of the set is normalized. According to one aspect, normalization accounts for noise introduced by analyzing a set derived from a larger set. It is realized that a measure of distinctiveness may be given an improper weight due to the size of the set being analyzed. If one considers a comparison of the initial set and its measure of distinctiveness against a set comprised of a smaller number of elements from the initial set, the set comprised of a smaller number of elements typically will have a higher salience. Even in the example where the smaller set is a random sampling of the initial set, a higher salience score will often result. In one example, step 110 includes acts of computing measures of distinctiveness obtained from random subsets of varying sizes from an initial set in order to quantify a correction factor. The set of these computed distinctiveness scores is then fit to a parameterized function as discussed above. In one example, the parameterized function is obtained though a regression; in another, a fitting procedure is used. The analysis of average distinctiveness score may be performed in advance, or on demand; it also may be conducted offline.

In one example, normalization ensures that smaller sets are not favored over larger sets due to set size. This is accomplished by modifying the measure of distinctiveness to account for the size of the analyzed set. In one embodiment, the normalized measure of distinctiveness is determined from the amount by which the distinctiveness measure exceeds a mean score for sets of similar size. In another embodiment, the normalized measure of distinctiveness is determined from the number of standard deviations by which the distinctiveness measure exceeds a mean score for sets of similar size. In one example, if the analyzed set is a set randomly derived from an initial set, then the normalized measure of distinctiveness will be the same for the derived set as the initial set. According to another embodiment, the normalized measure is determined by removing the contribution to distinctiveness obtained from a randomly selected set of the same size. In another example, step 110 occurs by calculating the percentage by which the distinctiveness score of the analyzed set exceeds the distinctiveness score of random sets of the same and/or similar size.

In one embodiment, step 110 may replace the distinctiveness measure of a set with the amount by which the set's measure differs from the mean distinctiveness measure for sets of the same and/or similar size. In another embodiment, step 110 may replace the distinctiveness measure of a set with the number of standard deviations by which the set's measure differs from the mean distinctiveness measure for sets of the same and/or similar size. In still other embodiments, step 110 may include replacing the distinctiveness measure of a set with the percentile rank of the set's distinctiveness relative to sets of the same and/or similar size.

Examples of functions that may be used to derive a distinctiveness measure include, but are not limited to: Kullback-Leiber divergence, Euclidean (L2) distance, Manhattan (L1) distance, Hellinger distance, diversity difference, cosine difference, Jaccard distance, Jenson-Shannon divergence, and skew divergence. Also, similarity functions and correlation measures, such as the Pearson correlation coefficient, Dice coefficient, overlap coefficient, and Lin similarity, can be converted into distinctiveness functions by inverting their sense (i.e., a higher similarity score implies a smaller difference between the distributions). Other functions familiar to those skilled in the art of statistical methods can be incorporated into the disclosed methods.

Concentration of Relevance

The foregoing discussion of result set size is particularly suitable for document sets obtained from Boolean retrieval models. A Boolean retrieval model is a model where, in response to a query, each document in the collection is determined to match or not match, i.e., assigned a score of 1 or 0. In contrast, a ranked retrieval model is a model where, in response to a query, each document in the collection is assigned a score so that the documents can be sorted by this score. In a Boolean retrieval model, a query serves as a filter on the collection; in a ranked retrieval model, a query serves as a sort on the collection. A model can combine Boolean and ranked retrieval, filtering the document collection and sort the results of that filtering by a scoring function.

For ranked retrieval models, concentration of relevance is a generalization of result set size. While result set size applies to Boolean retrieval models (a document either matches or does not match a query), concentration of relevance can be used for ranked retrieval models, where every document in the collection may be assigned a relevance score for every query.

According to one embodiment, a way to measure concentration of relevance is to choose a threshold relevance score and count the number of documents whose score exceeds that threshold. This thresholding process, in effect, converts the ranked retrieval model into a Boolean retrieval model. The choice of threshold depends on the nature of the relevance scores. If relevance scores are probabilities between 0 and 1 (i.e., a relevance score of p means that the associated document is relevant with probability p), then the threshold might be an absolute number like 0.5 (i.e., 50% probability of being relevant). If relevance scores are not probabilities, a threshold can be obtained by analyzing the distribution of values, e.g., a standard deviation above the mean relevance score. Because every ranked retrieval model has its own associated method for scoring the relevance of retrieved results, the choice of a threshold is likely to be highly specific to the retrieval model.

Another way to measure concentration of relevance, according to some embodiments, is to model the distribution of relevance scores as a mixture of two distributions, the distribution of scores for more relevant documents and the distribution of scores for less relevant documents, and to compute the separation between the two distributions. For example, the distribution of relevance scores can be modeled as a mixture of two Gaussian distributions, and the separation can be computed as the difference between their means. This mixture model approach has the benefit of not imposing any requirements of the relevance scores; in particular, the scores are not required to correspond to probabilities.

Like result set size, concentration of measure can be used to discount or normalize the distinctiveness (i.e., salience) measure. For example, the distinctiveness of a set can be discounted or normalized by comparing it to the distribution of the distinctiveness measure for sets of the same or comparable concentration of measure.

One of ordinary skill will appreciate that because concentration of measure can be a continuous quantity, the distribution of the distinctiveness measure as a function of the concentration of measure is more amenable to being interpolated or modeled (as opposed to computed exactly). Those skilled in the art will appreciate that techniques exist to adapt the search results of ranked retrieval model for salience computation, including, but not limited to, trimming the result set to top N results (for N either constant or variable), based on the number of results, the distribution of the relevance scores, or other parameters.

Figure 10:
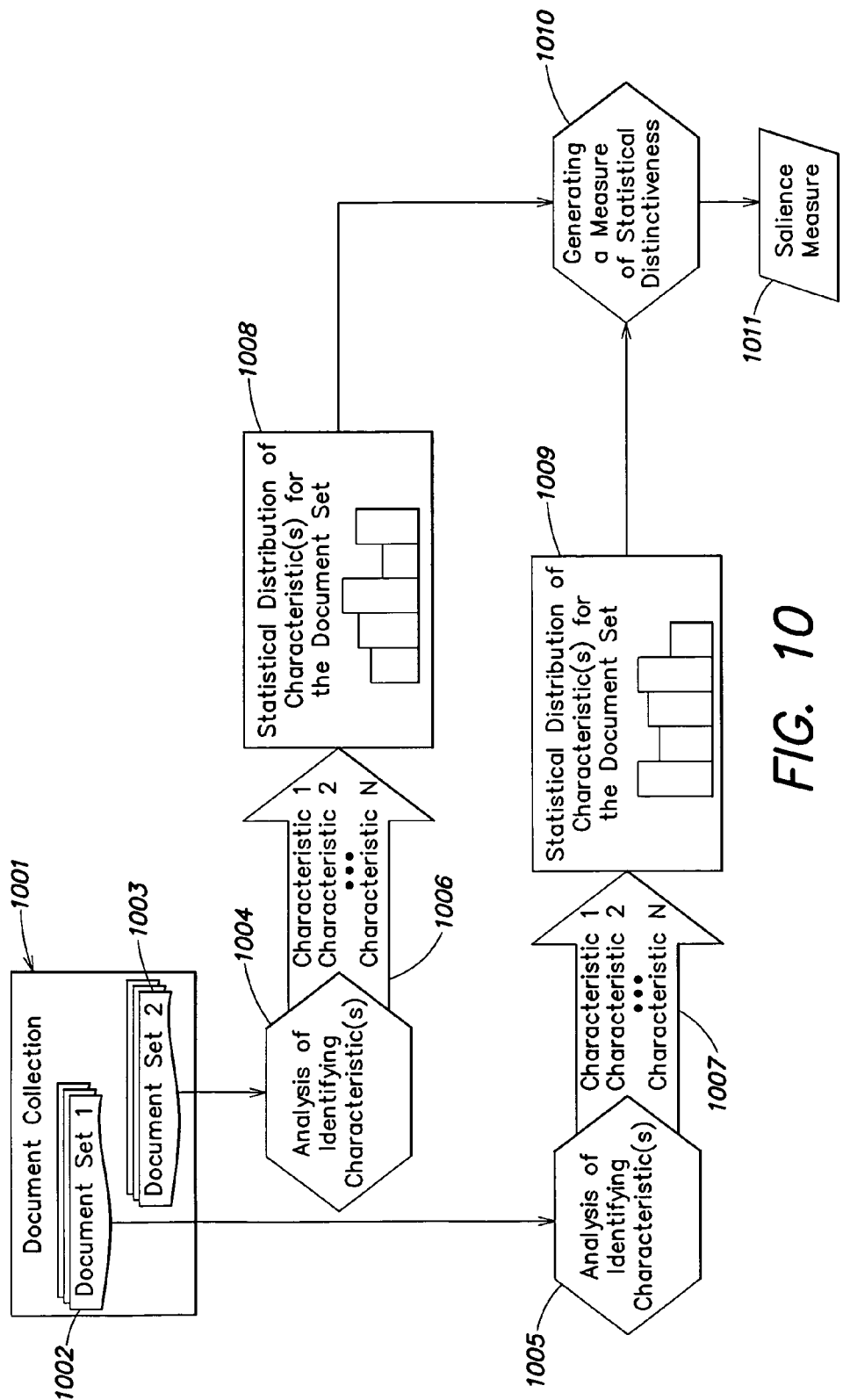
FIG. 10 shows a logical diagram for determining a salience measure according to another embodiment of the present invention.

FIG. 10 shows a logical diagram of a system and method for deriving a salience measure. Given a collection of documents 1001, a salience measure may be obtained showing the distinctiveness of one document set compared to another document set from within the collection of documents. The first and second document sets 1002 and 1003 are analyzed to determine identifying characteristic(s) 1007 and 1006 at 1005 and 1004. Statistical distributions 1009 and 1008 are determined for the characteristic(s) 1007 and 1006, to generate a measure of statistical distinctiveness 1010, corresponding to a salience measure 1011 of document set 1002 relative to document set 1003.

Figure 12:
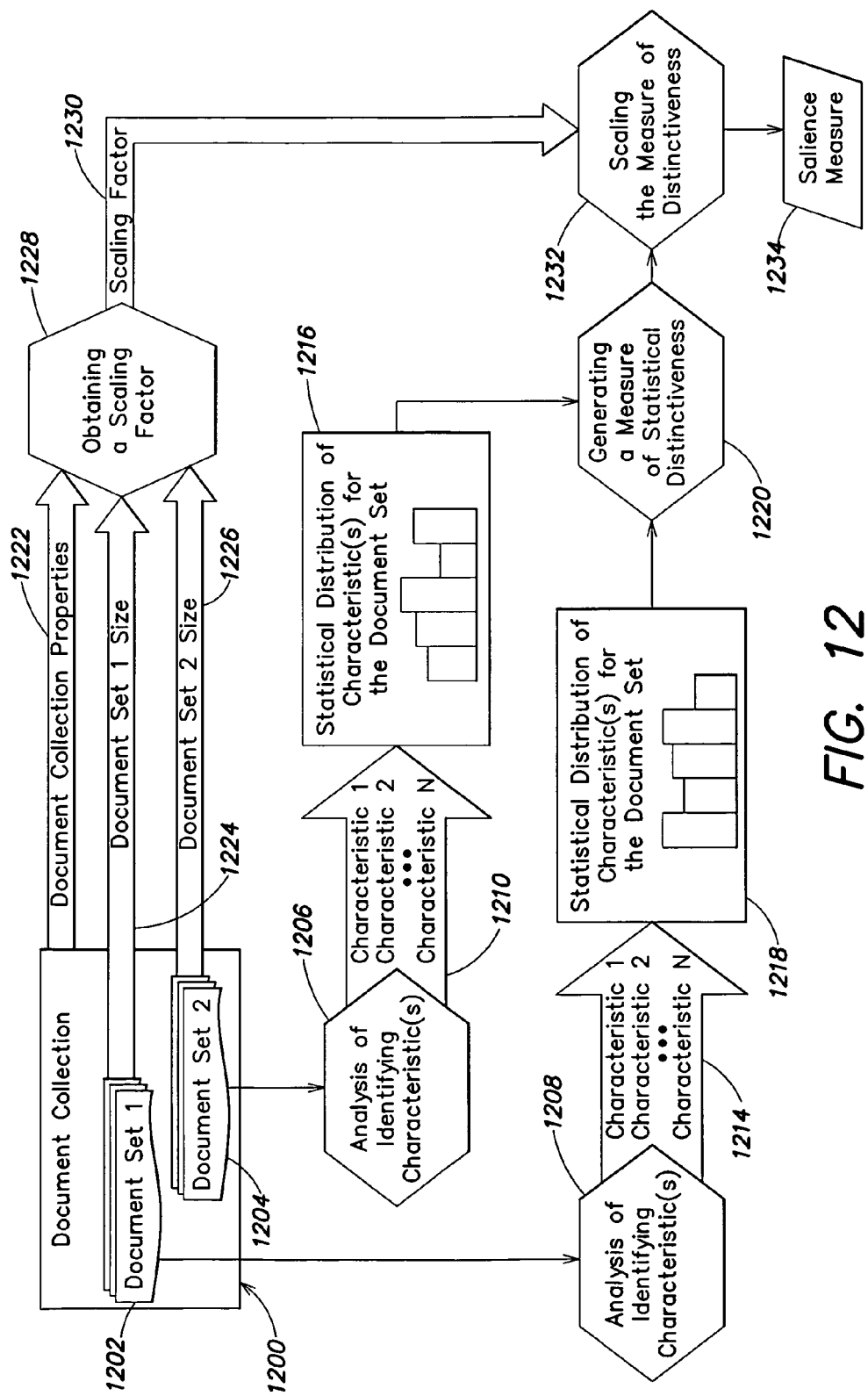
FIG. 12 shows a logical diagram for determining a salience measure according to another embodiment of the present invention.

FIG. 12 shows a logical diagram of another system and method for deriving a normalized salience measure. Given a collection of documents 1200, a salience measure may be obtained showing the distinctiveness of one document set 1202 compared to another document set 1204 from within the collection of documents. Properties from the document collection are extracted 1222, as is set size information related to a first document set 1224 and a second document set 1226. The collection properties and the set sizes are used to obtain at 1228 a scaling factor 1230 to account for set sizes. The first and second document sets are analyzed at 1208 and 1206 to determine identifying characteristic(s) 1214 and 1210, and statistical distributions are determined at 1218 and 1216 for the characteristic(s), to generate a measure of statistical distinctiveness at 1220. The measure of statistical distinctiveness is scaled using the determined scaling factor at 1232 to derive a normalized salience measure 1234.

Figure 2A:
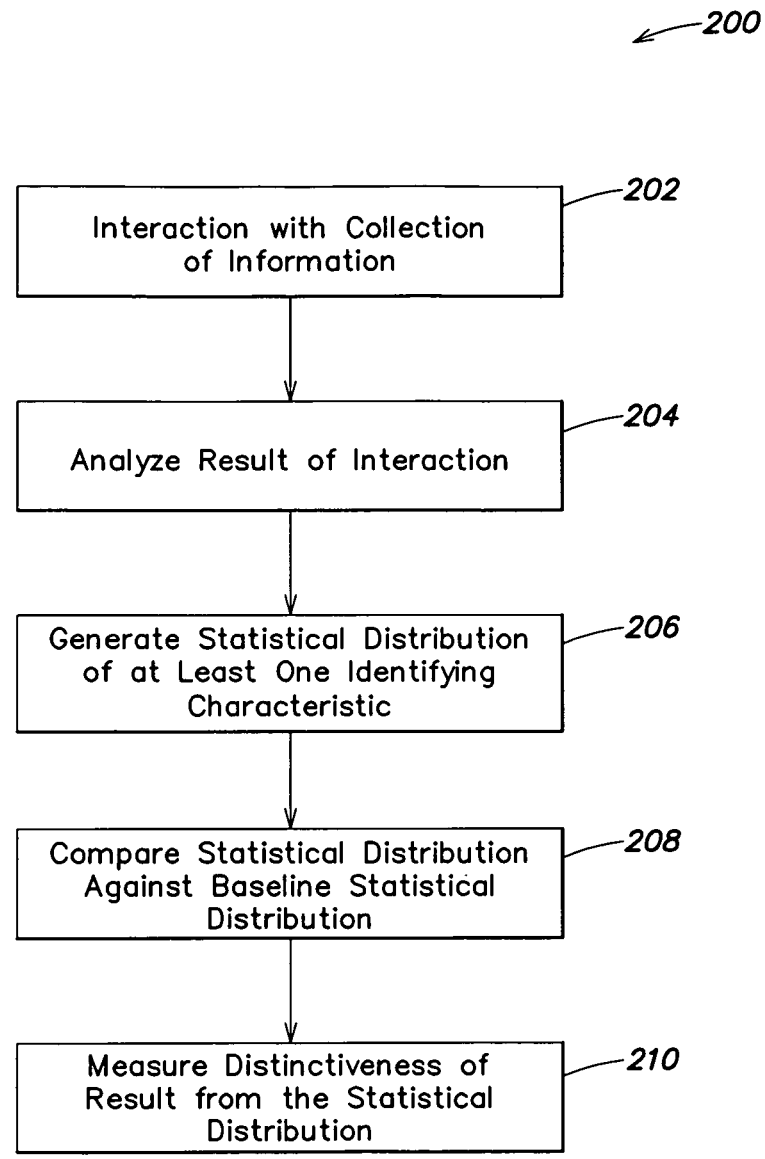
FIG. 2A shows a process for generating a measurement of distinctiveness of a result according to another embodiment of the present invention.

Referring to FIG. 2A, shown is an example of a process, 200, for generating a measurement of distinctiveness of a result obtained from interaction with a collection of information. At step 202, an entity interacts with a collection of information. Typically an entity represents a user or users, but may be a process or search engine, or other mechanism that operates on a collection of information to return a result. One should appreciate that a collection of information can be virtually any collection of electronic information. Typically, a collection of information comprises information stored for later use/access, although transient data sets may be accommodated using techniques that maintain the coherence of the data set for the duration of the query interaction. Examples of such techniques include data snapshots, generational versioning, and time-stamping.

In one example, the collection of information is a database containing records that a user is performing searches on. The interaction of step 202 includes, but is not limited to, searches performed by the user, navigation within the database records (navigation may occur through intermediaries—for example, links in a web-based interface), queries executed by a query engine, sorts, and selections on the database. Interaction with the collection of information should encompass the subclass of all possible interactions with the collection of information where a result is returned from within the collection of information. In another example, the collection of information is a set of documents. As discussed, documents can be thought of in traditional sense as discrete text files that may also be associated with metadata, such as a name, author(s), date of creation, a subject, date of modification; however, the notions of a set of documents and a document itself are intended to be more comprehensive, and should be understood to include other addressable and selectable media, including, for example, non-textual data, such as sound and visual recordings, database records, and composite entities such as might be described using HTML and XML encoding. Individual documents and collections of documents may take many forms, including file systems, relational databases, hypertext collections (such as the World Wide Web), or the like.

In another example, interaction at step 202 with the collection of information comprises browsing by a user through an interface: the interface requests and receives information from the collection of information in response to the user's browsing, and the process comprises the interaction between the user and the collection of information. In one embodiment, the collection of information includes collections of faceted information. A faceted information space comprises a collection of information where each unit of information contains information identifying it, i.e. a facet; alternatively, a facet may be associated with a unit of information rather than contained within. A facet may comprise, to provide some examples, an identifier of data content, data context, meta data, tags, and/or source information. A facet may be a dimension, field, and/or attribute within a database. A facet may also be a record or n-tuple. In one example, a database for a winery stores records in a database regarding price, type of wine, region, and each record alone or in combination may comprise a facet. Stated generally, a facet is a means of categorizing information. The concept of information facets is derived from library science-faceted classification addresses the problem that a single taxonomy is too rigid to categorize the world. Facets are often referred to as dimensions, fields, or attributes comprised of a collection of values.

Typically interaction with the collection of information will return a subset of the information contained in the collection, where that subset may range from zero results to the entire collection. It should also be noted that elements of the collection may represent excerpts or elements of larger informational data outside the collection; thus the total amount of information represented may be substantially greater than the amount of information directly available for interaction in the collection alone.

At step 204, the result of the interaction with the collection of information is analyzed. According to some embodiments, step 204 may occur at a number of times during the course of interaction with the collection of information, and repetitive interaction, sequential, and concurrent interactions are contemplated. According to one embodiment, the analysis on a result includes determination of at least one identifying characteristic within the set of results. The at least one identifying characteristic determined at step 204 may depend on the make up of the collection of information. In one example, the collection of information comprises "traditional" documents, with text, author(s), and a subject, for example. The at least one identifying characteristic may be determined based on the text, the author(s), and the subject of the documents. In one example, identifying characteristics correspond to keywords in the text of a document, author(s) of documents, the subject of the document, and in another example the identifying characteristic corresponds to any combination thereof.

The determination of the at least one identifying characteristic may include analysis of any identifying information regarding the elements of the collection of information. In one example, metadata associated with the elements of the collection of information are analyzed. In one embodiment, the analysis of the result of the interaction with the collection of information includes consideration of date of creation, date of modification, date of last access, title, file extension, file type, file size, file composition, author(s), editor(s), keyword, containing specific information, containing a specific element, subject(s), summary information, derivable information, all or part of the file name, word or phrase within a file, location on storage media, physical location, relational information, non-textual data, as some examples. One should appreciate that information associated with and/or derivable from electronically stored information can include any information that may be stored and associated with a collection of information, including information stored by operating systems and information typically considered "metadata" and may also include other system information regarding more fundamental operations/information on electronically stored information, for example, memory location, operating system access information, associated driver and device information, as some examples. Any of the foregoing may also comprise alone or in combination a facet of information that may be used to analyze a set of results obtained from interaction with a collection of information.

Figure 2B:
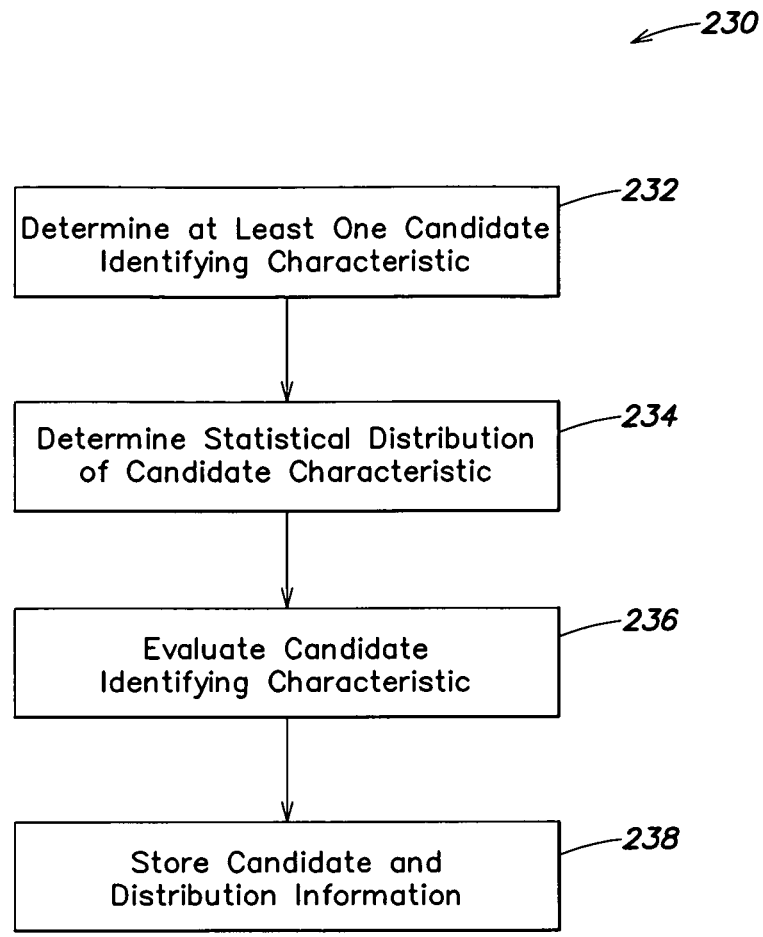
FIG. 2B shows a process for process for determining at least one identifying characteristic according to one embodiment of the present invention.
Figure 2C:
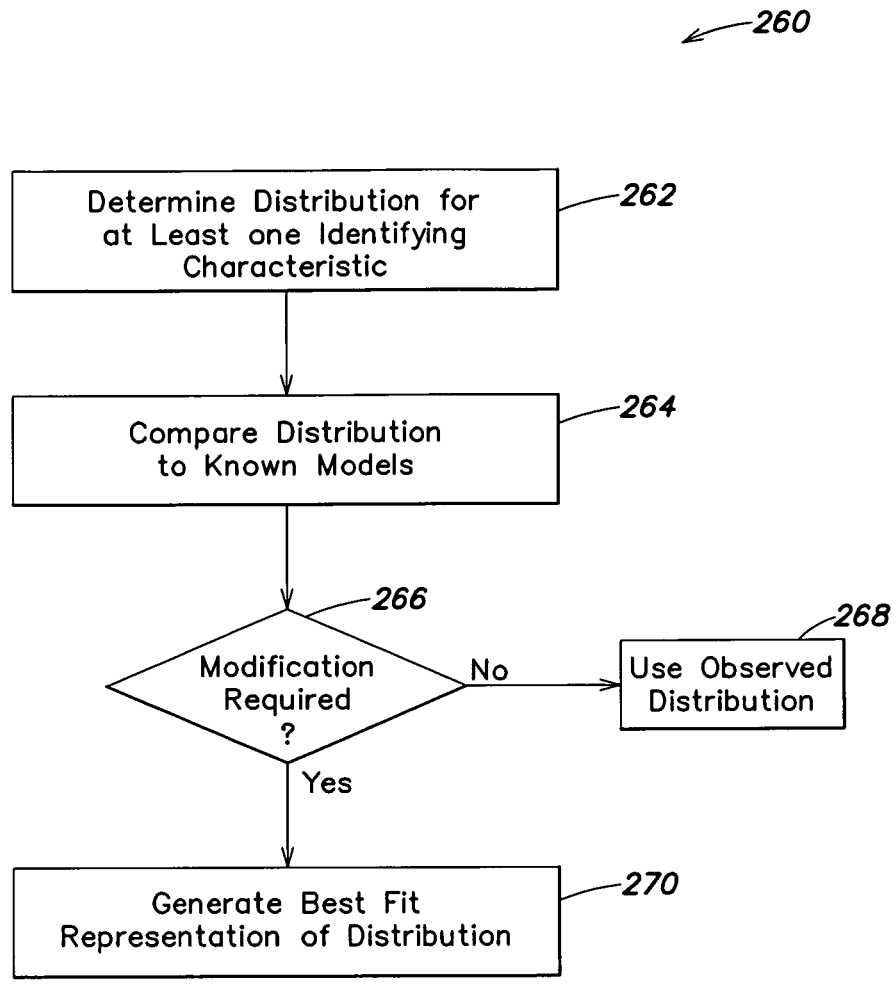
FIG. 2C shows a process for modeling the statistical distribution of an identifying characteristic according to one embodiment of the present invention.

The analysis of the result of the interaction, at step 204, may include another process, for example, process 230 FIG. 2B, wherein a candidate identifying characteristic is determined for elements of a set of results, at 232. The determination of a candidate identifying characteristic may be based on review of all possible information associated with the interaction between an entity and a collection of information. In one example, the interaction comprises queries executed against a database (collection of information). The content of the query may determine the identifying characteristic(s) employed during, for example, process 200, for generating a measurement of distinctiveness of a result obtained from user interaction with a collection of information. The context in which the query was executed may also be a factor in determining identifying characteristics.

Referring to FIG. 2B, the statistical distribution of the candidate characteristic within the result set is determined at 234, and the candidate identifying characteristic is evaluated for use in determining the distinctiveness of the result set. In one example, certain characteristics are expected to be found in a result set, and those characteristics are used in the analysis of the result set to determine identifying characteristics. In one particular embodiment, the result set is obtained from collection of information pertaining to a winery, and the expected characteristics may include the type of wine, a year of bottling, the year the grapes were grown used to make the wine, weather patterns for the growing season, information on soil (nutrient content, etc.) in which the grapes were grown, location, among a number of other characteristics on which information is stored and/or associated. These expected identifying characteristics may be established as a default, and used automatically; also, the expected characteristics may be learned through multiple interactions with the collection of information over time. In one embodiment, learned identifying characteristics are automatically evaluated in addition to candidate characteristics obtained from the interaction with the collection of information. In another embodiment, subsets/combinations of the expected characteristics may also be used. One should appreciate that "expected" characteristics need not be used, and the interaction between an entity and the collection of information may exclusively determine the identifying characteristics that are used, or may contribute to the determination of the identifying characteristics that are used in determining the distinctiveness of a particular result set.

The determination of the statistical distribution for a candidate identifying characteristic at 234 may involve manipulation of the result set that was returned. In one example, a representation of the result set is used that is adapted to statistical manipulation. In another example, the generated statistical distribution is an approximation of the incidents of the identifying characteristic. In one example, the statistical distribution is determined using sampling on the result set; in another example, modification of the result set is permitted without need for recalculation of the statistical distribution. Other approximation techniques include examining a similar result set(s) and the statistical distribution(s) obtained on the similar result to provide an expected distribution for the result set being analyzed. In one example, the statistical distribution is univariate, that is, based on one variable. In another example, the statistical distribution is multivariate, that is, based on more than one variable.

Referring again to FIG. 2B, using the statistical distribution, obtained at step 234, candidate identifying characteristics can be evaluated by modeling and/or evaluating the result set using the candidate, at 236. In one example, thresholds are established to determine if an identifying characteristic(s) is worth the computational effort needed to derive the distribution for the characteristic. Some potential identifying characteristics may be excluded in advance, as for example, the word "the" in a document may be particularly unsuited to identifying distinctiveness.

Information on the statistical distribution of candidate identifying characteristic(s) is stored at step 238. In one embodiment, the stored information is used as part of a process for measuring the distinctiveness of a set of results. In one example, the stored information may be accessed as part of process 200, shown in FIG. 2A, during steps 204-206. In some embodiments, only portions of the distribution information related to candidate identifying characteristic(s) are stored. The storing of distribution information may involve a determination regarding the value of the statistical information. In one example, a determination is made based, at least in part, on the computational effort involved in generating the statistical information. In another embodiment, the value of the statistical information is compared for a plurality of candidate identifying characteristics and the statistical information is stored based on the comparison. Typically, information requiring greater computation effort is treated preferentially over information of less computational effort; however, other factors may be used in the determination. In one embodiment, factors include, for example, computational effort, age of the information, resource usage, or a combination thereof. One should appreciate that process 230, is an optional process, and one that is not necessarily invoked.

With particular reference to process 200, FIG. 2A, in a typical embodiment, interaction with collection of information, 202, may occur after a baseline statistical distribution(s) is determined for the collection of information, for example, as part of process 300, shown in FIG. 3A (discussed in greater detail below). In step 204, analysis of the result of the interaction yields identifying characteristics in common with those of already determined baseline distributions. In another embodiment, identifying characteristics obtained from the interaction with the collection of information are used to obtain a baseline distribution either at the time of the interaction or thereafter. In one example, process 330 FIG. 3B (discussed in greater detail below), determines a baseline statistical distribution for an identifying characteristic from the collection of information. The identifying characteristic is determined from the result of an interaction with a collection of information, for example, a result returned as part of process 200, FIG. 2A.

Referring again to FIG. 2A, process 200, continues with the generation of a statistical distribution for at least one identifying characteristic within the result set returned from interaction with the collection, at 206.

As discussed above, the at least one identifying characteristic may be determined through a sub process, for example, using process 230; in conjunction with the sub-process, a statistical distribution may be calculated and stored for the at least one identifying characteristic. In one alternative, the identifying characteristic(s) used to analyze the result set is determined from existing distributions of identifying characteristics for the collection of information as a whole. In another alternative, such characteristic(s) may be determined from other sets, including random samples of the collection of information as a whole and random samples of other sets which, for example, may have been obtained during previous process invocations. In one embodiment, generation of the statistical distribution for the at least one identifying characteristic, 206, involves retrieval of a stored statistical distribution. Optionally, (not shown) a check may be performed to determine if it is appropriate to use the stored values or if a new calculation should be used. In one example, it is determined that the number of changes to the underlying set exceeds tolerance for changes, and the statistical distribution for the at least one identified characteristic is generated at step 206. In another example, no data exists on the at least one identifying characteristic, and the statistical distribution is generated at step 206. The determination of the statistical distribution for the at least one identifying characteristic may involve manipulation of the result set that is being analyzed. In one example, a representation of the result set is used that is adapted to statistical manipulation. In an embodiment that uses a representation of the result set, a statistical distribution is determined at 206. In another example, the statistical distribution is obtained based, at least in part, on text, metadata (e.g. categories assigned to the document), or other information derived from the elements of the result set. In another example, the statistical distribution comprises an approximation of the incidents of the at least one identifying characteristic. The statistical distribution may be determined using sampling on the result set; in another example, a best fit approach is used to model the distribution according to a known distribution curve. In yet another example, regressions are performed to determine a best model for the statistical distribution.

In one embodiment, a determination may be made that a present result set is substantially similar to a prior result set with stored distribution information. The distribution information obtained may be employed without recalculating the distribution information for the present result set to save computational effort. In other words, similar results generated from interactions with the collection of information may be used to provide statistical distributions for at least one identifying characteristic where there is substantial overlap between the present result set and one that had previously been determined without requiring recalculation. It is realized that permitting some variation between the present result set and one that had previously been analyzed without undergoing expensive computation may improve some implementations and, in particular, reduce computational burden and expense. In some embodiments, a threshold is established for determining when recalculation is required. The threshold may be based on a specific number of differences and/or a percentage of difference with respect to the result sets (for example, percent difference in size).

Other approximation techniques that may be used at 206 for generating a statistical distribution include, but are not limited to, examining a similar result set(s) and the statistical distribution(s) obtained on the similar result set to provide an expected distribution for the at least one identifying characteristic being analyzed.

Step 206 may include another process for obtaining a model of the distribution for the result set adapted to statistical manipulation. In one example, process 260 is called to model the statistical distribution of the at least one identifying characteristic within the result set. At step 262, a statistical distribution is obtained for the at least one identifying characteristic. At step 264, the measured/observed distribution is compared to a known distribution curve and/or model. Known distributions may be in the form of parameterized functions $ax^b$, as one example. Such known distributions may be calculated in advance, calculated offline, obtained through regression analysis, calculated from a fitting procedure, and may be determined on demand. At step 266, it is determined if modification to the measured/observed statistical distribution is required. At step 266(NO), it is determined that the measure distribution correlates sufficiently to a smooth distribution curve that modification is unnecessary, and the measured/observed distribution is stored for later use at 268.

At step 266(YES), it is determined that modification should be performed on the measured distribution. Modification of the measure/observed distribution may take many forms. In one example, modification of the measured statistical distribution takes the form of "smoothing" of the distribution to eliminate singularities. Singularities may result from operations that employ logarithms and division, since such functions may result in values of infinity for a particular portion of a distribution, precluding numeric computation of the statistical distribution through the region including the singularity. In one example, singularities are eliminated by replacing the values with appropriate values. In another example, a zero weight is replaced by a small but non-zero weight. In another example, the value may be replaced by a value characteristic of the distribution surrounding the singularity. One should appreciate that the discussion of smoothing the measured/observed distribution may take place independently of the steps discussed for process 260. A number of embodiments will realize improvements in processing by incorporating smoothing of distributions where singularities are present. The discussion of the use of smoothing should not be interpreted to be limited to the process discussed or read to require the steps identified in order to provide for smoothing of distributions. In one particular example, even where process 260 is not used, smoothing may be invoked as part of a process for generating a measurement of distinctiveness of a result obtained from user interaction with a collection of information, for example at part of step 206.

Modification of the distribution may take the form of a fitting process, where the observed/measured distribution is fit to a known model of a statistical distribution. Modification of the statistical distribution may also involve approximation of the distribution, for example, by examining similar result sets to provide expected distributions in order to bypass analysis of the primary result set (not shown). At step 270, a best fit representation of the distribution is obtained and may be used for further analysis of distinctiveness. In one example, the best fit representation is used as part of a larger process for generating a measurement of distinctiveness of a result obtained from user interaction with a collection of information.

Using the statistical distribution for the at least one identifying characteristic, a measure of distinctiveness for the result set is determined at step 208. The measure of distinctiveness may be determined from a univariate distribution, that is, based on one value (i.e. identifying characteristic). In one embodiment, the univariate distribution is assigned a weight value to generate the measure of distinctiveness. In another embodiment, the weight value constrains the distribution to reflect a probability distribution; in other words, the sum of the weights for the result set is equal to 1. In an embodiment where the result set comprises textual information and the at least one identifying characteristic is generated from words within the text, the weights associated with the at least one identifying characteristic may reflect the frequency of the words in the result set as a fraction of the total number of words in the result set.

Examples of functions that may be used to derive a distinctiveness measure include, but are not limited to: Kullback-Leiber divergence, Euclidean (L2) distance, Manhattan (L1) distance, Hellinger distance, diversity difference, cosine difference, Jaccard distance, Jenson-Shannon divergence, and skew divergence. Also, similarity functions and correlation measures, such as the Pearson correlation coefficient, Dice coefficient, overlap coefficient, and Lin similarity, can be converted into distinctiveness functions by inverting their sense (i.e., a higher similarity score implies a smaller difference between the distributions). Other functions familiar to those skilled in the art of statistical methods can be incorporated into the disclosed processes and methods.

In another embodiment, the measure of distinctiveness may be determined from a multivariate distribution, that is, based on a set of values (i.e. identifying characteristics). In one example, values are represented by n-tuples, that is, relations based on a group of values. The multivariate distribution may also be based on multiple sets of multiple values. In one example, the result set is made up of documents comprising subject, type, and an author, thus, a set of values corresponds to each subject, type, and author. In one implementation values are represented by both the presence and absence of the value. For example, if a value(s) is present in 60% of the elements of the analyzed set, the absence of that value(s) occurs in 40% of the elements of that result set.

As discussed above, correlated values represent distinct challenges in determining identifying characteristics and the resulting measure of distinctiveness. In one example, certain identifying characteristics have too many dependencies to appropriately model the statistical distribution. In one example, the number of dependencies makes the calculation and/or approximation of the statistical distribution intractable. One should appreciate that steps 206 and 208 may take place simultaneously, and, in one example, occur as one step, rather than as discrete steps.

Process 200 continues at step 210, and the measure of distinctiveness obtained for the result set is compared against a baseline measure of distinctiveness. A baseline measure for distinctiveness may be predetermined before process 200 begins, or a baseline measure of distinctiveness may be generated on demand at step 210. The baseline measurement for distinctiveness provides a comparison measurement to generate a relative score of distinctiveness for a particular set of results obtained from interaction with a collection of information. In one example, the baseline measure is derived from the statistical distribution of at least one identifying characteristic taken from the collection of information as a whole. In another example, the baseline measure is determined from sets of varying sizes randomly sampled from the collection of information. In one alternative, using a known result set size, random samplings may be obtained from the collection of information of the same or similar size, and a distinctiveness scoring determined for the random sampled sets to generate a baseline measure. In one example, process 300 may be invoked to determine a baseline measure of distinctiveness.

Figure 3A:
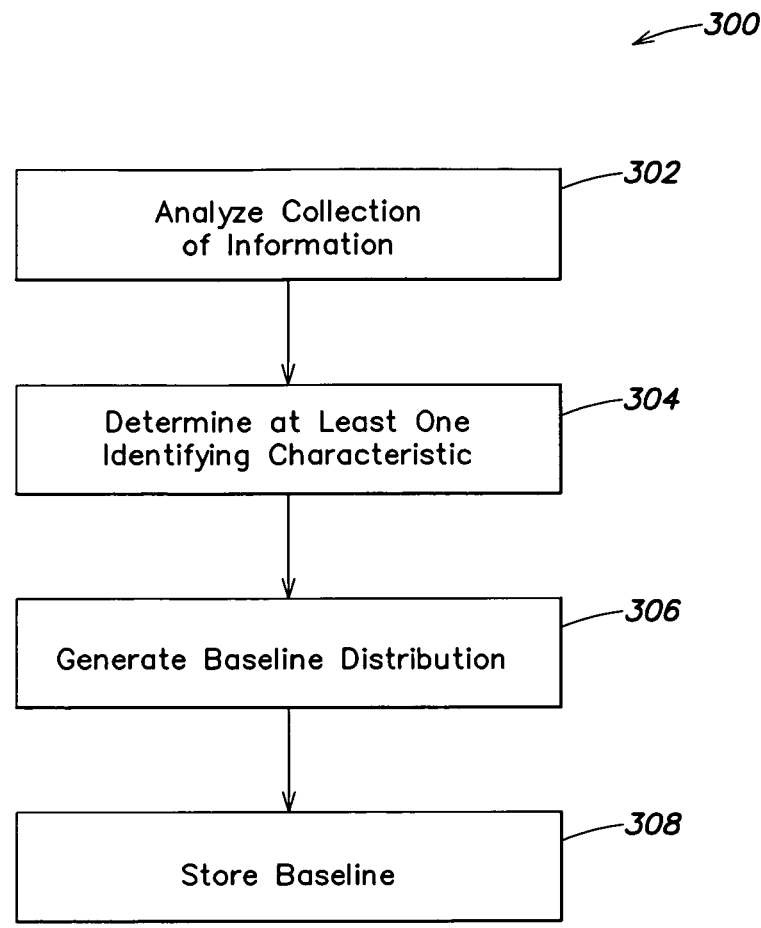
FIG. 3A shows a process for determining a baseline distribution according to one embodiment of the present invention.

Referring to FIG. 3A, a collection of information is analyzed at step 302 to determine an identifying characteristic, 304, on which to generate a statistical distribution at 306. According to one embodiment, a collection of information comprises a set of documents that is analyzed, 302, to obtain identifying characteristics, 304, to generate a baseline distribution, 306, that can be stored, 308, for later/concurrent comparison to other measurements of distinctiveness to ascertain the distinctiveness of, for example, a result set derived from a collection of information. In one embodiment, the distribution can be based on document text, metadata (e.g., categories assigned to the document), or any other information derived from the documents in the collection of information. In one embodiment, the distribution can be approximate, as long as it is representative. For example, a result set of documents can be examined for term or phrase frequency, and that frequency can be used as the statistical distribution model for the result set of documents.

In an embodiment where the distribution generated at 306 is approximate, another process may be executed to model the distribution. In one example, process 260 is executed to generate an approximation of the baseline distribution. In another example, process 260 is used to determine if the observed/measure distribution is amenable to statistical manipulation without modification. One should appreciate that a separate process need not be executed, and the functions described in process 260 may be incorporated into process 300, for example, as part of step 306.

In one embodiment, a baseline distribution for a plurality of identifying characteristics is obtained by repetition of process 300, although one should appreciate that multiple instances of process 300 may operate concurrently, each analyzing a different identifying characteristic and generating a baseline distribution for either the collection of information as a whole, or a subset of the collection of information. In one example, the baseline distribution is determined for a different result set obtained through interaction with the collection of information.

According to process 300, step 304 may be determined at, before, or after interaction with a collection of information takes place. In one example, the identifying characteristics are determined before interaction with the collection of information takes place and the determination of identifying characteristics may include analysis of candidate identifying characteristics. Such analysis may take part as part of another process, for example as process 230. Process 230 may be executed against the entire collection of information, or subsets of the collection of information to determine candidate identifying characteristics used to generate a baseline distribution, for example in process 300 at 306.

Figure 3B:
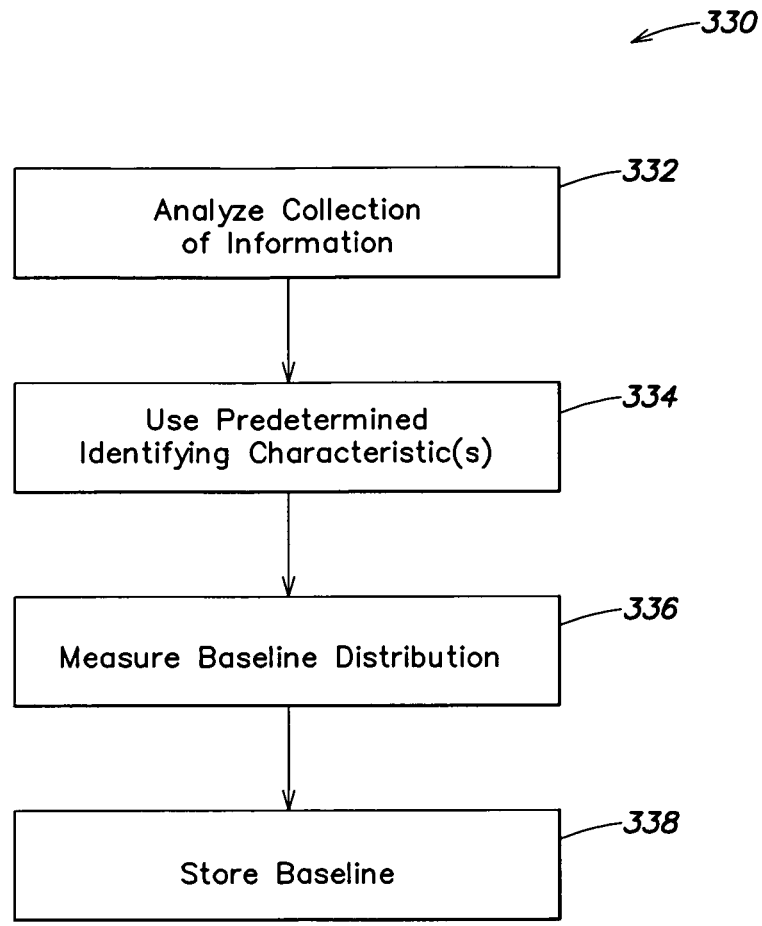
FIG. 3B shows a process for generating a baseline statistical distribution for an identifying characteristic according to another embodiment of the present invention.

Referring to FIG. 3B, shown is a process 330 for generating a baseline statistical distribution for an identifying characteristic that has already been determined. The identifying characteristic may have been determined as part of previous execution of a distinctiveness measure, or may be derived from a concurrently executing query, as examples. At step 332, the collection of information is analyzed using a predetermined identifying characteristic at 334. A baseline distribution is determined for the identifying characteristics at 336 and stored at 338. In one embodiment, the baseline distribution is determined against the collection of information as a whole. In another embodiment, the baseline distribution is determined from subsets of the collection of information. In one example, the subsets may be determined from random samplings of varying sizes taken from the collection of information. In another example, subsets may be determined from result sets obtained through interactions with the collection of information.

A scoring of the distinctiveness of a particular result of an interaction with a collection of information through, for example, process 200 provides many options in governing the interaction between end users and collections of information; in particular, the distinctiveness measure may be used to, for example, improve the result delivered to an entity interacting with a collection of information, determine similar result sets of interest to the entity/end user, provide feedback regarding the interaction with the collection of information and potential suggestions for improvement, generate options for modifying, expanding, or reworking the interaction, among other options discussed in greater detail herein.

Using a Distinctiveness Measure to Improve User Experience

A distinctiveness measure may be used to guide query interpretation. In one embodiment, a user may enter queries by way of a text box, where the search intent of such queries may be open to multiple interpretations. In another embodiment, the user may have access to a formal query language, such as SQL, but may nonetheless be unable to consistently formulate queries that clearly communicate intent.

By applying a measure of distinctiveness (e.g., using the salience measure described herein), an information access system can evaluate multiple interpretations of a user's input and determine which of these possible query interpretations lead to interesting queries. By culling the interpretations with low distinctiveness measures, the system can offer a clarification dialogue that offers the user the various high-distinctiveness interpretations as options. In some embodiments, the system may also cluster similar interpretations by computing the distinctiveness of query interpretations relative to one another.

In another aspect of the invention, a distinctiveness measure may be used to improve the summarization of a set of documents. In some embodiments, the values associated with the most significant contributions to the distinctiveness of a document set (e.g., a measure based on relative entropy, where the measure sums contributions associated with different values) may be presented to the user as part of a summary view of that document set. Because distinctiveness can be measured relative to any baseline distribution, the baseline can be selected to reflect the user's context. In one embodiment, a user submits a query to a data storage and retrieval system, which returns a query result set with associated statistical distributions for analysis. A calculation for the distinctiveness score of the query result set is made relative to a baseline distribution, in such a way that the system may subsequently retrieve information regarding the contribution of individual statistical distribution components to the result. The degree of contribution of individual components to the overall distinctiveness score of the query result set may be used to generate summary views based on relative contributions. The system returns a summarized view of the result set to a user.

FIG. 18B illustrates a user interface presenting one form of summarized view to a user. The used entered a text based search into a search engine interface. The search was executed and returned a large number of results. Based on a distinctiveness measure, the results generated by the search were summarized, highlighting the contributors to the distinctiveness score according to their contribution. Thus, for example, "Presidential Elections (US)" is highlighted for user review based on its contribution to the distinctiveness score of the result set. Highlighting may take many forms, for example, changed font, bold, underline, bordered, background, texture, and size, among other options.

In another aspect of the invention, a distinctiveness measure may be used to guide the generation and presentation of query refinements. By definition, a query refinement is intended to take the user to a state that is different than the current query context (i.e., result set for the current query). Given a set of possible query refinements, the system can evaluate their distinctiveness relative to the current context, as well as relative to the overall document collection or any other baseline. By culling the refinement candidates with low distinctiveness measures, the system can offer a clarification dialogue that offers the user the various high-distinctiveness refinement candidates as options. In some embodiments, the system may also cluster similar refinement candidates by computing the distinctiveness of refinement candidates relative to one another.

FIG. 23 illustrates a user display indicating potential improvements for user navigation/search/querying based on distinctiveness score analysis. In one example, the user's search was unconstrained by location of search. The elements of the collection of information on which the user is searching may have been grouped in segments based on distinctiveness score, in which case, the segments that would generate more results with higher distinctiveness scores are identified, in one example at 2302. Where many options exist for modifying the search to achieve more distinct results, the similar options (that is, options that may be related to a certain interpretation) may be grouped together at 2302 and 2304. One should appreciate that many options may be summarized and presented.

In another aspect of the invention, the system can display values that are estimated to have high utility for summarizing a set of documents. In some embodiments, the estimated utility of a value for summarizing a set of documents may be proportional or otherwise positively correlated to the frequency with which the value occurs in the set of documents. In some embodiments, the estimated utility of a value for summarizing a set of documents may be proportional or otherwise positively correlated to its contribution to the salience of the set of documents relative to some baseline set, such as a corpus of which the set of documents represents a subset. In some embodiments, the estimated utility of a value for summarizing a set of documents may be inversely proportional or otherwise negatively correlated to the salience of the subset of the set in which the value occurs, relative to the set of documents.

In another aspect of the invention, the system can display values that are estimated to have high utility for refining a set of documents. In some embodiments, the estimated utility of a value for refining a set of documents may be a function of the frequency with which the value occurs in the set of documents whose size has a mean value, such as half of size of the set of documents or the square root of the set size. In some embodiments, the estimated utility of a value for summarizing a set of documents may be proportional or otherwise positively correlated to the salience of the subset of the set in which the value occurs, relative to the set of documents.

In another aspect of the invention, the system can display both summarizations and refinements of a set of documents via a unified interface. In a particular embodiment, a visual interface, such as a heat map, can be used to display the values that represent summarizations and refinements, assigning different colors from a particular color range to each to indicate different values of the distinctiveness measure, as may be seen in FIG. 18A. The same interface can utilize other visual metrics; for example, size of the document set that corresponds to a particular refinement may be communicated by the size of the visual element.

In one example, the elements of the collection are not already grouped, and the user's search triggers analysis of the collection of information based on identifying characteristics within potential results returned to the user and derived distinctiveness scores. In one example, the analysis may identify possibilities of narrowing the search based on the analysis of distinctiveness as part of the process of returning the result of the user's search.

In one aspect, as described herein, the distinctiveness of a set of documents that match a query (i.e., the query results) is used to determine query ambiguity. The distinctiveness can be relative to the overall document collection or some other baseline, such as the results of previous query in a context of iterative query reformulation. This aspect of the described subject matter is also highly flexible, allowing for distinctiveness to be measured relative to any baseline set of documents.

Typically information retrieval systems serve as an interface between human end users and automatically indexed collections, although it is equally valid to consider such IR systems being controlled by an automated process performing a sequence of actions. Thus, a query may represent a user's interaction with the IR system, or an equivalent operation as performed by an automated process in a so-called "offline" or non-user-interactive mode. In one embodiment, the primary effectiveness measure of an IR system is the extent to which it enables users to find relevant or useful information in the collection it has indexed.

Figure 6:
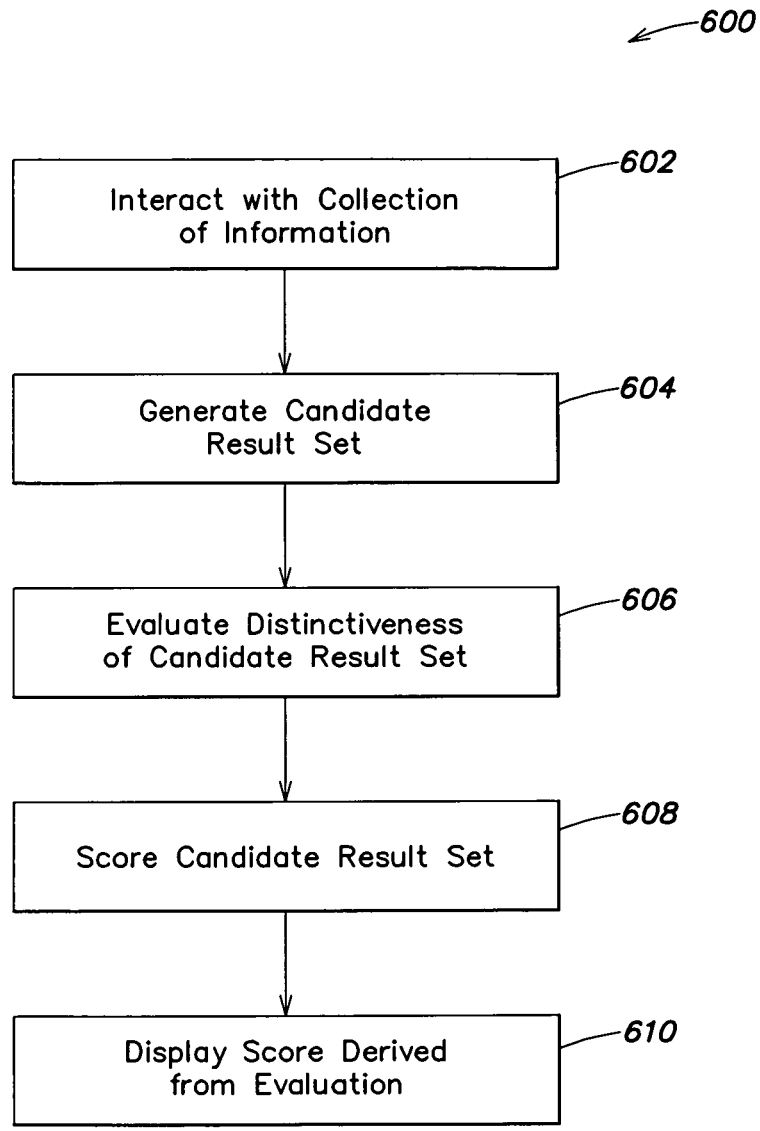
FIG. 6 shows a process for improving user interaction with a collection of information according to one embodiment of the present invention.

Referring to FIG. 6, shown is an example of a process, 600, for improving user interaction with a collection of information. One should appreciate that the improvement of user interaction applies equally to improvement of results delivered to, for example, an automated process as discussed above.

At step 602, an entity interacts with a collection of information. Typically an entity represents a user or users, but may be a process or engine, or other query mechanism that operates on a collection of information to return a result. One should appreciate that a collection of information can be virtually any collection of electronic information. Typically, a collection of information comprises information stored for later use/access, although transient data sets may be accommodated using techniques that maintain the coherence of the data set for the duration of the query interaction. Examples of such techniques include data snapshots, generational versioning, and time-stamping.

In one example, the collection of information is a database containing records that a user is performing searches on. The interaction of step 602 comprises searches performed by the user, and may include navigation within the collection of information, for example, browsing of database records (navigation may occur through intermediaries—for example, as links in a web base interface), queries executed by a query engine, sorts, and selections within the collection of information. Interaction with the collection of information should be read broadly and encompass interactions with the collection of information where a result is returned from within the collection of information.

In another example, the collection of information is a set of documents. As discussed herein, documents can be thought of in traditional sense as discrete text files but should also include other addressable and selectable media, and composite entities such as might be described using HTML and XML encoding. Individual documents and collections of documents may take many forms, including file systems, relational databases, hypertext collections (such as the World Wide Web), or the like.

In another example, interaction at step 602 with the collection of information comprises browsing by a user through an interface; the interface requests and receives information from the collection of information in response to the user's browsing, and sequence comprises the interaction between the user and the collection of information. In one embodiment, the collection of information may comprise a faceted information space, as discussed above. In yet another example, the collection of information comprises a database, and an entity interacts with the database via request for information within the database at 602.

In one example, an interaction with the collection of information will return a subset of the information contained in the collection at step 604, where that subset may range from zero results to the entire collection. It should also be noted that elements of the collection may represent excerpts or elements of larger informational data outside the collection, thus the total amount of information represented may be substantially greater than the amount of information directly available for interaction in the collection alone.

At step 604 a candidate result set is returned based on interaction with the collection of information. Rather than return the candidate result to an entity (ultimately to a user), process 600 provides for evaluation of a candidate result based on a scoring of distinctiveness of the candidate result, at 606. In one example, after a query is submitted to a collection of information which includes, for example, a database, a candidate result set is generated at 604. The candidate result set may be the result of an interpretation of the submitted query, as queries are often inherently ambiguous. The potential result may involve the generation of a plurality of result sets each representing a possible interpretation. At step 606 a distinctiveness score is determined for the potential result set. Step 606 may include separate processes for determining a distinctiveness score; in one example, process 100 may be used to return a normalized scoring of distinctiveness for a candidate result. In another example, process 100 is executed against each candidate result and the candidate results may be evaluated at 608 based on the distinctiveness score for each. In one embodiment, step 606 includes another process, for example, process 200, for determining a relative distinctiveness score of a candidate result set. One example includes using process 200 to return a relative distinctiveness score for each candidate result, and evaluation at 608 includes comparing the distinctiveness of each candidate result.

Based on the evaluation of the distinctiveness score of the candidate set an output is displayed at 610. In one example, the output includes recitation of the distinctiveness score accompanying the candidate result set. In another example, the output may include options for improving the interaction with the database accompanied by the candidate result. In another, a dialog may be initiated between, for example, an end user and a system on which process 600 is implemented. According to one embodiment, the dialog provides suggestions on how to improve the distinctiveness score of a returned result, informing the user on options that may be taken to modify, enhance, specify, or generalize, for example, a query being executed against the collection of information.

In one alternative, rather than indicating how to improve distinctiveness, similar candidate results may be presented. In one example, candidate results are grouped together and presented to a user as the displayed output at 610. A combination of groups of similar results and an indication of groups that achieved higher distinctiveness scores may also be displayed at 610.

In one embodiment, as part of the evaluation of the distinctiveness of a candidate set, a determination may be made regarding the contributions that certain elements of the result set of the interaction with the collection of information made to the distinctiveness score. For example, a user-submitted query may contain superfluous terms that contribute little or nothing to the distinctiveness of the query result set. A dialog discussed above with respect to step 610 may include suggestions on eliminating terms that don't significantly contribute to the distinctiveness of a candidate result. The dialog with a user may also involve multiple invocations of process 600, each invocation refining the interaction of the user with the collection of information. A user in response to a dialog presented at 610 may identify query terms that contributed little or no weight to an initial distinctiveness scoring, taking the interaction with the collection of information in an entirely new direction.

In one example, a distinctiveness measure is used to guide query interpretation. That is, a user may enter queries by way of, for example, a text box, where the few words he or she enters may be open to multiple interpretations. Alternatively, the user may have access to a formal query language, such as SQL, but may nonetheless be unable to consistently formulate queries that clearly communicate intent.

According to one aspect, by applying a measure of distinctiveness, an interaction with an entity can be improved by evaluating multiple interpretations of, for example, user's input to determine which of the possible query interpretations lead to interesting result sets. In one example, by culling the interpretations which lead to result sets with low distinctiveness measures, the user interaction with the collection of information is improved by offering a clarification dialogue, for example at step 612. In one example, the display of an output at 612 offers the user the various high-distinctiveness query interpretations as options to be selected. In some embodiments, the process may generate clusters of similar interpretations by computing the distinctiveness of query interpretations relative to one another.

According to another aspect, user interaction with the collection of information may also be tracked to identify patterns, i.e. relationships, between a user's intended interpretation of a query and one that would be suggested from an evaluation of distinctiveness of a candidate result. In one example, a user history may assist in a determination of the output displayed at 610.

The following provides additional details regarding various applications of the salience measure to improve user experience in interacting with data. These include, without limitation, guiding query interpretation, summarization, intelligent ranges, event detection, and hierarchy discovery.

Guiding Query Interpretation

Perhaps the biggest challenge for query interpretation is when the system has to infer the user's intent from a few words entered into a search box. Consider the problem of converting a sequence of words into a Boolean query. For example, a system can interpret the query computer science as computer AND science, computer OR science, or as the phrase "computer science". The system may include records that match the query terms in a title field, an abstract field, an author field, etc. The system may also allow one or more query expansion techniques, such as stemming and thesaurus expansion. In addition, further query modification techniques, such as spelling correction, are applicable. Combining all these options creates an explosion of candidate interpretations for a user's query.

Control over these options may be exposed to the user, but this approach is likely to overwhelm and confuse the user. For example, how does a user decide whether to search against the title or abstract field? The salience measure described herein allows the system to determine which of these possible query interpretations lead to interesting (i.e., in particular embodiments, more distinct from the overall corpus, or highly coherent) sets of results. By culling interpretations with low salience measures, the system can offer a clarification dialogue that provides the user the various high salience measure interpretations as options. Moreover, the system can cluster similar interpretations by computing their relative salience measures to one another.

Figure 16:
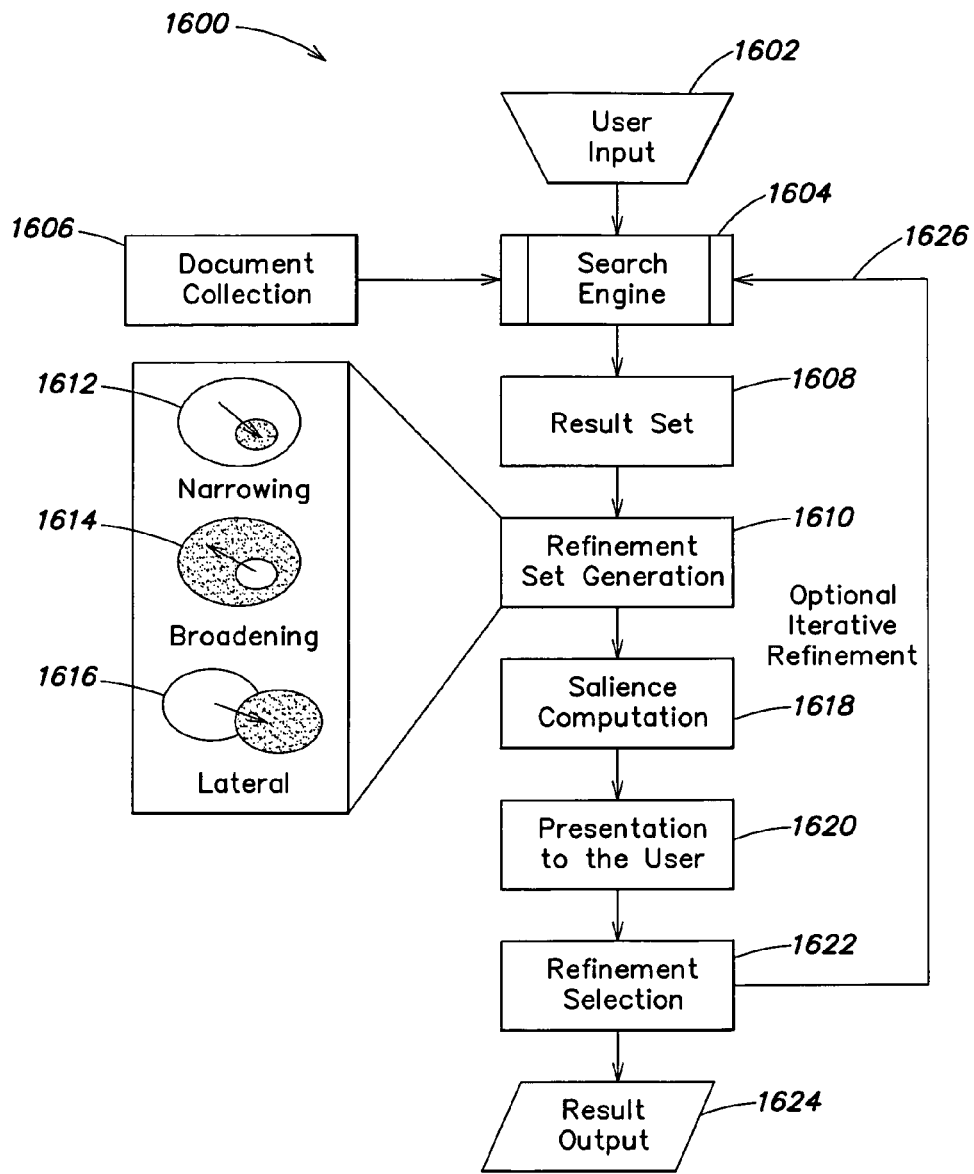
FIG. 16 shows a process for refining a returned result according to one embodiment of the present invention.

FIG. 16 illustrates an example process 1600, for refining a returned result according to one embodiment. An end user submits a raw query 1602 to a data storage and retrieval system 1604, possibly through another process or interface. The system determines possible interpretations, two examples being 1612 and 1614, for the query 1608. Each possible query is either performed or approximated to obtain statistical distributions of identifying characteristics for their respective result sets. An absolute measure of salience of the results set is determined for each query interpretation by the salience calculation module 1618; in other words, the salience measure for each interpretation is made relative to the collection of information in the data store as a whole. Optionally the query interpretations and their results (typically, summarized results) may be displayed to the user 1620, to allow user selection to control the determination of the most relevant result 1622 for optional refinement 1626; alternatively, the system may chose zero or more query interpretations based on salience scoring and display the results to the user.

FIG. 19 illustrates a user interface for displaying options regarding query interpretation and guiding. Here, a user entered a text search in an interface of a search engine; the salience score for the result set indicates that a number of options exist for improving (in this instance, presumably narrowing the space of returned results) the entered search. Candidate search terms (directed to different interpretations derived from the original search) are presented to the user. The presentation may optionally include the salience scores obtained for each possible set of results. Shown are links for the suggested modified queries to simplify the user's interaction, although one should appreciate that links need not be provided, and a user may be prompted to enter the additional terms rather than linking directly, as well as other options. The options presented in FIG. 19 provide just one example of how ambiguous searches can be potentially modified to improve user interaction.

In some embodiments, systems can utilize salience measure to perform more complicated query modifications, such as query generalizations and lateral searches.

Generalization and Lateral Search

The embodiment described above (Guiding Query Interpretation) utilizes a salience measure to compute informative narrowing refinements, for example, ways for the user to reduce the number of documents in the result set while guiding the user toward the subsets of the result record set that are more expressive of the user's search intent. Other embodiments may use the salience measure for other kinds of navigation that is aimed at capturing the user's search intent: in some embodiments, generalization and/or lateral search.

Generalization is an example of query modification that can be thought of as the inverse of refinement; in particular, the goal is to find useful supersets (rather than subsets) of the current result set. A system can generate generalization candidates from the properties of the current result set, for example, by looking at dimension values that have high frequency in a current result set and considering, for each of these values, the set of all records that contain this value as a potential broadening of the query. Such supersets can be ranked according to their salience measure (either relative to the current result set, to the entire record corpus, to other potential supersets, or other record sets); the supersets with the highest values of salience scores then can be returned to the user as possible directions of search generalization. For example, a query on "small iPod cover" can be computed to result in a lower salience measure than a search for "iPod cover", which can be suggested to the user as an improved version of the original query.

Other embodiments, allow users to perform lateral navigation, where the further steps of the iterative query modification process are directed to the record sets that partially overlap current result set. For example, the system can consider the search for text "auto" and suggest a modified search for "car" as the one that leads the user toward a similar record set of higher salience.

The implementation of lateral navigation may be similar to that of generalization, as shown in FIG. 16; in one particular example, the system creates possible lateral sets 1616 in its refinement set generation 1610. A salience measure is then used to evaluate these sets, preferably favoring candidates that have high absolute or relative salience.

FIG. 16 shows a process for refining a returned result according to one embodiment. In example process 1600, user input 1602 is processed by search engine 1604 acting upon a document collection 1606 to produce results set 1608. Refinement set generation 1610 acts upon the results set, creating refinement sets which may incorporate, as examples, a narrowing refinement set 1612, a broadening refinement set 1614, and lateral refinement set 1616. Salience computation is performed on the refinement sets, which are presented to the user for consideration. User selection may optionally be used to repeat the refinement process 1626, ultimately leading to result output 1624.

Guiding View Selection and Summarization

IR systems currently have several capabilities that offer some form of summarization of the result set, such as dimension value counts and clusters. This summarization is a view of the result set, namely, a dynamically constructed analysis of a set of records. For example, a view might be a collection of counts associated with values tagged on records in that set. Because there are often too many tags to show all of the value counts to the user, the view may only include counts for a subset of the values, such as those with high counts, or those from a specified set of dimensions. Alternatively, a view might not use explicitly assigned dimension values but instead may be a mathematical function (e.g., the average value) applied to the set of values associated with the records. The set of possible views for a result set is daunting, however. The user is often at a loss to discover a view that yields insight, and not all summaries are equally informative. An automatic generation of summary views tends to either omit informative summaries, or, conversely, overwhelm the user with too many summaries.

The salience measure as described herein allows the system to guide users to the useful view (or views) of a record set. The challenges are the same as with query interpretation, namely, culling out uninteresting views and exposing meaningful choices.

Using the salience measure, the system can measure how much each dimension value (or other summary statistic) contributes to the distinctiveness of a result set, relative to any specified baseline set. Because a summary is composed of such statistics, the system can use salience to guide users to useful summary views of a result set.

For example, there are several ways that the system can use the salience measure to guide query view selection. The system can promote dimensions that best show the distinctiveness of the current result set. For example, in a corpus of newspaper articles, a Page dimension may never be displayed, unless the user does a search on "top stories", which makes that dimension much more relevant, because the results are likely to be disproportionately from the front page. A City dimension might not be displayed until a user navigates to State: New Jersey, which increases the summarization value of the City dimension.

Alternatively, the system can use relative salience to cluster the dimension values, thus emphasizing diversity. For example, in a corpus of movies, the most frequent actors for the subset of science fiction movies may be the entire casts of the Star Trek and Star Wars movies. A set of actors who mostly participated in the same movie series are likely to have low salience relative to one another, and clustering their values allows the system to summarize the overall diversity of, for example, an Actor dimension.

According to one aspect of the invention, a distinctiveness measure may be used to summarize a set of documents returned as results of a query. In some embodiments, the values (identifying characteristics) associated with the most significant contributions to the distinctiveness of a document set (e.g., a measure based on relative entropy, where the measure sums contributions associated with different values, or a normalized measure using percentages, among others) may be presented to the user as part of a summary view of that documents set. Because distinctiveness can be measured relative to any baseline distribution, the baseline can be selected to reflect the user's context. The challenges with delivering summarization information to improve user interaction overlap with challenges posed by query interpretation, namely, culling out uninteresting views and exposing meaningful choices.

Figure 7:
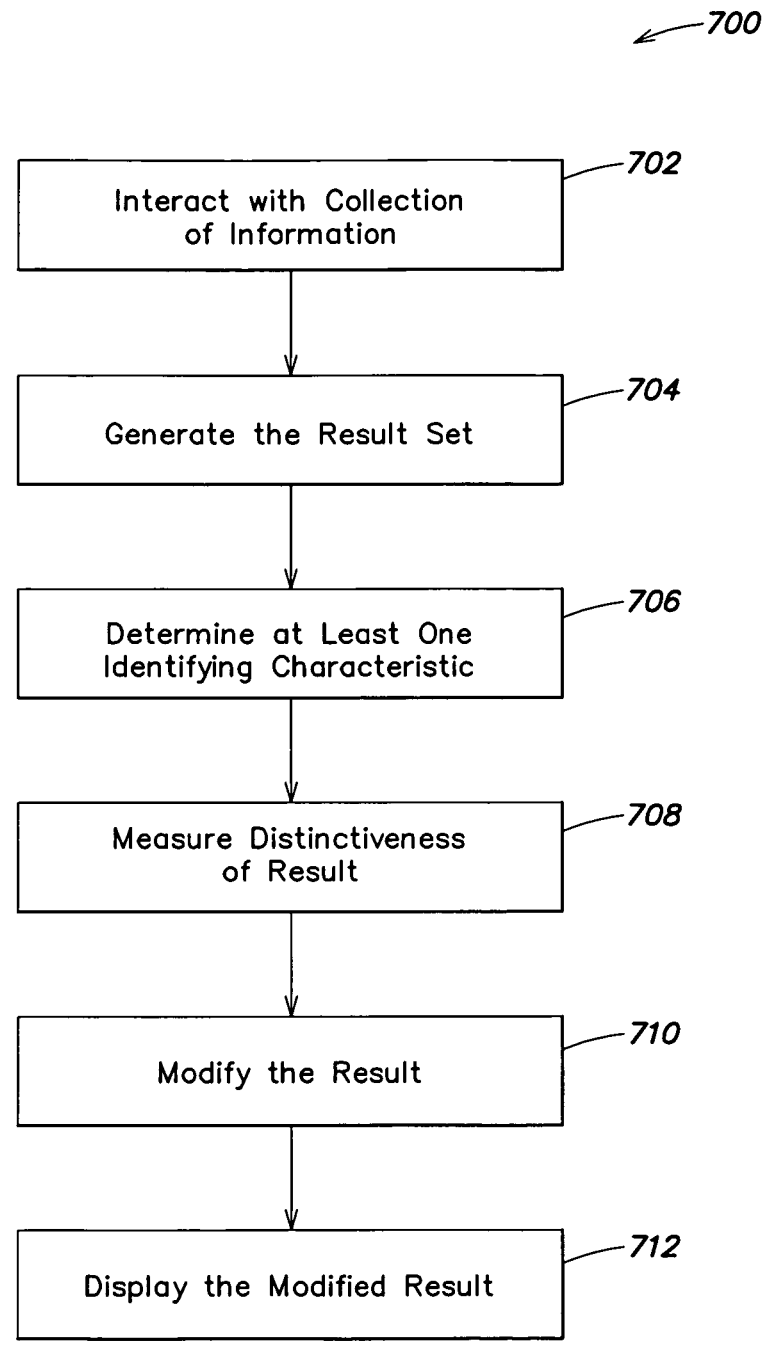
FIG. 7 shows a process for optimizing a view of a result returned to a user according to one embodiment of the present invention.

Referring to FIG. 7, shown is an example of a process, 700, for optimizing a view of a result returned to a user. At 702, a user or a user through a process, engine, or other interface, interacts with a collection of information. As discussed above, a collection of information may include a database, documents, composite entities, addressable media, metadata, as some examples. In one example, the collection of information comprises a database and a user interacts with the database by executing queries against the content of the database at 702.

According to one embodiment, it is realized that large volumes of information typically overwhelm a user. Large volumes of information frustrate the typical user, and provide little direction in how to resolve the problem of receiving too much information. In one embodiment, summarization of large amount of information into discrete elements based on a distinctiveness score improves user interaction with large amount of data by organizing and presenting smaller and possibly discrete groups within the large result returned.

In another embodiment, step 704 determines identifying characteristic(s) from within a result obtained from user interaction with a collection of information. A measure of distinctiveness for the results is determined from the identifying characteristic or characteristics at 706. The determination of the identifying characteristic at 704 and the measurement of the distinctiveness of the result at 706 may take place as part of another process. In one example, process 100 is invoked to determine at least one identifying characteristic in a result set and a normalized measure of distinctiveness derived thereof. In another example, process 200 is used to generate the identifying characteristics and a relative measure of distinctiveness. One should appreciate that steps 704-706 need not call other processes, and the steps, functions, and teachings discussed with respect to process 100 and process 200 may be incorporated into steps 704-706.

Using the measure of distinctiveness of the result, modification of the result takes place at 708. In one example, contributors to the measure of distinctiveness (i.e. the identifying characteristics or values that contributed to the measurement score) determined at steps 704-706 are highlighted so a user may observe immediately the more significant contributors to the distinctiveness of a set of results in a display of the modified results at 710. Highlighting may take the form of altered text, font, size, color, texture, background, among other options. According to one embodiment, modification of the results at 708 involves a filter on the result set that reduces the volume of the returned result by presenting summarization information about the result. In one example, the measure of distinctiveness is used to generate clusters within a result set. The presentation of clusters emphasizes the diversity within the result set, highlighting for the user potential avenues for further searching and/or refinements.

In some embodiments, where system contains data with associated dimensional values (e.g., text records with associated keywords, or map data with associated geocodes), salience can leverage the dimensionality of the data to determine the best dimension values for summarization. Moreover, salience can be used to obtain summaries of the result set's difference relative to any baseline set, such as the overall record corpus, or any of the states in the user's navigation path.

Intelligent Ranges

Because salience is a general measure for comparing sets of records, it can be used to enable refinement or summarization options that go beyond the selection of predefined dimension values. An example is an application that generates intelligent ranges. As used herein, intelligent ranges are dynamically generated range filters that break up a set of records into interesting subsets representing intervals along a specified numerical property (e.g., time or price) of the records.

For results that include ordinal data (which may be mapped in a linear sequence such as with quantities or prices, or in a multidimensional representation as would be appropriate for map locations or geocodes), a common technique to improve perceived result quality is to aggregate results into a set of pre-defined buckets or ranges. However, such buckets are not always an ideal way to partition the data. Consider pre-defined ranges of under $10, between $10 and $20, and over $20. Four items with prices of $9, $11, $19, $21 would be grouped into three subsets—$9 in one subset, $11 and $19 in the second subset, $21 in the last subset, rather than the more intuitive partitioning of $9 and $11 in one subset, and $19 and $21 in the other. Thus, a static grouping or one relying only on information in the query may result in less perceived result quality than an approach that is sensitive to the actual data results produced by the query. In general, the system cannot know what ranges will be important in the context of the search query alone. Moreover, the user might not know that some set of ranges provides insight into the result set. According to this feature, it is desired to discover the interesting ranges and present them to the user. For example, one might expect a search for Iraq against a news corpus to give at least two interesting ranges: the first reflecting the first Gulf War, and the second reflecting the more recent invasion.

Figure 20:
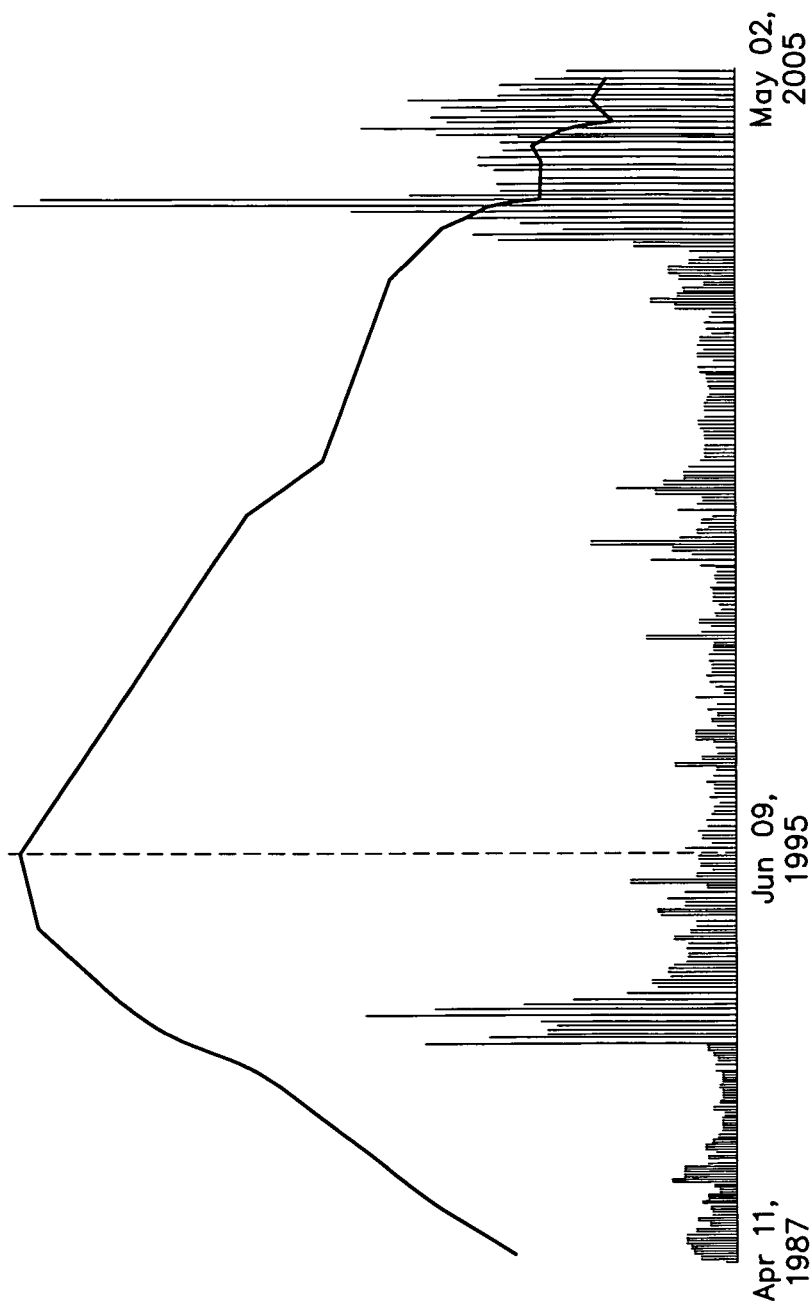
FIG. 20 illustrates a user interface presenting variation in salience over time for a collection of documents according to one embodiment of the present invention.

FIG. 20 illustrates a user interface in which segments for a collection of documents are displayed over time; each segment shown reflects possible ranges of interest to the user. Shown is a graph of the salience scores relative to time, with the baseline set being the entire set of documents matching the "Iraq" query. Some embodiments may use absolute salience, where the baseline set is the entire collection of documents. In some embodiment, inclusion of the absolute salience component may be optional. In another embodiment, inclusion of the relative salience component may be optional. Some embodiments may utilize combinations of different salience scores.

The salience measure allows the system to determine the interesting ranges of data within the current result set. In particular, the system can partition a result set into ranges such that consecutive ranges have high salience relative to one another. Moreover, the system can highlight the ranges that have high salience relative to the current navigation state, the overall collection of documents, or other baseline sets. Such an approach may not only result in an interesting partitioning of the result set, but also emphasize the subsets that are most distinctive.

Figure 17:
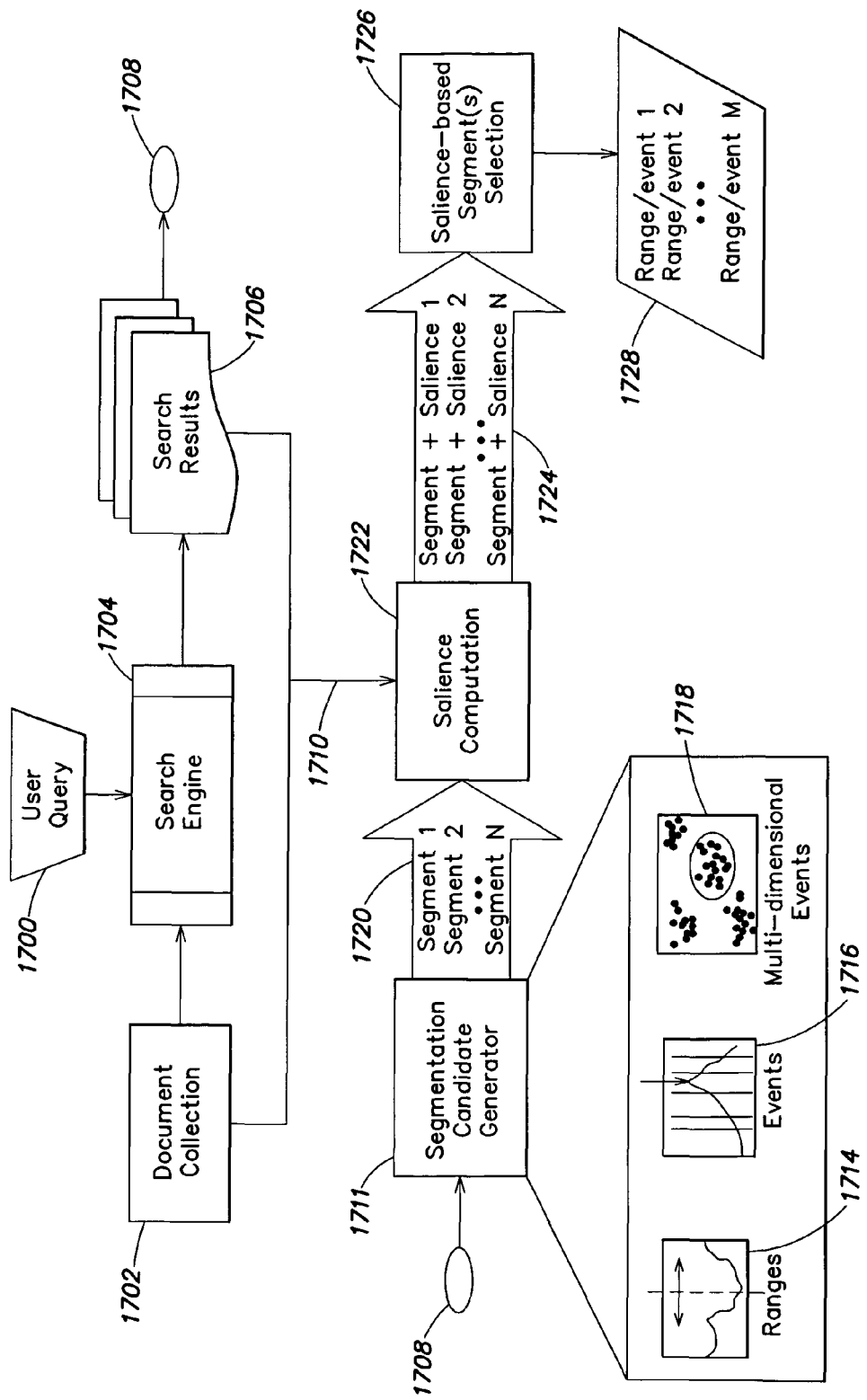
FIG. 17 shows a logical diagram for generating salience-based segments according to one embodiment of the present invention.

FIG. 17 shows a logical diagram of a system for determining ranges within a collection of documents using a salience measure. A user submits a query 1700 to the data storage and retrieval system 1704, which retrieves a query result set 1706 with its associated statistical distribution. Within the components of the result set, search results 1706 are passed 1708 and ordinal data measure(s) are identified 1711. The result set is partitioned based thereon. Range 1714/event 1716-1718 detection analysis is executed to determine candidate segment(s) 1720 which are analyzed by a salience calculation module 1722. In one example, the salience of the record set within the partition is calculated with respect to all records in the result set and/or with respect to the complete record set and/or record set(s) in other partitions 1724. The result of the application of the salience measure provides, in one example, ranges, in another example, event detection, and in another, multi-dimension event detection (e.g., population clusters on a geographic map) as salience-based segment(s) selections 1726. These determined ranges and/or events with high salience measurements are identified 1726 and stored for display to the user 1728. A detailed description of event detection is provided in a subsequent section of this document.

In one aspect, the salience measure is used to facilitate the automatic grouping of query results along one or more dimensions into buckets that are dynamically adjusted to take into account the nature and the distribution of the results.

Thus, for example, a partitioning mechanism creates a candidate breakdown of data set into candidate ranges. The way the data is broken down depends on the particular type of data: if data is linear, a set of "breakpoints" (defining ranges) can be selected, or the system can consider distinct neighborhoods of one- or multi-dimensional data. The system may determine these breakpoints in one of several ways, e.g., by looking for values where there is high relative salience between the records to the left and right of a potential breakpoint (e.g., if the dimension is time, the salience between the records before and after the potential breakpoint). The salience mechanism may then be applied to candidate partitions. In addition, salience can be used in combination with other data, such as frequency or quantity. The latter steps do not have to be performed in a strict sequence; it is possible to partition data, calculate the salience measure of candidate sets, and then re-partition the data, based on the result of the salience calculations.

Figure 8:
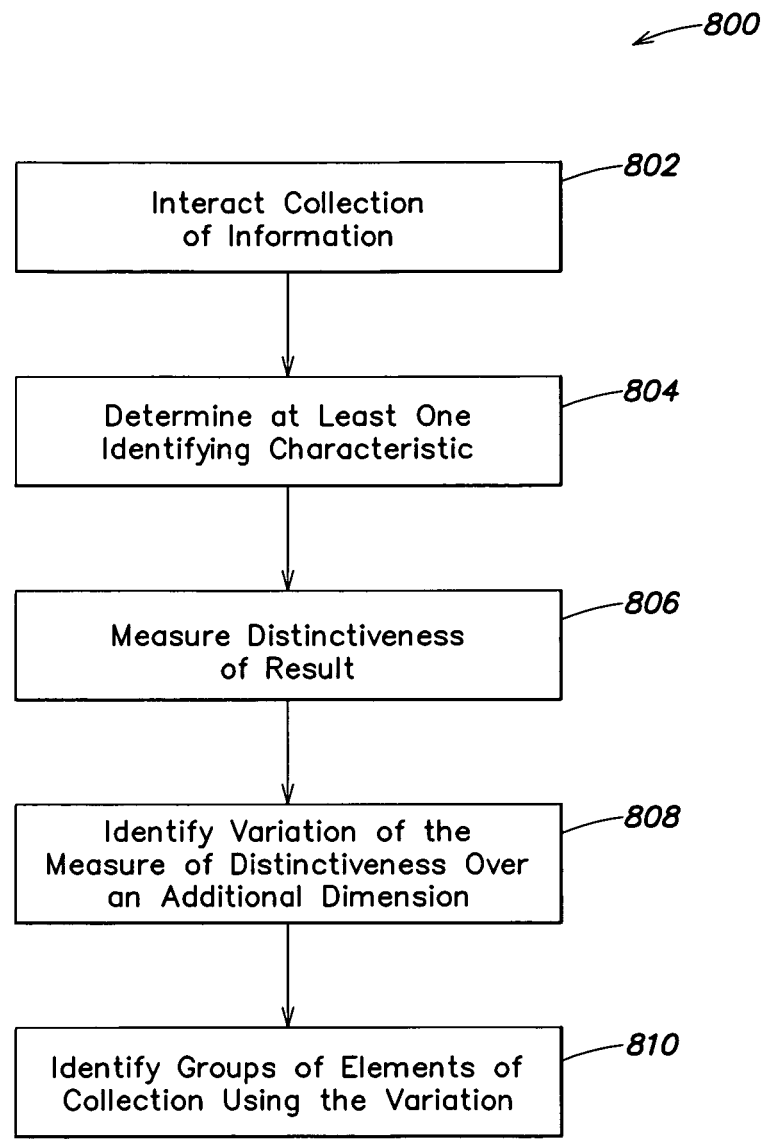
FIG. 8 shows a process for presenting groups within a collection of information according to one embodiment of the present invention.

Referring to FIG. 8, shown is an example of a process, 800, for presenting interesting characteristics within a collection of information. At step 802, the collection of information is analyzed. In one embodiment, analysis of the collection of information takes the form of user-executed queries against the collection of information, and identifying characteristics are determined from the results of the query at 804. In one example, based on the analysis of the collection of information at least one identifying characteristic is determined for the collection of information at 804. At 806, a statistical distribution for the identifying characteristic(s) is generated and used to derive a measure of the distinctiveness of elements within the collection of information. Steps 804-806 may invoke other processes for determining a measure of distinctiveness. In one example, process 100 is used to output a normalized measure of distinctiveness for elements of the collection of information. In another example, process 200 in used to generate a relative measure of distinctiveness for the elements of the collection of information. One should appreciate that steps 804-806 need not call other processes in order to determine at least one identifying characteristic and measure distinctiveness; rather, the functions, steps, and teachings discussed with respect to processes 100 and 200 may be incorporated into steps 804-806.

At 808, the distinctiveness measure may be computed over an additional dimension, for example, time, and variations in its distribution are identified. One should appreciate that the distinctiveness measure may be analyzed against a number of dimensions, for example price, quantity, time, etc; such plotting may even take place over multiple dimensions, some embodiments analyzing multi-dimensional sets of distinctiveness scores (i.e., vectors). In one example, the additional dimension may comprise other identifying characteristics within the collection of information over which variations in distinctiveness may be observed. Some embodiments may place candidate breakpoints at the local maxima of distribution scores.

At 810, using the identified variations, related elements within the collection of information are grouped. The grouping may take place based on the observed variations in distinctiveness alone or may include additional evaluations of distinctiveness with respect to the observed variations. In one example, the elements of the collection of information corresponding to an observed variation at 808 are measured for distinctiveness against each other. Groups are then generated at 810 based on a low distinctiveness score.

Event Detection

Event detection is similar to intelligent ranges, but the emphasis is on the subsets of data (selected in respect to one or more variables, or dimensions), rather than the breakpoints between ranges. This approach selects the ranges of: highest absolute salience, highest relative salience to neighboring sets, highest relative salience to previous/successive data portions, or any other interesting signatures of salience measure, including but not limited to the absolute maxima of the salience scores distribution, local maxima of the salience scores distribution, local maxima of the salience scores distribution that are located at least a certain distance from other local maxima, high values of the first derivative of salience score distributions. Specific embodiments may detect events that map to the document subsets of low, rather than high, salience.

For news corpora, it has been found that incorporating frequency information, i.e., a large number of documents concentrated in a small date range, often indicates an event around a given date. Certain embodiments may combine salience and other information measures, such as frequency.

Like intelligent rages, some embodiments may utilize event detection in case of multiple dimensions, for example using the price and quality ranking dimensions to locate the neighborhood of "good deals" products, or use coordinates or geocodes to analyze maps for interesting information.

FIG. 17 is a block diagram of a system implementing processes for determining events within a document collection. A user query 1700 is received by a search engine 1704 and executed on a document collection 1702 to obtain search results. Based on characteristics of the search results, a segmentation candidate generator 1711 identifies potential segmentation candidates 1720. A salience computation 1722 is employed on the potential segmentation candidates to refine the segmentations based on distinctiveness of the segments 1726 relative to a baseline set (in some embodiments, the result set for the user query, or the complete document set), and/or similarity within the segments (determined by lack of distinctiveness within the segment). Some embodiments may utilize additional filtering, for example, by requiring segments to achieve salience score above a certain threshold, or by ensuring they are located at least a certain distance from each other.

FIG. 21 illustrates a user display for rendering events detected within a collection of information. In this embodiment, the data set is that of news articles, and events are determined against time dimension. A salience measure is computed for the subsets of the result set for the user query and plotted over time. The appearance of local maxima in the plot is indicative, in this example, of an event that is mapped to a corresponding subset. Optionally, further analysis (of salience or other characteristics) of the segment identified and against other possible segments may be employed to confirm an indication of an event. Some of the spikes shown in FIG. 21 are not identified as events; according to one example, further analysis of those regions for mutual proximity eliminated them as events to be specifically identified.

Hierarchy Discovery

Some entity extraction techniques, such as term discovery, give rise to large, flat dimensions that are difficult to work with; for example, an entity extraction process of type "human activity" can tag records with the values of "art", "sports", "painting", "hockey", and "oil painting". Often, there are latent hierarchical and equivalence relationships among the values, but the system cannot easily obtain them except through a laborious manual process, or through an error-prone task of mapping these values to an external taxonomy.

According to another feature, the salience measure as described is used to infer these relationships among dimension values. A parent-child hierarchical relationship can be expressed as a set of heuristics on the set of relative values of salience of the candidate parent set, candidate child sets, and, in some embodiments, encompassing sets, such as the entire record corpus, or the result set of records that are returned for a given query. For example, a parent set is likely to encompass the child set and have a salience measure between that of the salience of the entire corpus and the salience of the child set. In such a way, the entities in the example above could be arranged into the following hierarchy: "art" is a parent of "painting" that is a parent of "oil painting", while "sports" is the parent of "hockey". Other embodiments may also use salience to infer sibling relationships (in the example above, "art" and "sports").

Figure 4:
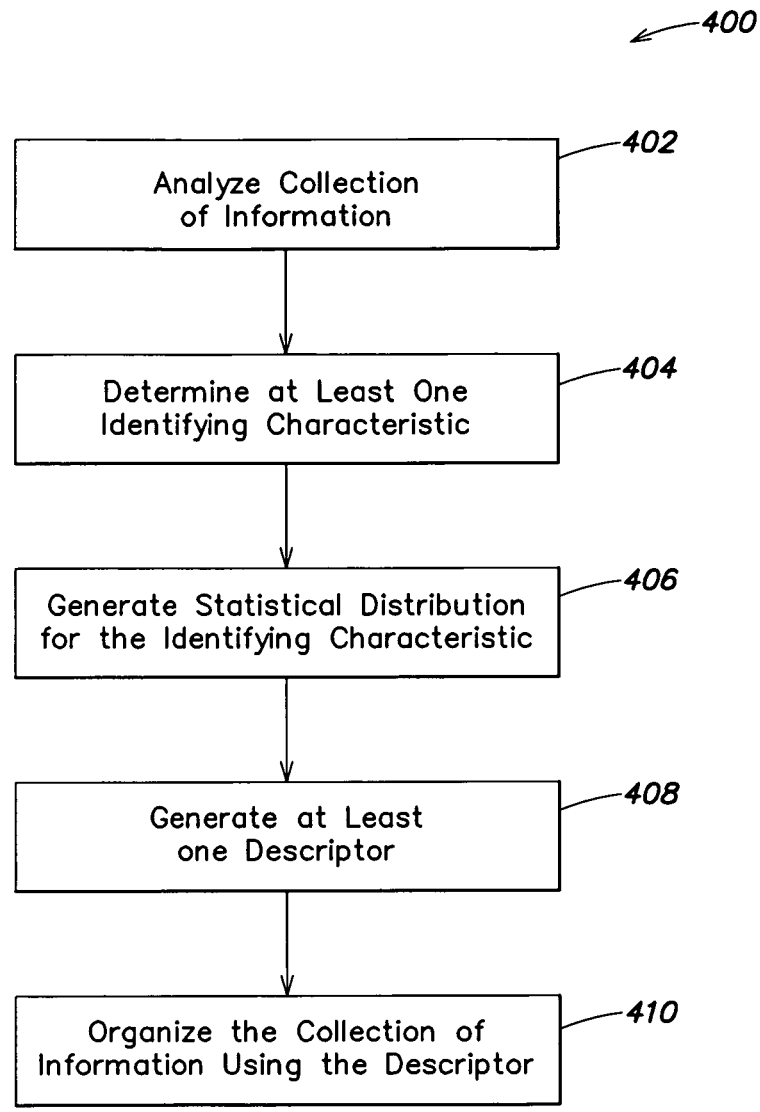
FIG. 4 shows a process for organizing a collection of information according to one embodiment of the present invention.

Referring to FIG. 4, shown is an example of a process, 400, for organizing a collection of documents. At step 402, the collection of documents is analyzed to determine at least one identifying characteristic, at 404. One should appreciate that the collection of documents can be almost any collection of electronic information. Typically, the collection of documents comprises information stored for later use/access, i.e. not a transient collection. Documents can be thought of in traditional sense as discrete text files with associated with metadata, however, a collection of documents and a document itself is intended to be more comprehensive, and should be understood to include other addressable and selectable media, including, for example, non-textual data, such as sound and visual recordings, database records, and composite entities such as might be described using HTML and XML encoding. Individual documents and collections of documents may take many forms, including file systems, relational databases, hypertext collections (such as the World Wide Web), or the like.

According to one embodiment, the at least one identifying characteristic determined at step 404 depends, at least in part, on the make up of the collection of documents being analyzed at 402. In one example, the collection of documents is a database containing records and "traditional" documents, with text, author(s), and a subject as associated properties. The at least one identifying characteristic may be determined based on the text, the author(s), and the subject of the documents, as well as content within the database records. In one example, identifying characteristics correspond to keywords in the text of a document, author(s) of documents, the subject of the document, and/or other database record properties; in another example the identifying characteristics may correspond to any combination thereof. In one embodiment, each of the preceding identifying characteristics may be treated in more detail; for example, the presence of multiple authors may be used as an identifying characteristics, likewise regarding the presences of multiple topics, or the presence of certain key words, and/or groups of words or phrases, as well as groups of records in the database, database attributes, domains, ranges, constraints, etc. One should appreciate that the absence of certain characteristics from the collection of documents may also be used in determining the at least one identifying characteristic at step 404. The determination of the at least one identifying characteristic may include analysis of any identifying information regarding the contents of the collection of documents and any information associated with the contents of the collection of documents. In one example, the metadata associated with the content of the collection of documents is analyzed. In one embodiment, the analysis of identifying information includes consideration of date of creation, date of modification, date of last access, title, file extension, file type, file size, file composition, author(s), editor(s), keyword, containing specific information, containing a specific element, subject(s), summary information, derivable information, all or part of the file name, word or phrase within a file, location on storage media, physical location, relational information, non-textual data, as some examples. One should appreciate that information associated with and/or derivable from the collection of documents can include any information that may be stored and associated with a collection of information, including information stored by operating systems, information typically considered "metadata", and may also include other system information regarding more fundamental operations/information, for example memory location, operating system access information, associated driver and device information, as some examples.

The determination of at least one identifying characteristic and any associated analysis may occur as part of another process, example processes include process 130 FIG. 1B and process 230 FIG. 2B, wherein a candidate identifying characteristics are determined, in 130 as part of analysis of a set, and in 230 as part of analysis of a set of results obtained from a collection of information. The determination of a candidate identifying characteristic may be based on review of the possible information associated with the collection of documents; in one example this may include the metadata for the collection of documents, or may be based on a subset of the possible information associated with the collection of documents. As discussed above, certain characteristics may be expected to be found in a particular collection of documents, and those characteristics may be used in the analysis to determine identifying characteristics.

In one particular embodiment, a collection of documents may pertain to a winery, and the expected characteristics may include the type of wine, a year of bottling, the year the grapes were grown used to make the wine, weather patterns for the growing season, information on soil (nutrient content, etc.) in which the grapes were grown, and location, among a number of other characteristics. In one example, the expected characteristics may be maintained as attributes in a relational database.

In another embodiment, the collection of documents contains information on populations of men and women, and expected characteristics may include sex, age, height, weight, and other demographic information. Various subsets of the preceding expected characteristics may also be used. One should appreciate that "expected" characteristics need not be used, and the analysis of the collection of documents, its contents, and any information associated with either may exclusively determine the identifying characteristics that are used or may contribute to the determination of the identifying characteristics that are used. One should appreciate that separate processes need not be called and/or executed in order to determine at least one identifying characteristic at 404, and according to one embodiment the steps and functions discussed with respect to processes 130 and 230 are incorporated into step 404.

At step 406, the statistical distribution for the at least one identifying characteristics is determined. The determination of the statistical distribution for the identifying characteristic may involve manipulation of the collection of documents that is analyzed. In one example, a representation of the collection of documents is used that is adapted to statistical manipulation. Using a representation of the collection of documents, a statistical distribution is determined. In one example, the statistical distribution is obtained based, at least in part, on text, metadata (e.g., categories assigned to documents), or other information contained in records within a database, and may also include information derived from the collection of documents.

In another example, the statistical distribution is an approximation of the incidents of the identifying characteristic within the collection of documents. In one embodiment, the statistical distribution is determined using sampling on the collection of documents, and in another example, modification of the collection of documents is permitted without need for recalculation of the statistical distribution. In some embodiments, a threshold is established for determining when recalculation of a modified collection of documents is required. The threshold may be based on a specific number of changes made and/or a percentage of change with respect to the collection of documents (for example, percent change in size, among other examples).

Other approximation techniques that may be used to generate a statistical distribution for the at least one identifying characteristic include examining a similar collection(s) of documents and the statistical distribution(s) obtained on the similar collection(s) of documents, to provide an expected distribution for the collection of documents being analyzed. In one example, the statistical distribution is univariate, that is, based on one variable. In one embodiment, the univariate distribution is assigned a weight value. In another embodiment, the weight value constrains the distribution to reflect a probability distribution, in other words, the sum of the weights is equal to 1.

In another embodiment, the measure of distinctiveness may be determined from a multivariate distribution, that is, based on a set of values (i.e. identifying characteristics). In one example, values are represented by n-tuples, relations based on a group of values. The multivariate distribution may also be based on multiple sets of values. In one example, the collection of documents contains a plurality of identifying characteristics, for example, subject, type, and an author, thus, a set of values corresponds to each subject, type, and author. In one implementation, values are represented by both the presence and absence of the value. If a value(s) is present in 60% of the elements of the analyzed set, the absence of that value(s) occurs in 40% of the elements of that set.

According to one aspect, it is realized that reducing the computational complexity and overhead associated with determining identifying characteristics and statistical distributions is beneficial in many embodiments. In particular, the benefits achieved from approximation rather that direct or exhaustive measurement, in one example employing processes of curve fitting to the determination of statistical distribution, while introducing possible approximation error, yields benefits for some embodiments. A balancing may occur between reducing computational effort and achieving a higher level of precision.

According to another aspect, such balancing is affected by the characteristics of the set being analyzed and the activity that is being performed. In one example, determination of candidate identifying characteristics may tolerate a greater degree of possible approximation error, where the evaluation of the set based on those characteristics occurs with a greater degree of precision. In another example, correlated values for identifying characteristics are identified, and only one of the values for identifying characteristics is used for later analysis. In one example, where correlated values are determined, only one member of the correlated values is used for determining statistical distributions for the correlated values. Step 406 may include another process for obtaining a model of the distribution adapted to statistical manipulation. For example, processes 160 and 260 may be used to model the statistical distribution of the at least one identifying characteristic. One should appreciate that separate processes need not be called and/or executed in order to determine the statistical distribution for the at least one identifying characteristic at 406, and according to one embodiment the steps, functions, and relevant considerations discussed with respect to processes 160 and 260 are incorporated into step 406. As is discussed above with respect to processes 100 and 200, a measure of distinctiveness is also obtained at step 406, and in one example an absolute score of distinctiveness is employed. In another example a normalized measurement of distinctiveness is used. Other examples include relative distinctiveness scores.

At step 408, at least one descriptor is generated based on a distinctiveness scoring derived from the statistical distribution of the at least one identifying characteristic for the collection of documents. The distinctiveness score may be determined as part of another process, for example, process 100, where a normalized distinctiveness score is determined and may be used for generation of at least one descriptor within a collection of documents. In another example, process 200 may generate a relative measure of distinctiveness from which at least one descriptor may be generated at step 408. A descriptor may be stored separately from the elements of the collection of documents on which the score was determined or the descriptor may be stored with the records from which it was derived. In one example, a descriptor is stored as an attribute in a database. In another example, multiple attributes may make up a descriptor. In yet another example, the descriptor may constitute metadata and be associated with certain elements of the collection of documents to which it pertains.

At step 410, the collection of documents is organized using the descriptor. In one example, an index is created using the descriptor as a reference. In another example, the descriptor is used to generate a schema for each relation within a database. In one embodiment, the descriptor may be used to identify parent-child relationships, and from the identified relationships a logical tree may be created on which to organize the collection of documents.

According to one aspect, a process 400 may be executed for each search and/or navigation within the collection of documents, generating an adaptive database model. As more latent relationships are identified within the collection of documents, the more the database structure develops and improves interaction with the collection of documents.

In one example, process 400 may be used to determine relationships within a collection of documents. In one example, the collection of documents may be first arranged into a flat structure, that is, the one where all elements of the collection of documents appear at a same organization level. Process 400 may be used to determine a hierarchy to arrange the documents within a collection. One implementation incorporates the following features:

Generation of hierarchical organization from flat data space
  Exploitation of latent relationships typically found in flat data spaces
  Using distinctiveness scoring to infer the relationships amongst the collection of documents
    Identify parent-child relationships using distinctiveness score
    Sibling and other logical groupings may be identified using the distinctiveness score to identify similarities
    Development of a relationship tree based on distinctiveness scoring of data sets Flexible Database According to one aspect, a new class of database is architected for interactive exploration of data and content, and not for the managing of transactions that limits conventional databases. This new database is not a storage technology, similar to a data mart; instead, it improves access to data and content in the layers below, without disrupting those transactional systems. In one embodiment, the new database mode's purpose is to foster discovery by letting each user employ any kind of filtering—search, dimensional, geospatial—even if the data wasn't originally intended to be used that way. Information access applications are delivered that are independent of any specific data model, allowing each user to manipulate the information to suit his or her search intent. In other words, the database becomes organized based not only on the content but on the context it which is was accessed According to one aspect, a database architecture may be based on a simple insight with profound implications: discovery uses not just the data and content, but information about the data and content. An example architecture comprises a flexible, descriptive data model, an indexing and physical data management strategy, and a data-driven, summarizing query mechanism.

In one embodiment, the database is based on a flexible descriptive model. Flexible means that every record may be a schema unto itself—each one simply has the structure it has. In one embodiment, every record could have its own unique structure. Descriptive refers to a property whereby each value in a record is immediately accompanied by the meta-data that puts it in context. This model is conceptually related to XML, which is a departure from both relational databases and search. Conventionally, relational databases require rigid schemas where every row has to have the attributes the table dictates. Search ignores schemas, throwing away valuable context. Instead, a meta-relational model captures benefits of both conventional models, speeding initial application deployment as well as making the overall system responsive to the inevitable changes, that come about as user's needs change and evolve.

In one example, each record has its own structure and describes itself. Like XML, the data model does not require tables. Instead, it allows every record to have its own structure, if necessary. In some embodiments, each record becomes simply a collection of attributes and their values, whatever they may be. Each record describes itself by keeping the data and meta-data together in each field. In one example of this data model, a record, document, and everything in between keeps whatever fields and long-form text it may possess.

According to one aspect, the flexibility of the data model accommodates change. In one embodiment, eliminating an overarching schema in the data model allows records to change at will. Since each record is just a collection of attribute-value pairs, each record can gain them and lose them without disturbing any of the other records or violating any overarching organization.

While a flexible data model may be essential for the unanticipated queries inherent in information access, it also introduces new challenges. In a rigid data model, the location of a particular piece of data can be mapped trivially. In a flexible data model, it is realized that its location or even existence requires the system to perform real work. For example, where in a uniquely structured record is the "FirstName" field? Does it even have a "FirstName" field? According to one embodiment, an indexing and data management strategy is employed.

In one example a unified, building-block approach to indexing is used. Since there's no way to anticipate all user queries, it's not possible to pre-compute all answers. The solution to this problem is to index the critical components that let the engine construct any answer on the fly. The indexes represent the key elements in the incoming data and content—values in records, textual content in any form, and, most importantly, multiple layers of structure within the data and content. But the index doesn't hold the intersections among these elements. Instead, these building blocks are the raw material used to produce any view of the data, including those that the user doesn't know he or she wants until they are offered. Further, the index is adaptive and responds to searches and/or queries run against a database that reveals additional relationships within the data.

In another embodiment, data management strategy assures responses at interactive speeds. In one example, a user exploring data demands immediate responses in order to continue his train of thought. To deliver speed-of-thought summaries, database engines takes advantage of the large memory spaces in modern computers and apply self-optimizing unified memory caching. In one example, caching makes room for new entries by evicting old ones that are less expensive to re-compute, take up more memory, or have not been used recently, or any combination thereof.

Figure 5:
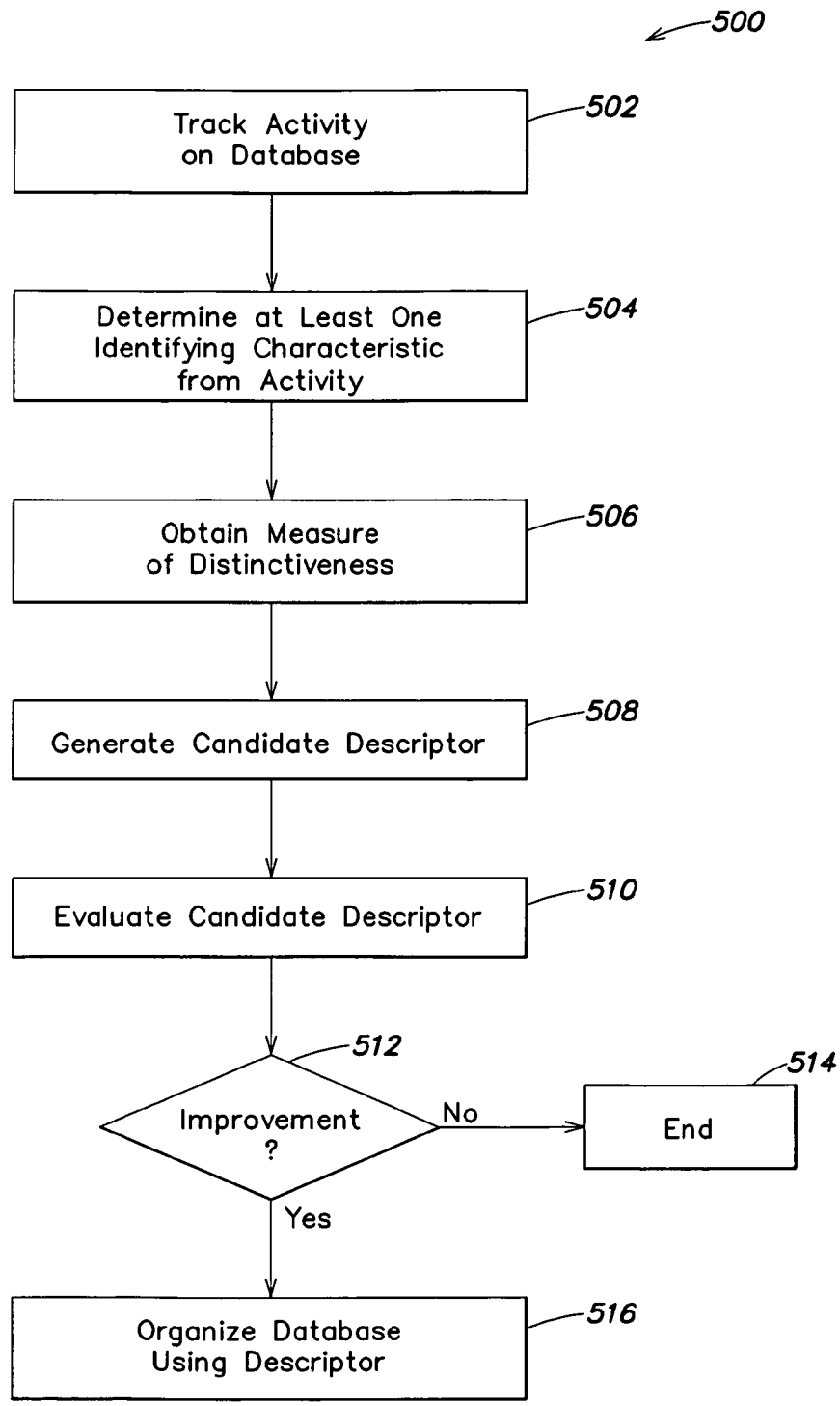
FIG. 5 shows a process for adaptively organizing a database according to one embodiment of the present invention.

Referring to FIG. 5, shown is a process 500 for adaptively organizing a database. Process 500 beings at step 502 via activity occurring on the database. Activity may take many forms, for example, access to the database, searches on the database, queries executed against the database, management activity, indexing, sorting, filtering, including, for example, statistical analysis on the database that generates distinctiveness scores, among others. Typically activity comprises access to a database that returns stored information. At step 504, an identifying characteristic is obtained from the activity performed with respect to the database. The identifying characteristics may be of many forms, and as discussed above includes information stored in database records, attributes, values, domains, constraints, as well as information stored about the information. In one example the activity on the database comprises a user generated query on the database. The query may be interpreted by a database engine and executed to return a result. Typically, the returned result will be a subset of the information stored within the database but could possibly return the entire collection. An identifying characteristic may be determined from the query, for example, at step 504. And a measure of distinctiveness may be obtained for the result of the query on the database at 506. In one embodiment, steps 504 and 506 occur as part of another process, for example, 100, which generates a normalized measurement of distinctiveness of a set based on statistical distributions of identifying characteristics within the set. In another embodiment steps 504-506 occur as part of process 200, where subsets of the database are analyzed for distinctiveness against other subsets or against the database as a whole. Each analysis of the database according to steps 504-506 yields information on the relationships between the contents of database. One should appreciate that process 500 is intended to cover interactive, concurrent, and sequential activity on a database.

Using the information on the relationships between the contents of database, candidate descriptors are generated at step 508. The candidate descriptor may simply be the measure of distinctiveness as it relates to a particular record, or the descriptor may contain additional information. A descriptor may also be an identifier for a logical grouping of similar records. In one example, a descriptor contains information on the identifying characteristics analyzed, their distributions, and the distinctiveness scoring obtained thereon. In another example, the descriptor appears as an attribute in a relation. In another example, a descriptor may be stored separately and associated with records in a database via a reference or link. One should appreciate that, while process 500 is described using a descriptor, the layout of the database itself may be used as the descriptor. In one example, the constraints imposed on the layout of a set of tables may be determined using distinctiveness scores, thus rather than the database containing a distinct descriptor record, it is implied by the organization of the data itself Thus, one should understand that the invention is not limited to creation of a separate descriptor.

In one embodiment, (not shown), candidate descriptors may simply be used to organize the database, as the computational effort in determining the distinctiveness scores of particular subsets of the database has already been expended in association with activity on the database, for example, a user query run against the contents of the database. According to one aspect, it is realized that computation burden and storage requirements may be reduced by evaluating the use of candidate descriptors at for example, at step 510. Moreover, the use of every candidate descriptor obtained without discrimination would eventually result in a database indexed and/or organized by every field appearing in the database. However, one should realize that the considerations discussed with respect to determining distinctiveness (for example, processes 100 and 200) would mitigate the possibility of indexing and/or organizing based on all fields, as distinctiveness scores and the identifying characteristics from which they are derived are determined discriminatively.

The evaluation of a candidate descriptor may involve the modeling of the use of the candidate descriptor as if it were determined to be an improvement. Improvement may include evaluation of the logical groupings obtained once the descriptor is applied. Evaluation of the logical grouping may involve comparison of the distinctiveness of the newly formed groups against each other and/or against the database as a whole to determine if distinctiveness between the groupings is improved by the use of the candidate descriptor. Alternatively, the test for improvement may involve a determination that larger grouping improves similarity within a particular grouping. A mixture of both distinctiveness evaluation and similarity evaluation may also be employed when determining if a candidate descriptor improves the organization of the database.

In one example, evaluation of a candidate descriptor at 510 leads to a determination that the descriptor does not improve the organization of the database 512(NO), and process 500 ends at step 514. In another example, evaluation of a candidate descriptor ate 510 leads to a determination that the descriptor does improve the organization of the database 512 (YES), and the database in organized using the descriptor at 516. In one embodiment, organizing the database at step 516 involves committing the modeled organization used at part of the evaluation at step 510.

In another embodiment, candidate descriptors may be stored for later evaluation and modeling; in one example evaluation and determination of improvement may occur offline, and in another example, candidate descriptors are stored until a period of reduced activity with respect to the database.

Generally, the result of analyzing portions of the database for distinctiveness according to, for example, processes 100 and 200 generates comparisons of distinctiveness for subsets of the content within a database. Based on determined similarity, i.e. low or zero distinctiveness scores with respect to each other, logical groupings may be formed. Partitions may be generated based on high levels of distinctiveness, for example, a highly distinct result returned to a user may be extrapolated against the database as a whole. According to one embodiment, the identifying characteristic(s) that were associated with the distinct result are used as an index for later accesses to the database. Further parent-child relationships may be identified using distinctiveness scores, creating a hierarchical organization within a database. Sibling relationships may also be discovered using distinctiveness scores, and tree structures may be identified and evaluated for use in organizing the database.

Concept Triggers and Interpreting User Actions

Another potential application of salience is to generalize dynamic business rule-based functionality. Rather than using query terms or navigation state to exactly satisfy a rule's trigger, the system may activate a rule when the user's current navigation state has low salience relative to the trigger. For example, an e-commerce system may suggest particular items to the users who search for particular music group. A conventional dynamic business rule system for this purpose may require creation of many such rules that correspond to the myriad ways that users may find that music group's materials, placing a high demand on its operators. Salience allows a system to create a few broad rules corresponding to results of the user's search activities, rather than the query requests they use in their search. For example, a set of records may be tagged that are representative of the category "pop music." If a user's query returns results that have low salience relative to records that are tagged with the "pop music" category, the rule can be triggered automatically.

Similarly, the system may infer the intent of a user's action by looking at the high salience terms of the user's post-action navigation state relative to a pre-action state, and then use that inferred intent to trigger a business rule.

Figure 9:
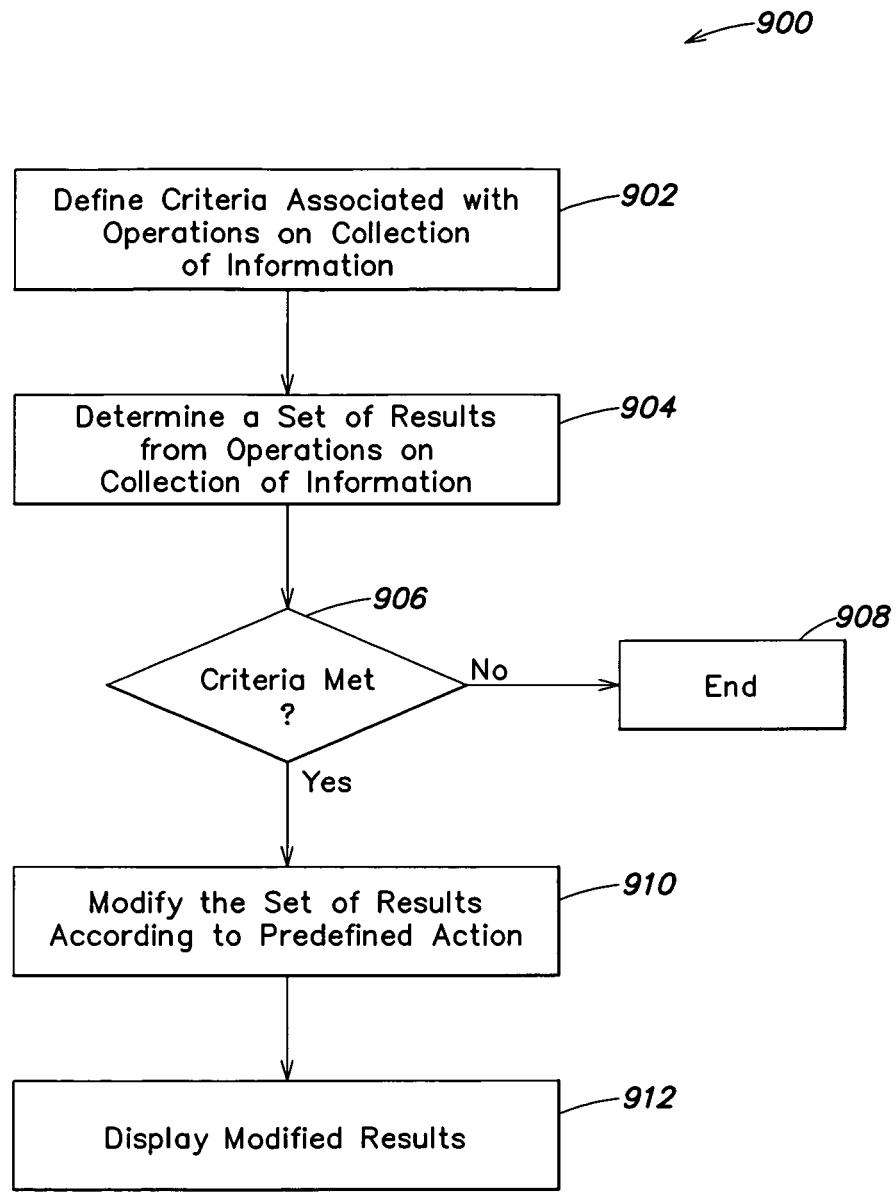
FIG. 9 shows a process for invoking rules to modify a set of results returned from a collection of information according to one embodiment of the present invention.

FIG. 9 shows a logical diagram of a system for implementing a business rule trigger. A user submits a query to a data retrieval system. A result for the query is retrieved with its associated statistical distribution. A salience calculation module determines the salience of the result set distribution relative to one or more of the business rule triggers. If the query salience satisfies the rule trigger 906, then the rule is selected and any actions associated with it are executed. Once all selected rules are applied, the results are displayed to the user.

Referring to FIG. 9, shown is an example of a process, 900, for invoking rules to modify a set of results returned from a collection of information. At step 902, an operator defines criteria for a rule associated with operations on a collection of information. An operator may be an administrator of a database, a systems engineer, database architect, or any other administrative entity responsible for maintenance of the collection of information, among other examples. The criteria may be defined as part of a business rule, indicating the certain identifying characteristics, or values to be preferred over others in specific situations. In one example, a rule may define certain identifying characteristics that are to be given more weight when they occur as a result of operation on a collection of information, at step 904. The criteria may include a threshold distinctiveness score, for example, such that portions of the result that do not meet the threshold are not returned, which may cause no results to be returned. Subsequently, other rules may also be invoked which may result in the display of information on how to obtain better results, or on how to view results suppressed by the threshold test.

In another example, rules may operate to guide interpretation of operations on a collection of information relative to a particular informational context, for example prior navigations state. In such an embodiment, a user who searches for "Mozart" after selecting music recordings will trigger a different rule from a user who makes the same search after selecting sheet music.

Criteria defined at step 902 may also include a threshold for a distinctiveness score before a modification of the set of results takes place at 908, if a check against the criteria is met at 906(YES). If the check against the defined criteria is not met 906(NO), process 900 continues to monitor operations performed on the collection of information and the set of results determined from the operations on the collection of information at 904. When criteria is satisfied at 906(YES) a rule with parameters identifying what action should be taken will operate to modify the set of results according to the predefined action, at 908. AT 910 the modified results will be output. In one embodiment, a system may be configured to apply a rule which selects subsets of results having increased distinctiveness for display, when triggered by an original result which overall met a low distinctiveness threshold. In one example, such rules may be associated with tags on documents within a set. In another example, textbooks tagged with "computer science" may be identified as a category on which a rule should operate. If user's query returns results that have a low distinctiveness measure relative to records that are tagged with the "computer science" category, the rule can be triggered automatically to return records with a higher distinctiveness score.

In another example, post-action (in one example, search) activity may trigger a rules with an associated action. According to one embodiment, after a user performed a search for "garbage", post search navigation was directed to "disposal", and "hazardous pickup days", the rule may be triggered by the now clear intent to search on garbage as it relates to waste, rather than, for example, to the musical band. The rule may include an action where any results associated with Garbage the musical band are excluded for any additional navigation.

In another example, process 900 could be employed with a rule triggered by a user query producing a significant number of results including "ThinkPad," the rule action directing that user to "brand=Lenovo", "product=laptop", rather than a previous association with the IBM brand for that product. In another example, the specific search may be associated with a rule designed to direct a user to operator-specified alternatives, for example a query on "ThinkPad" may direct a user to "laptops" generically and/or to a particular brand of laptop with which an operator may have an interest.

Figure 22:
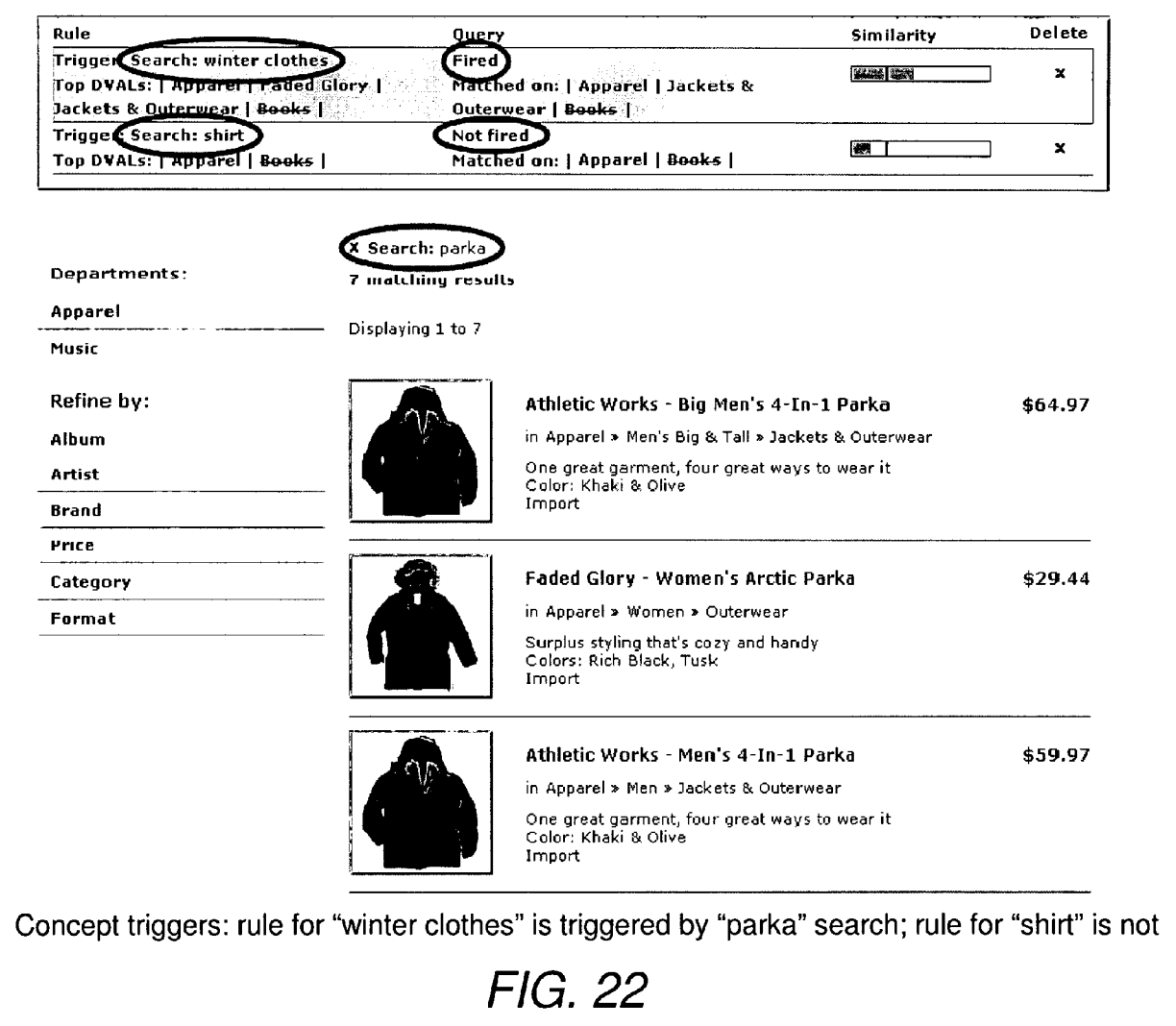

FIG. 22 illustrates a user display for displaying rules and associated triggers according to one embodiment. FIG. 22 shows a set of rules that modify displayed results. In one embodiment, the salience of the search results for "parka" is computed relative compared to results obtained for "shirts" and for "winter clothes". The relative salience is low between the results for "parka" and the results for "winter clothes", indicating the sets are similar, thus triggering the associated rule. The relative salience between the results for "parka" and the results for "shirt" is high; as those sets are distinctive, they are not similar, and the associated rule is not triggered.

Adaptive Data Mining

Another class of salience applications involves generating candidate sets of potential interest based on a current context, and then applying a salience measure to promote the most interesting candidates and relate them to one another. Such techniques can be useful to facilitate adaptive data mining.

One of the challenges of data mining is that it discovers relationships that are obvious. A system can use salience to highlight relationships that are non-obvious (e.g., because they are exposed by the user's current context) but are not evident from a global view. The salience measure can be applied to different views of the data to detect the view or views (including subsets, generalizations, or lateral sets) that possess a high salience measure (relative to a baseline set or relative to each other) and, thus, could be of an interest from the data mining standpoint. For example, in one such scenario, the head of recruiting might be looking at historical recruiting performance to see how to make that performance more effective. She notices that, on visit to a particular university, successful candidates are largely recruited by a single member of the recruiting team who is otherwise an average performer. She now can act on this information, either leveraging that person's particular effectiveness in future visits to the school, or investigating further to see what can be extrapolated from that relationship.

Discovering relationships in context allows a system to combine the interactivity of guided navigation with the deep insights of data mining.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

The invention can take the form of an entirely hardware embodiment, an entirely software embodiment, or an embodiment containing both hardware and software elements. One preferred embodiment takes the form of software executing in one or more server machines connected by a network. The invention (or portions thereof) may take the form of a computer program product accessible from a computer-usable or computer-readable medium providing program code for use by or in connection with a computer or any instruction execution system. A computer-usable or computer readable medium can be any device or apparatus that can include, store or communicate the program for use by or in connection with the instruction execution system, apparatus, or device. The medium can be an electronic, magnetic, optical, or the like. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 25:
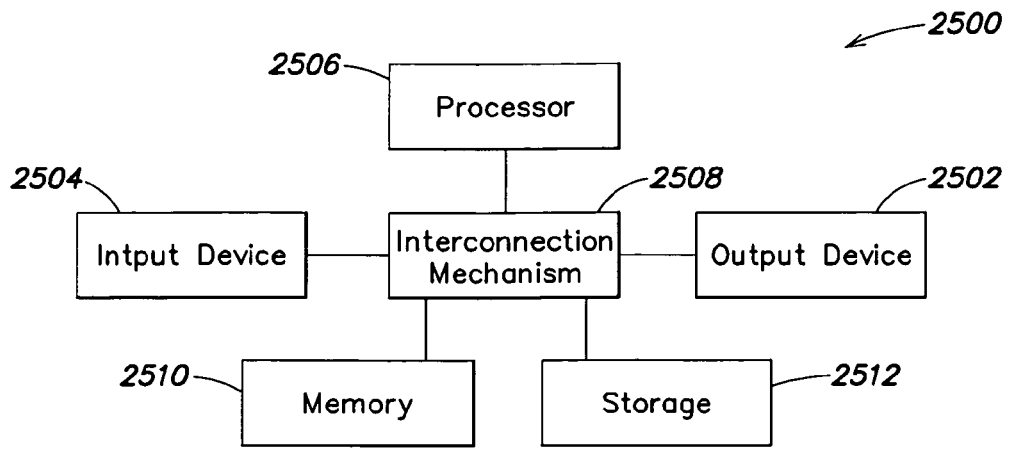
FIG. 25 is a block diagram of a general-purpose computer system upon which various embodiments of the invention may be implemented.

FIG. 25 shows a block diagram of a general purpose computer system 2500 in which various aspects of the present invention may be practiced. A general-purpose computer system according to one embodiment of the invention is configured to perform any of the described functions, including but not limited to determining a statistical distribution of an identifying characteristics within a collection of information and/or a set of documents, storing statistical distribution(s), deriving a measurement of distinctiveness, normalization of the measurement of distinctiveness, generation of comparison set(s), generation of sampled set(s), generating a representation of a set, approximating a statistical distribution within a collection of information and/or a set, sampling, assigning a weight value, employing the weight value in distinctiveness calculations, establishing thresholds, establishing and evaluating a relevance threshold, smoothing statistical distribution(s), determining relative entropy, determining similarity, receiving requests for content of a collection of information, processing request for content of a collection of information, determining a baseline distribution, storing calculations and values determined for determining a measurement of distinctiveness. Additional functions may also include, for example, generation of a descriptor for a group of elements, organizing a database using the descriptor, manipulation of size of evaluated sets, caching data, optimizing cached data, adaptively organizing a database, evaluating a set of results using a measure of distinctiveness, interpreting interaction with a collection of information, generation of candidate sets, guiding navigation, guiding query generation, guiding query interpretation, providing users interesting options from a collection of information, summarizing results returned from interaction with a collection of information, determining correlated elements within a collection of information, modifying views of results returned, clustering similar elements, determining a value for elements of a result set, grouping elements within a collection of information, evaluating the group of elements internally, evaluating the group of elements with respect to other groups, generation of partitions, generating absolute measurements of distinctiveness, creating rule(s), modifying a set of results based on the rule, storing criteria for a rule, generating another set, defining an action to take associated with a rule, tracking a state variable, and modification of the state variable, etc., and the invention is not limited to having any particular function or set of functions.

Figure 27:
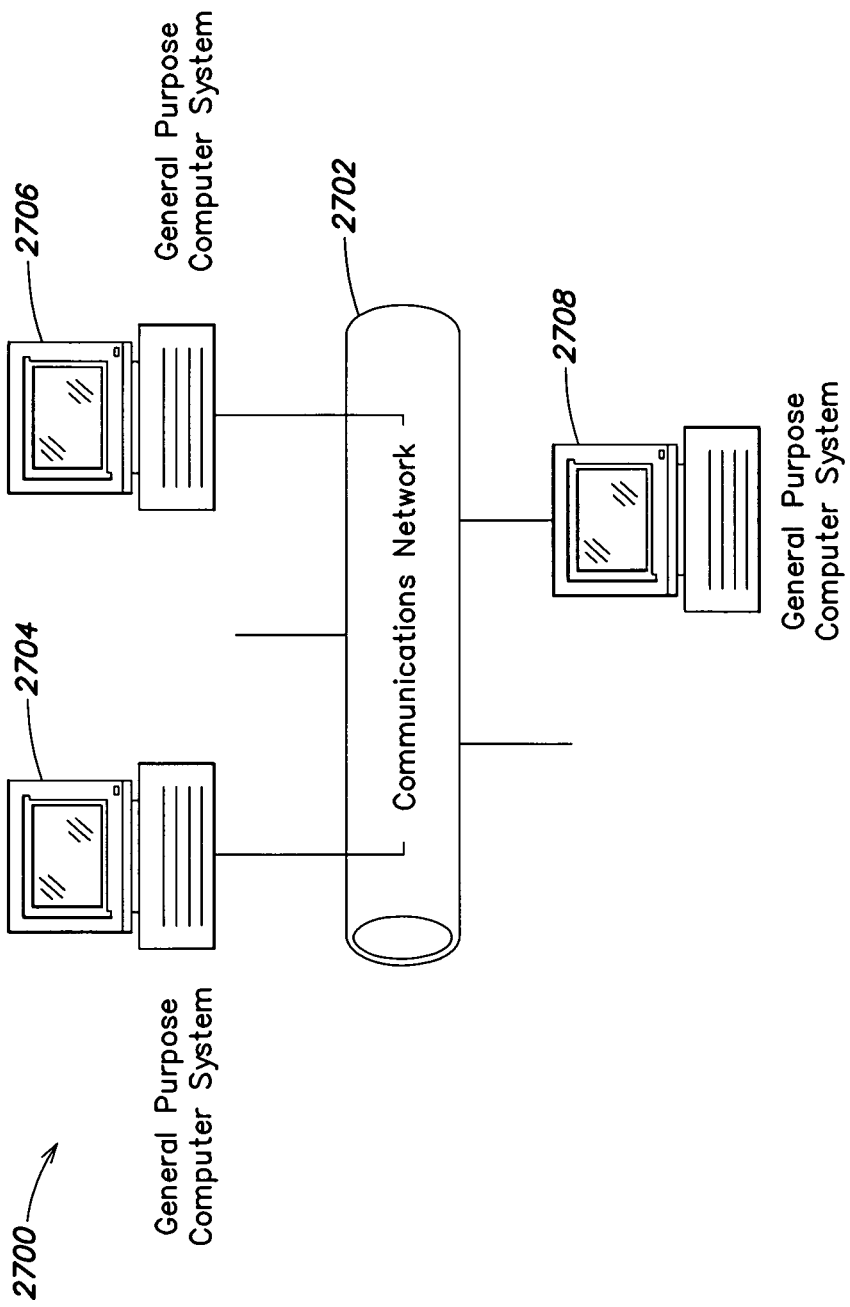
FIG. 27 is a block diagram of a system for generating a measurement of distinctiveness upon which various embodiments of the invention may be implemented.

For example, various aspects of the invention may be implemented as specialized software executing in one or more computer systems including general-purpose computer systems 2704, 2706, and 2708 communicating over network 2702 shown in FIG. 27. Computer system 2500 may include a processor 2506 connected to one or more memory devices 2510, such as a disk drive, memory, or other device for storing data. Memory 2510 is typically used for storing programs and data during operation of the computer system 2500. Components of computer system 2500 may be coupled by an interconnection mechanism 2508, which may include one or more busses (e.g., between components that are integrated within a same machine) and/or a network (e.g., between components that reside on separate discrete machines). The interconnection mechanism enables communications (e.g., data, instructions) to be exchanged between system components of system 2500.

Computer system 2500 may also include one or more input/output (I/O) devices 2504-2506, for example, a keyboard, mouse, trackball, microphone, touch screen, a printing device, display screen, speaker, etc. Storage 2512, typically includes a computer readable and writeable nonvolatile recording medium in which signals are stored that define a program to be executed by the processor or information stored on or in the medium to be processed by the program.

Figure 26:
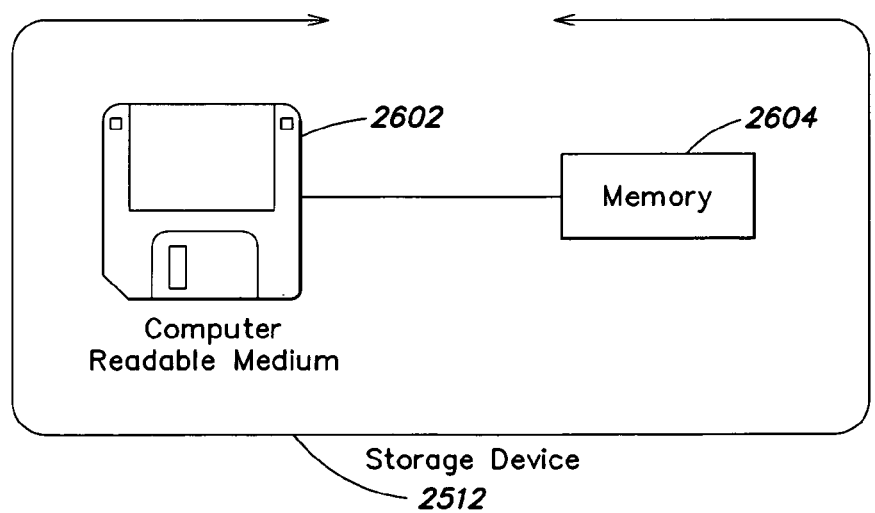
FIG. 26 is a block diagram of a computer data storage system with which various embodiments of the invention may be practiced.

Processes and methods associated with various embodiments, acts thereof and various embodiments and variations of these methods and acts, individually or in combination, may be defined by computer-readable signals tangibly embodied on a computer-readable medium, 2602, FIG. 26, for example, a non-volatile recording medium, an integrated circuit memory element, or a combination thereof. Such signals may define instructions, for example, as part of one or more programs that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium, 2602, may be transportable such that the instructions stored thereon in memory 2604, can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate operation of the enabling software carried by the computer-readable medium according to various embodiments of the invention. Further, the software design system may be located on a single computer or may be distributed among a plurality of computers attached by a communications network.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

A computer system may be a general-purpose computer system that is programmable using a high-level computer programming language. Computer system may be also implemented using specially programmed, special purpose hardware. In a computer system there may be a processor that is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME), Windows XP, or Windows Visa operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

While given components of the system have been described separately, one of ordinary skill will appreciate that some of the functions may be combined or shared in given instructions, program sequences, code portions, and the like.

What is claimed is:

1. A computer implemented method for optimizing results returned from interaction with a collection of information, the method comprising:

establishing criteria associated with at least one operation on a collection of information, wherein the criteria is based, at least in part, on a comparison of a measurement of the distinctiveness of a set of results and a distinctiveness score threshold;

establishing a rule that comprises the criteria and the at least one operation;

determining the set of results from interaction with a collection of information, wherein the set of results comprises a plurality of documents retrieved from the collection of information, and wherein each of the plurality of documents further comprise a unit of storage of digital data;

determining, by a computer system, a measurement of distinctiveness for the set of results based on a statistical distribution of at least one identifying characteristic, wherein the distinctiveness of the set of results is measured in relation to the collection of information, and wherein the determining the measurement of distinctiveness comprises:

identifying the at least one identifying characteristic within an evaluated set, and determining a measure of distinctiveness of the evaluated set within the collection of information;

modifying, by the computer system, the set of results according to the at least one operation by applying the rule to the set of results in response to determining that the set of results matches the criteria based, at least in part, on the comparison of the measurement of distinctiveness for the set of results and the distinctiveness score threshold; and outputting a modified result.

2. The method according to claim 1, further comprising establishing additional criteria.

3. The method according to claim 1, further comprising establishing additional operations.

4. The method according to claim 1, wherein the interaction with the collection of information comprises at least one of a query against the collection of information, a search applied to the collection of information, a search entered in a text box, a filtering operation applied to the collection of information, navigation within the collection of information, access to the collection of information, access to the collection of information through a browser, or a data mining operation.

5. The method according to claim 1, further comprising determining a measurement of distinctiveness based on a statistical distribution of at least one identifying characteristic within the set of results and a statistical distribution of at least one identifying characteristic within another set.

6. The method according to claim 5, further comprising generating the another set from the collection of information.

7. The method according to claim 1, further comprising generating a linear combination of the statistical distributions for the set of results and the another set, and wherein the measurement of distinctiveness is further based on the linear combination.

8. The method according to claim 1, wherein the establishing criteria comprises establishing at least one of a minimum value for the measurement of distinctiveness of the set results, a maximum value for the measurement of distinctiveness, or a range of values for the measurement of distinctiveness.

9. The method according to claim 1, wherein the modifying the set of results further comprises incorporating at least one additional element from the collection of information.

10. The method according to claim 1, wherein the modifying the set of results further comprises performing at least one additional operation.

11. The method according to claim 1, wherein the modifying the set of results comprises at least one of grouping content within the modified set, sorting content within the modified set, or filtering content within the modified set.

12. The method according to claim 1, wherein the modifying the set of results comprises generating a suggested query.

13. The method according to claim 12, wherein the outputting the modified result comprises outputting the suggested query.

14. The method according to claim 1, further comprising defining the at least one operation to identify desired content within the collection of information.

15. The method according to claim 1, further comprising defining the at least one operation to replace at least one element of the interaction with the collection of information with at least one predefined element.

16. The method according to claim 1, further comprising normalizing a measurement of distinctiveness.

17. The method according to claim 1, further comprising:

modifying a size of at least one set; and determining a measurement of distinctiveness from the at least one modified set.

18. The method according to claim 1, further comprising determining a measurement of distinctiveness for at least one set, wherein the measurement of distinctiveness is determined relative to a baseline measure.

19. The method according to claim 1, further comprising determining a measurement of distinctiveness for at least one set, wherein the measurement of distinctiveness is determined relative to the collection of information.

20. The method according to claim 1, further comprising tracking a state associated with the interaction with the collection of information.

21. The method according to claim 20, wherein the modification of the set of results comprises a modification of the state associated with the interaction with the collection of information.

22. The method according to claim 1, further establishing criteria associated with a state associated with the interaction with the collection of information.

23. A method for information processing, comprising:

generating a salience measure that measures a quality of a set of documents, wherein the set of documents comprises a plurality of documents retrieved from an information retrieval system, based on their ambiguity relative to similarly sized sets of documents retrieved from the information retrieval system; and using a distinctiveness value generated from the salience measure to take a given action in the information retrieval system, wherein the distinctiveness value is measured in relation to the collection of information, and wherein the using the distinctiveness value comprises establishing criteria associated with the given action on a collection of information, wherein the criteria is based, at least in part, on a comparison of the distinctiveness value and a distinctiveness score threshold, establishing a rule that comprises the criteria and the at least one operation, and applying the rule to the set of documents to take the given action.

24. The method as described in claim 23, wherein the salience measure is a normalized clarity value, and wherein the normalized clarity value is generated by accounting for a size of a measured set.

25. The method as described in claim 24 wherein, for the set of documents S, the normalized clarity value is the number of standard deviations by which the clarity of S exceeds to expected value of the clarity of a set of documents of the same size as S.

26. A non-transitory computer-readable medium having computer-readable instructions stored thereon that define instructions that, as a result of being executed by a computer, instruct the computer to optimize results returned from interaction with a collection of information, the optimizing comprising:
   establishing criteria associated with at least one operation on a collection of information, wherein the criteria is based, at least in part, on a comparison of a measurement of the distinctiveness of a set of results and a distinctiveness score threshold;
   establishing a rule that comprises the criteria and the at least one operation;
   determining the set of results from interaction with a collection of information, wherein the set of results comprises a plurality of documents retrieved from the collection of information, and wherein each of the plurality of documents further comprise a unit of storage of digital data;
   determining a measurement of distinctiveness for the set of results based on a statistical distribution of at least one identifying characteristic, wherein the distinctiveness of the set of results is measured in relation to the collection of information, and wherein the determining the measurement of distinctiveness comprises:
      identifying the at least one identifying characteristic within an evaluated set, and
      determining a measure of distinctiveness of the evaluated set within the collection of information;
   modifying the set of results according to the at least one operation by applying the rule to the set of results in response to determining that the set of results matches the criteria based, at least in part, on the comparison of the measurement of distinctiveness for the set of results and the distinctiveness score threshold; and
   outputting a modified result.

27. A system for optimizing results returned from interaction with a collection of information, the system comprising:
   at least one processor operatively connected to a memory, wherein the at least one processor when executing provides:
   a rules engine adapted to establish criteria associated with at least one operation on a collection of information, wherein execution of the operation is based on a comparison of a measurement of a distinctiveness of the set of results and a distinctiveness score threshold, and wherein the rules engine is further configured to establish a rule that comprises the criteria and the at least one operation;
   a measurement engine adapted to measure the distinctiveness of a set of results, wherein the distinctiveness of the set of results is measured in relation to the collection of information, and wherein the measurement engine is further adapted to:
      determine a measurement of distinctiveness for the set of results based on a statistical distribution of at least one identifying characteristic
      identify the at least one identifying characteristic within an evaluated set, and
      determine a measure of distinctiveness of the evaluated set within the collection of information;
   a retrieval engine adapted to return a set of results from a collection of information in response to interaction with the collection of information, wherein the set of results comprises a plurality of documents retrieved from the collection of information, wherein each of the plurality of documents further comprise a unit of storage of digital data;
   a modification engine adapted to modify the set of results according to the at least one operation by applying the rule to the set of results in response to a determination that the set of results matches the established criteria, wherein the determination is based, at least in part, on the comparison of the measurement of distinctiveness for the set of results and the distinctiveness score threshold; and
   an output engine adapted to output the modified result.

28. The system according to claim 27, wherein the rules engine is further adapted to establish additional criteria.

29. The system according to claim 27, wherein the rules engine is further adapted to establish additional operations.

30. The system according to claim 27, further comprising an input engine adapted to manage interaction with the collection of information, wherein interaction comprises at least one of a query against the collection of information, a search applied to the collection of information, a search entered in a text box, a filtering operation applied to the collection of information, navigation within the collection of information, access to the collection of information, access to the collection of information through a browser, and a data mining operation.

31. The system according to claim 27, wherein the measurement engine is further adapted to determine a measurement of distinctiveness based on a statistical distribution of at least one identifying characteristic within the set of results and a statistical distribution of at least one identifying characteristic within another set.

32. The system according to claim 31, further comprising a generation engine adapted to generate the another set from the collection of information.

33. The system according to claim 27, wherein the measurement engine is further adapted to generate a linear combination of the statistical distributions for the set of results and the another set, and wherein the measurement of distinctiveness is further based on the linear combination.

34. The system according to claim 27, wherein the rules engine is further adapted to establish at least one of a minimum value for the measurement of distinctiveness of the set results, a maximum value for the measurement of distinctiveness, and a range of values for the measurement of distinctiveness.

35. The system according to claim 27, wherein the modification engine is further adapted to incorporate at least one additional element from the collection of information.

36. The system according to claim 27, wherein the modification engine is further adapted to perform at least one additional operation.

37. The system according to claim 27, wherein the modification engine is further adapted to include at least one of grouping content within the modified set, sorting content within the modified set, and filtering content within the modified set.

38. The system according to claim 27, wherein the modification engine is further adapted to generate a suggested query.

39. The system according to claim 38, wherein the output engine is further adapted to output the suggested query.

40. The system according to claim 27, wherein the rules engine is further adapted to define the at least one operation to identify desired content within the collection of information.

41. The system according to claim 27, wherein the rules engine is further adapted to define the at least one operation to replace at least one element of the interaction with the collection of information with at least one predefined element.

42. The system according to claim 27, further comprising a normalization engine adapted to normalize a measurement of distinctiveness.

43. The system according to claim 27, further comprising a sizing engine adapted to modifying a size of at least one set, and wherein the measurement engine is further adapted to determine a measurement of distinctiveness from the at least one modified set.

44. The system according to claim 27, wherein the measurement engine is further adapted to determine a measurement of distinctiveness for at least one set relative to a baseline measure.

45. The system according to claim 27, wherein the measurement engine is further adapted to determine the measurement of distinctiveness relative to the collection of information.

46. The system according to claim 27, further comprising a tracking engine adapted to track a state associated with the interaction with the collection of information.

47. The system according to claim 46, wherein the modification engine is further adapted to modify the state associated with the interaction with the collection of information.

48. The system according to claim 27, wherein the rules engine is further adapted to establish criteria associated with a state associated with the interaction with the collection of information.

49. The method according to claim 1, further comprising defining the at least one operation to incorporate at least one predefined element into the set of results.

50. The non-transitory computer-readable medium of claim 26, the optimizing further comprising determining a measurement of distinctiveness based on a statistical distribution of at least one identifying characteristic within the set of results and a statistical distribution of at least one identifying characteristic within another set.

51. The non-transitory computer-readable medium of claim 50, the optimizing further comprising generating the another set from the collection of information.

* * * * *